United States Patent
Ohara et al.

(10) Patent No.: US 7,916,943 B2
(45) Date of Patent: *Mar. 29, 2011

(54) IMAGE DETERMINING APPARATUS, IMAGE DETERMINING METHOD, IMAGE ENHANCEMENT APPARATUS, AND IMAGE ENHANCEMENT METHOD

(75) Inventors: Taira Ohara, Matsumoto (JP);
Kiyoharu Momose, Hata-machi (JP)

(73) Assignee: Seiko Epson Corporation, Tokyo (JP)

( * ) Notice: Subject to any disclaimer, the term of this patent is extended or adjusted under 35 U.S.C. 154(b) by 951 days.

This patent is subject to a terminal disclaimer.

(21) Appl. No.: 11/809,908

(22) Filed: Jun. 1, 2007

(65) Prior Publication Data

US 2008/0030814 A1 Feb. 7, 2008

(30) Foreign Application Priority Data

Jun. 2, 2006 (JP) .................. 2006-155433
Jun. 2, 2006 (JP) .................. 2006-155434

(51) Int. Cl.
*G06K 9/00* (2006.01)

(52) U.S. Cl. ........ 382/168; 382/162; 382/172; 382/132; 382/274; 358/1.9; 358/1.14

(58) Field of Classification Search .................. 382/62, 382/164, 165, 168, 171–173, 254, 274, 275, 382/286, 291; 358/1.9, 3.26, 518–523, 525, 358/530, 1.14
See application file for complete search history.

(56) References Cited

U.S. PATENT DOCUMENTS

| | | | | |
|---|---|---|---|---|
| 4,799,106 A * | 1/1989 | Moore et al. | .................. | 348/619 |
| 5,323,241 A | 6/1994 | Yonezawa | | |
| 5,461,457 A * | 10/1995 | Nakamura | ...................... | 355/77 |
| 5,887,080 A * | 3/1999 | Tsubusaki et al. | ............ | 382/172 |
| 6,111,981 A * | 8/2000 | Tsubusaki et al. | ............ | 382/172 |
| 6,807,316 B2 | 10/2004 | Enomoto | | |
| 7,013,025 B2 | 3/2006 | Hiramatsu | | |
| 7,113,639 B2 * | 9/2006 | Fukawa et al. | ................ | 382/168 |
| 7,142,712 B2 * | 11/2006 | Maruoka et al. | ............... | 382/168 |
| 7,155,053 B2 * | 12/2006 | Nakajima et al. | ............. | 382/162 |
| 7,251,056 B2 | 7/2007 | Matsushima | | |
| 7,298,896 B2 * | 11/2007 | Yamaguchi et al. | .......... | 382/172 |
| 7,406,193 B2 | 7/2008 | Watanabe | | |
| 7,466,868 B2 | 12/2008 | Wilensky | | |
| 7,570,836 B2 * | 8/2009 | Imai | ............................. | 382/274 |

(Continued)

FOREIGN PATENT DOCUMENTS

JP P06-152962 A 5/1994

(Continued)

OTHER PUBLICATIONS

U.S. Appl. No. 11/809,907, Taira Ohara.

(Continued)

*Primary Examiner* — Brian Q Le
*Assistant Examiner* — Mekonen Bekele
(74) *Attorney, Agent, or Firm* — Nutter McClennen & Fish LLP; John J. Penny, Jr.; Christina M. Sperry

(57) ABSTRACT

Image determining apparatuses, image determining methods, image enhancement apparatuses, and image enhancement methods are provided. An image determining apparatus according to an exemplary embodiment of the present invention includes: (A) a histogram data generation section; (B) an attribute information obtaining section; and (C) a determining section.

15 Claims, 44 Drawing Sheets

U.S. PATENT DOCUMENTS

| | | | |
|---|---|---|---|
| 7,664,319 B2 * | 2/2010 | Toyoda et al. | 382/167 |
| 2003/0179398 A1 | 9/2003 | Takano et al. | |
| 2005/0084174 A1 | 4/2005 | Imai | |
| 2005/0141002 A1 * | 6/2005 | Takano et al. | 358/1.9 |
| 2005/0259282 A1 | 11/2005 | Takano et al. | |
| 2006/0056547 A1 | 3/2006 | Buchali et al. | |
| 2007/0086640 A1 * | 4/2007 | Luo et al. | 382/132 |
| 2007/0133036 A1 * | 6/2007 | Matsunoshita et al. | 358/1.14 |
| 2007/0237392 A1 | 10/2007 | Ohara | |
| 2008/0002216 A1 | 1/2008 | Matsushima | |

FOREIGN PATENT DOCUMENTS

| | | |
|---|---|---|
| JP | 06268866 A | 9/1994 |
| JP | 10-079885 | 3/1998 |
| JP | 10126619 A | 5/1998 |
| JP | 2000102033 A | 4/2000 |
| JP | 2000-134467 | 5/2000 |
| JP | P2001-45303 A | 2/2001 |
| JP | P2002-101303 A | 4/2002 |
| JP | P2002-101313 A | 4/2002 |
| JP | P2002-158893 A | 5/2002 |
| JP | 2002232728 A | 8/2002 |
| JP | 2002368982 A | 12/2002 |
| JP | 2003069825 A | 3/2003 |
| JP | 2003283731 A | 10/2003 |
| JP | 2004-056416 | 2/2004 |
| JP | 2004056391 A | 2/2004 |
| JP | 2004282416 A | 10/2004 |
| JP | P2005-49955 A | 2/2005 |
| JP | P2007-325136 A | 12/2007 |

OTHER PUBLICATIONS

Notice of Allowance dated Nov. 30, 2010 relating to U.S. Appl. No. 11/809,907.

* cited by examiner

| | | | |
|---|---|---|---|
| HISTOGRAM ADJUSTMENT | RED (R) | SHADOW INPUT VALUE | $\alpha 11$ |
| | | HIGHLIGHT INPUT VALUE | $\alpha 12$ |
| | | SHADOW OUTPUT VALUE | $\alpha 13$ |
| | | HIGHLIGHT OUTPUT VALUE | $\alpha 14$ |
| | | GAMMA VALUE | $\alpha 15$ |
| | GREEN (G) | SHADOW INPUT VALUE | $\alpha 21$ |
| | | HIGHLIGHT INPUT VALUE | $\alpha 22$ |
| | | SHADOW OUTPUT VALUE | $\alpha 23$ |
| | | HIGHLIGHT OUTPUT VALUE | $\alpha 24$ |
| | | GAMMA VALUE | $\alpha 25$ |
| | BLUE (B) | SHADOW INPUT VALUE | $\alpha 31$ |
| | | HIGHLIGHT INPUT VALUE | $\alpha 32$ |
| | | SHADOW OUTPUT VALUE | $\alpha 33$ |
| | | HIGHLIGHT OUTPUT VALUE | $\alpha 34$ |
| | | GAMMA VALUE | $\alpha 35$ |
| | TONE CURVE | TONE CURVE LOWER END PORTION SHAPE | $\alpha 41$ |
| | | TONE CURVE UPPER END PORTION SHAPE | $\alpha 42$ |
| | GRAYSCALE BALANCE ADJUSTMENT VALUE | | $\alpha 51$ |

FIG. 10A

| DENSITY ENHANCEMENT | RED (R) | P1 | INPUT COORDINATES | $\beta 11$ |
|---|---|---|---|---|
| | | | OUTPUT COORDINATES | $\beta 12$ |
| | | P2 | INPUT COORDINATES | $\beta 13$ |
| | | | OUTPUT COORDINATES | $\beta 14$ |
| | | ⋮ | ⋮ | ⋮ |
| | GREEN (G) | P1 | INPUT COORDINATES | $\beta 21$ |
| | | | OUTPUT COORDINATES | $\beta 22$ |
| | | P2 | INPUT COORDINATES | $\beta 23$ |
| | | | OUTPUT COORDINATES | $\beta 24$ |
| | | ⋮ | ⋮ | ⋮ |
| | BLUE (B) | P1 | INPUT COORDINATES | $\beta 31$ |
| | | | OUTPUT COORDINATES | $\beta 32$ |
| | | P2 | INPUT COORDINATES | $\beta 33$ |
| | | | OUTPUT COORDINATES | $\beta 34$ |
| | | ⋮ | ⋮ | ⋮ |

FIG. 10B

| IMAGE ADJUSTMENT | BRIGHTNESS | | $\gamma 1$ |
|---|---|---|---|
| | CONTRAST | | $\gamma 2$ |
| | SATURATION | | $\gamma 3$ |
| | COLOR BALANCE | CYAN-RED | $\gamma 4$ |
| | | MAGENTA-GREEN | $\gamma 5$ |
| | | YELLOW-BLUE | $\gamma 6$ |

FIG. 10C

HISTOGRAM FOR RED (R)

HISTOGRAM FOR GREEN (G)

IMAGE DETERMINING APPARATUS, IMAGE DETERMINING METHOD, IMAGE ENHANCEMENT APPARATUS, AND IMAGE ENHANCEMENT METHOD

CROSS-REFERENCE TO RELATED APPLICATION

The present application claims priority upon Japanese Patent Application No. 2006-155433 and Japanese Patent Application No. 2006-155434 filed on Jun. 2, 2006, which are herein incorporated by reference.

BACKGROUND

1. Technical Field

The present invention relates to image determining apparatuses, image determining methods, image enhancement apparatuses and image enhancement methods.

2. Related Art

Various kinds of image reading apparatuses, such as image scanners, ordinarily can be connected by wire or wirelessly to a computer system, such as a personal computer, to send images read in from original documents as image data to the computer system. The computer system receives the image data that has been sent from the image reading apparatus and stores it in a data storage device, such as a memory or a hard-disk drive. In the course of this, the computer system performs various kinds of adjustment processing on the image data that has been sent from the image reading apparatus.

As an adjustment process that can be carried out, there is for example a histogram adjustment for adjusting the brightness of the image or a density enhancement, in which the darkness/brightness of the image is partially changed. Such adjustments are automatically carried out by various programs, such as a driver program or application program for the image reading apparatus installed on the computer system, or they are carried out by the user or the like. Other than that, there are also adjustments for enhancing a backlight image, for example. As such backlight enhancement methods, various methods have been proposed (see for example JP-A-H10-79885, JP-A-2004-56416 and JP-A-2000-134467).

(1) Now, in the conventional methods for enhancing a backlight image, it was not possible to carry out a sufficient enhancement process on images in which the color balance of, for example, intermediate tones is destroyed. That is to say, in the case of images in which the color balance of, for example, intermediate tones is destroyed, it was necessary to carry out an enhancement process that is suited for such images. And in order to carry out such an enhancement process, it was necessary to accurately determine whether the image to be enhanced is in fact an image in which the color balance of intermediate tones is destroyed, for example.

(2) In the conventional methods for enhancing a backlight image, it was not possible to carry out a sufficient enhancement process on images in which the color balance of, for example, intermediate tones is destroyed. That is to say, in conventional enhancement methods, it was not possible to achieve a sufficient improvement of image quality for such images in which the color balance of, for example, intermediate tones is destroyed. Accordingly, there is a need for an enhancement process that is suitable for such images in which the color balance of, for example, intermediate tones is destroyed.

SUMMARY (1) The present invention has been conceived in view of these circumstances, and has an advantage of, for example, accurately judging whether an image is one in which the color balance of, for example, intermediate tones is destroyed.

A principal aspect of the present invention is (D) an image determining apparatus including:

(A) a histogram data generation section that, based on data of pixels constituting an image to be determined, generates data of histograms for each color, the histograms representing a distribution of the number of pixels with respect to density values of each color of those pixels;

(B) an attribute information obtaining section that obtains, for each color, attribute information relating to a first small region and a second small region by partitioning regions represented by the histograms for each color into at least three small regions each, according to the magnitude of the density values, based on the data of the histograms for each color generated by the histogram data generation section, selecting, for each color, as the first small region, a small region whose density values are larger than those of at least one of the at least three small regions and whose density values are smaller than those of at least one other of the at least three small regions, and selecting, for each color, at least one small region other than the first small region as the second small region; and (C) a determining section that determines whether the image to be determined is an image in which the color balance of the first small region is destroyed, based on the attribute information relating to the first small region for each color and the attribute information relating to the second small region for each color, that have been obtained by the attribute information obtaining section.

(2) The present invention has been conceived in view of these circumstances, and has an advantage of, for example, subjecting an image in which the color balance of, for example, intermediate tones is destroyed to a suitable enhancement process.

A principal aspect of the present invention is (E) an image enhancement apparatus including:

(A) a histogram data generation section that, based on data of pixels constituting an image, generates data of histograms for each color, the histograms representing a distribution of the number of pixels with respect to density values of each color of those pixels;

(B) an attribute information obtaining section that obtains, for each color, attribute information relating to a small region by partitioning regions represented by the histograms for each color into at least three small regions according to the magnitude of the density values, based on the data of the histograms for each color generated by the histogram data generation section, and selecting at least one small region from the at least three small regions;

(C) a target value obtaining section that obtains a target value that is common for all colors for the attribute information relating to a selected small region, based on the attribute information obtained by the attribute information obtaining section by selecting from the at least three small regions, as the selected small region, for each color at least one small region whose density values are larger than those of another small region and whose density values are smaller than those of yet another small region; and (D) an enhancement processing section that subjects the image to an enhancement process, such that the attribute information of each color relating to the selected small region becomes the target value, which is common for all colors, that has been obtained by the target value obtaining section.

Other features of the present invention will become clear by reading the description of the present specification with reference to the accompanying drawings.

BRIEF DESCRIPTION OF THE DRAWINGS

FIG. 10A is an explanatory diagram of data that is set by the histogram adjustment.

FIG. 10B is an explanatory diagram of data that is set by the density enhancement.

FIG. 10C is an explanatory diagram of data that is set by the image adjustment.

DESCRIPTION OF THE EMBODIMENTS

Figure 1:
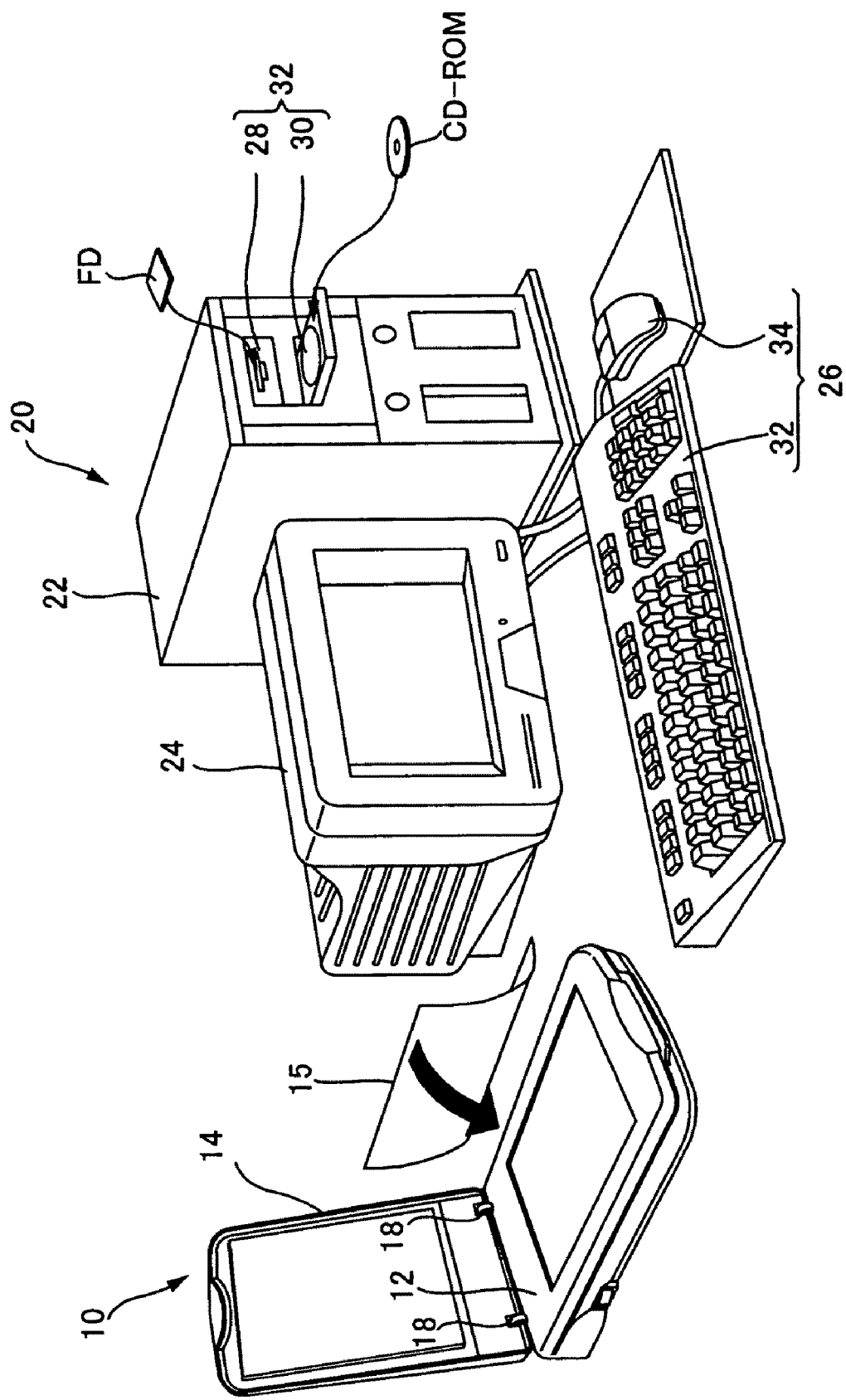
FIG. 1 is an explanatory diagram showing an embodiment of an image reading system.

At least the following matters will be made clear by the explanation in the present specification and the description of the accompanying drawings.

(D) An image determining apparatus comprising:

(A) a histogram data generation section that, based on data of pixels constituting an image to be determined, generates data of histograms for each color, the histograms representing a distribution of the number of pixels with respect to density values of each color of those pixels;

(B) an attribute information obtaining section that obtains, for each color, attribute information relating to a first small region and a second small region by partitioning regions represented by the histograms for each color into at least three small regions each, according to the magnitude of the density values, based on the data of the histograms for each color generated by the histogram data generation section, selecting, for each color, as the first small region, a small region whose density values are larger than those of at least one of the at least three small regions and whose density values are smaller than those of at least one other of the at least three small regions, and selecting, for each color, at least one small region other than the first small region as the second small region; and (C) a determining section that determines whether the image to be determined is an image in which the color balance of the first small region is destroyed, based on the attribute information relating to the first small region for each color and the attribute information relating to the second small region for each color, that have been obtained by the attribute information obtaining section.

With this image determining apparatus, based on data of pixels constituting an image to be determined, data of histograms for each of the colors is generated, the histograms representing a distribution of the number of pixels with respect to density values of each of the colors of those pixels; regions represented by the histograms for each of the colors are partitioned into at least three small regions each, according to the magnitude of the density values, based on the data of the histograms for each of the colors; as a first small region, a small region is selected for each color whose density values are larger than those of at least one of the at least three small regions and whose density values are smaller than those of at least one other of the at least three small regions; at least one small region other than the first small region is selected for each color as a second small region; for each color, attribute information relating to the first small region and the second small region is obtained; and is determined whether the image to be determined is an image in which the color balance of the first small region is destroyed, based on the attribute information relating to the first small region for each color and the attribute information relating to the second small region for each color. Accordingly, it is possible to accurately determine whether the image is an image in which the color balance of, for example, intermediate tones is destroyed.

In this image determining apparatus, histogram data of each of the colors red, green and blue may be generated by the histogram data generation section as the histogram data of each of the colors. If the histogram data is generated for each of the colors red, green and blue as the histogram data for each color, then it is possible to accurately determine whether the image is an image in which the color balance of, for example, intermediate tones is destroyed.

In this image determining apparatus, the at least three small regions may include at least two small regions that have the same area. If the at least three small regions include at least two small regions that have the same area, then it is possible to more accurately determine whether the image is an image in which the color balance of, for example, intermediate tones is destroyed.

In this image determining apparatus, the at least three small regions may include at least two small regions that have the same pixel number. If the at least three small regions include at least two small regions that have the same pixel number, then it is possible to more accurately determine whether the image is an image in which the color balance of, for example, intermediate tones is destroyed.

In this image determining apparatus, the at least three small regions may include at least two small regions in which at least one of the number of pixels and the area is the same, and the attribute information obtaining section may obtain the respective attribute information from the at least two small regions in which at least one of the number of pixels and the area is the same. If the at least three small regions include at least two small regions that have the same pixel number and/or the same area, and the attribute information obtaining section obtains the attribute information respectively from the at least two small regions having the same pixel number and/or the same area, then a more accurate determination of whether the image is an image in which the color balance of, for example, intermediate tones is destroyed is possible.

In this image determining apparatus, the attribute information obtaining section may obtain a maximum value of the density values of the first small region or the second small region as the attribute information of the first small region or the second small region. If the attribute information obtaining section obtains a maximum value of the density values of the first small region or the second small region as the attribute information of the first small region or the second small region, then it is possible to more accurately determine whether the image to be determined is an image in which the color balance of, for example, intermediate tones is destroyed.

In this image determining apparatus, the first small region may be located in a region of intermediate tones of the histograms. If the first small region is located in a region of intermediate tones of the histograms, then it is possible to more accurately determine whether the image is an image in which the color balance of, for example, intermediate tones is destroyed.

In this image determining apparatus, the second small region may have larger density values than the first small region. If the second small region has larger density values than the first small region, then it is possible to more accurately determine whether the image is an image in which the color balance of, for example, intermediate tones is destroyed.

In this image determining apparatus, the determining section may determine whether the image to be determined is an image in which the color balance of the first small region is destroyed, based on the result of a comparison between the attribute information relating to the first small region for each color and the attribute information relating to the second small region for each color, that has been obtained by the attribute information obtaining section. By making this determination with the determining section based on the result of a comparison between the attribute information relating to the first small region for each color and the attribute information relating to the second small region for each color, it is possible to determine more accurately whether the image is an image in which the color balance of, for example, intermediate tones is destroyed.

In this image determining apparatus, the determining section may determine whether the image to be determined is an image in which the color balance of the first small region is destroyed by comparing a maximum of a first difference between values obtained for each color as the attribute information relating to the first small region for each color and a maximum of a second difference between values obtained for each color as the attribute information relating to the second small region for each color. By letting the determining section make this determination through a comparison of a first difference between values obtained for each color as the attribute information relating to the first small region for each color and a maximum of a second difference between values obtained for each color as the attribute information relating to the second small region for each color, it is possible to determine easily whether the image is an image in which the color balance of, for example, intermediate tones is destroyed.

In this image determining apparatus, the determining section may determine whether the image is an image in which the color balance of the first small region is destroyed, based on a third difference between the first difference and the second difference. By letting the determining section make this determination based on a third difference between the first difference and the second difference, it is possible to determine more easily whether the image is an image in which the color balance of, for example, intermediate tones is destroyed.

In this image determining apparatus, the determining section may determine whether the image to be determined is an image in which the color balance of the first small region is destroyed, by comparing a third difference to a predetermined threshold value. By letting the determining section make this determination through a comparison of the third difference with a predetermined threshold value, it is possible to determine easily whether the image is an image in which the color balance of, for example, intermediate tones is destroyed.

The image determining apparatus may further comprise, in addition to the determining section, a backlight image determining section that determines whether the image to be determined is a backlight image. By including such a backlight image determining section, it is possible to determine whether the image to be determined is a backlight image.

In this image determining apparatus, when it has been determined by the backlight determining section that the image to be determined is a backlight image, then the determining section may determine whether the image to be determined is an image in which the color balance of the first small region is destroyed. By letting the determining section determine whether the image to be determined is an image in which the color balance of the first small region is destroyed when it has been determined by the backlight determining section that the image to be determined is a backlight image, it is possible to determine whether the image that has been determined to be a backlight image is an image in which the color balance of the first small region is destroyed.

Also provided is (D) an image determining apparatus comprising:

(A) a histogram data generation section that, based on data of pixels constituting an image to be determined, generates data of histograms for each color, the histograms representing a distribution of the number of pixels with respect to density values of each color of those pixels;

(B) an attribute information obtaining section that partitions regions represented by the histograms for each color into at least three small regions each, according to the magnitude of the density values, based on the data of the histograms for each color generated by the histogram data generation section, selects for each color, as a first small region, a small region whose density values are larger than those of at least one of the at least three small regions and whose density values are smaller than those of at least one other of the at least three small regions, selects for each color at least one small region other than the first small region as a second small region, and obtains for each color attribute information relating to the first small region and the second small region; and (C) a determining section that determines whether the image to be determined is an image in which the color balance of the first small region is destroyed, based on the attribute information relating to the first small region for each color and the attribute information relating to the second small region for each color, obtained with the attribute information obtaining section;

(E) wherein histogram data of the colors red, green and blue is generated by the histogram data generation section as the histogram data of each color;

(F) the at least three small regions include at least two small regions that have the same area;

(G) the at least three small regions include at least two small regions that have the same pixel number;

(H) the at least three small regions include at least two small regions that have the same pixel number and/or the same area, and the attribute information obtaining section obtains the attribute information respectively from the at least two small regions having the same pixel number and/or the same area;

(I) the attribute information obtaining section obtains a maximum value of the density values of the first small region or the second small region as the attribute information of the first small region or the second small region;

(J) the first small region is located in a region of intermediate tones of the histograms;

(K) the second small region has larger density values than the first small region;

(L) the determining section determines whether the image to be determined is an image in which the color balance of the first small region is destroyed, based on the result of a comparison between the attribute information relating to the first small region for each color and the attribute information relating to the second small region for each color, obtained with the attribute information obtaining section;

(M) the determining section determines whether the image to be determined is an image in which the color balance of the first small region is destroyed by comparing a maximum of a first difference between values obtained for each color as the attribute information relating to the first small region for each color and a maximum of a second difference between values obtained for each color as the attribute information relating to the second small region for each color;

(N) the determining section determines whether the image to be determined is an image in which the color balance of the first small region is destroyed, based on a third difference between the first difference and the second difference;

(O) the determining section determines whether the image to be determined is an image in which the color balance of the first small region is destroyed by comparing the third difference with a predetermined threshold value;

(P) the image determining apparatus further includes, in addition to the determining section, a backlight image determining section that determines whether the image to be determined is a backlight image; and (Q) when it has been determined by the backlight determining section that the image to be determined is a backlight image, then the determining section determines whether the image to be determined is an image in which the color balance of the first small region is destroyed.

Also provided is (E) an image determining method comprising:

(A) a step of generating, based on data of pixels constituting an image to be determined, data of histograms for each color, the histograms representing a distribution of the number of pixels with respect to density values of each color of those pixels;

(B) a step of partitioning regions represented by the histograms for each color into at least three small regions according to the magnitude of the density values, based on the data of the generated histograms for each color;

(C) a step of obtaining, for each color, attribute information relating to a first small region and a second small region by selecting, for each color, as the first small region, a small region whose density values are larger than those of at least one of the at least three small regions and whose density values are smaller than those of at least one other of the at least three small regions, and selecting, for each color, at least one small region other than the first small region as the second small region; and (D) a step of determining whether the image to be determined is an image in which the color balance of the first small region is destroyed, based on the attribute information relating to the first small region for each color and the attribute information relating to the second small region for each color, that have been obtained.

Also provided is (A) an image determining program executed by an image determining apparatus, (F) the image determining program executing:

(B) a step of generating, based on data of pixels constituting an image to be determined, data of histograms for each color, the histograms representing a distribution of the number of pixels with respect to density values of each of the colors of those pixels;

(C) a step of partitioning regions represented by the histograms for each of the colors into at least three small regions according to the magnitude of the density values, based on the data of the generated histograms for each of the colors;

(D) a step of obtaining for each color attribute information relating to the first small region and the second small region, selecting for each color, as a first small region, a small region whose density values are larger than those of at least one of the at least three small regions and whose density values are smaller than those of at least one other of the at least three small regions, and selecting for each color at least one small region other than the first small region as a second small region; and (E) a step of determining whether the image to be determined is an image in which the color balance of the first small region is destroyed, based on the attribute information relating to the first small region for each color and the attribute information relating to the second small region for each color, that have been obtained.

Also provided is (E) an image enhancement apparatus comprising:

(A) a histogram data generation section that, based on data of pixels constituting an image to be determined, generates data of histograms for each color, the histograms representing a distribution of the number of pixels with respect to density values of each color of those pixels;

(B) an attribute information obtaining section that obtains for each color attribute information relating to a first small region and a second small region by partitioning regions represented by the histograms for each of the colors into at least three small regions each, according to the magnitude of the density values, based on the data of the histograms for each of the colors generated by the histogram data generation section, selecting for each color, as the first small region, a small region whose density values are larger than those of at least one of the at least three small regions and whose density values are smaller than those of at least one other of the at least three small regions, and selecting for each color at least one small region other than the first small region as the second small region;

(C) a determining section that determines whether the image is an image in which the color balance of the first small region is destroyed, based on the attribute information relating to the first small region for each color and the attribute information relating to the second small region for each color, obtained with the attribute information obtaining section; and (D) an enhancement processing section that subjects the image to an enhancement process if the determining section has determined that the image to be determined is an image in which the color balance of the first small region is destroyed.

Also provided is (F) an image enhancement method comprising:

(A) a step of generating, based on data of pixels constituting an image to be determined, data of histograms for each color, the histograms representing a distribution of the number of pixels with respect to density values of each of the colors of those pixels;

(B) a step of partitioning regions represented by the histograms for each of the colors into at least three small regions according to the magnitude of the density values, based on the generated data of the histograms for each of the colors;

(C) a step of obtaining for each color attribute information relating to a first small region and a second small region by selecting for each color, as the first small region, a small region whose density values are larger than those of at least one of the at least three small regions and whose density values are smaller than those of at least one other of the at least three small regions, and selecting for each color at least one small region other than the first small region as the second small region;

(D) a step of determining whether the image to be determined is an image in which the color balance of the first small region is destroyed, based on the obtained attribute information relating to the first small region for each color and the attribute information relating to the second small region for each color; and (E) a step of subjecting the image to an enhancement process if it is determined that the image is an image in which the color balance of the first small region is destroyed.

Also provided is (E) an image reading apparatus comprising:

(A) an image reading section that reads in an image from an original document;

(B) a histogram data generation section that, based on data of pixels constituting an image that has been read in by the image reading section, generates data of histograms for each color, the histograms representing a distribution of the number of pixels with respect to density values of each of the colors of those pixels;

(C) an attribute information obtaining section that obtains for each color attribute information relating to a first small region and a second small region by partitioning regions represented by the histograms for each color into at least three small regions each, according to the magnitude of the density values, based on the data of the histograms for each of the colors generated by the histogram data generation section, selecting for each color, as the first small region, a small region whose density values are larger than those of at least one of the at least three small regions and whose density values are smaller than those of at least one other of the at least three small regions, and selecting for each color at least one small region other than the first small region as the second small region, and;

(D) a determining section that determines whether the image is an image in which the color balance of the first small region is destroyed, based on the attribute information relating to the first small region for each color and the attribute information relating to the second small region for each color, obtained with the attribute information obtaining section.

Also provided is (F) an image reading method comprising:

(A) a step of reading in an image from an original document;

(B) a step of generating, based on data of pixels constituting an image that has been read in, data of histograms for each color, the histograms representing a distribution of the number of pixels with respect to density values of each of the colors of those pixels;

(C) a step of partitioning regions represented by the histograms for each of the colors into at least three small regions according to the magnitude of the density values, based on the data of the generated histograms for each of the colors;

(D) a step of obtaining for each color attribute information relating to the first small region and the second small region, selecting for each color, as a first small region, a small region whose density values are larger than those of at least one of the at least three small regions and whose density values are smaller than those of at least one other of the at least three small regions, and selecting for each color at least one small region other than the first small region as a second small region; and (E) a step of determining whether the image is an image in which the color balance of the first small region is destroyed, based on the attribute information relating to the first small region for each color and the attribute information relating to the second small region for each color, that have been obtained.

Also provided is (F) a printing apparatus comprising:

(A) a printing section that prints an image on a medium;

(B) a histogram data generation section that, prior to printing the image with the printing section and based on data of pixels constituting the image, generates data of histograms for each color, the histograms representing a distribution of the number of pixels with respect to density values of each of the colors of those pixels;

(C) an attribute information obtaining section that obtains for each color attribute information relating to a first small region and a second small region by partitioning regions represented by the histograms for each of the colors into at least three small regions each, according to the magnitude of the density values, based on the data of the histograms for each of the colors generated by the histogram data generation section, selects for each color, as the first small region, a small region whose density values are larger than those of at least one of the at least three small regions and whose density values are smaller than those of at least one other of the at least three small regions, and selects for each color at least one small region other than the first small region as the second small region;

(D) a determining section that determines whether the image is an image in which the color balance of the first small region is destroyed, based on the attribute information relating to the first small region for each color and the attribute information relating to the second small region for each color, obtained with the attribute information obtaining section; and (E) an enhancement processing section that subjects the image to an enhancement process if the determining section has determined that the image is an image in which the color balance of the first small region is destroyed.

Also provided is (E) an image enhancement apparatus comprising:

(A) a histogram data generation section that, based on data of pixels constituting an image, generates data of histograms for each color, the histograms representing a distribution of the number of pixels with respect to density values of each color of those pixels;

(B) an attribute information obtaining section that obtains, for each color, attribute information relating to a small region by partitioning regions represented by the histograms for each color into at least three small regions according to the magnitude of the density values, based on the data of the histograms for each color generated by the histogram data generation section, and selecting at least one small region from the at least three small regions;

(C) a target value obtaining section that obtains a target value that is common for all colors for the attribute information relating to a selected small region, based on the attribute information obtained by the attribute information obtaining section by selecting from the at least three small regions, as the selected small region, for each color at least one small region whose density values are larger than those of another small region and whose density values are smaller than those of yet another small region; and (D) an enhancement processing section that subjects the image to an enhancement process, such that the attribute information of each color relating to the selected small region becomes the target value, which is common for all colors, that has been obtained by the target value obtaining section.

With this image enhancement apparatus, the regions represented by the histograms for each color are partitioned into at least three small regions according to the magnitude of their density values, based on data of the histograms for each of the colors generated based on the data of the pixels constituting an image, attribute information relating to at least one small region selected from these three or more small regions is obtained for each color, a target value that is the same for all colors is obtained for the attribute information relating to the selected small region that is selected for at least one of each of the colors by selecting from the at least three small regions for each color at least one small region whose density values are larger than those of another small region and whose density values are smaller than those of yet another small region, and the image is subjected to an enhancement process, such that the attribute information of each of the colors relating to the selected small region becomes the obtained target value, which is common for all colors, so that an image in which the color balance of, for example, intermediate tones has been destroyed can be subjected to a suitable enhancement process.

In this image enhancement apparatus, histogram data of each of the colors red, green and blue may be generated by the histogram data generation section as the histogram data of each of the colors. If histogram data of each of the colors red, green and blue is generated as the histogram data of each of the colors, then it is possible to subject an image in which the color balance of, for example, intermediate tones is destroyed to a suitable enhancement process, when the data of the density values of each of the colors red, green and blue is included as the data of the pixels constituting the image.

In this image enhancement apparatus, the at least three small regions may include at least two small regions that have the same area. If the at least three small regions include at least two small regions that have the same area, then it is possible to subject an image in which the color balance of, for example, intermediate tones is destroyed to a more suitable enhancement process.

In this image enhancement apparatus, the at least three small regions may include at least two small regions that have the same pixel number. If the at least three small regions include at least two small regions that have the same pixel number, then it is possible to subject an image in which the color balance of, for example, intermediate tones is destroyed to a more suitable enhancement process.

In this image enhancement apparatus, the at least three small regions may contain at least two small regions in which at least one of the number of pixels and the area is the same, the attribute information obtaining section may select at least one small region from the at least two small regions in which at least one of the number of pixels and the area is the same, and may obtain the attribute information relating to that small region, and the target value obtaining section may select the selected small region from the at least two small regions in which at least one of the number of pixels and the area is the same. If the at least three small regions contain at least two small regions in which at least one of the number of pixels and the area is the same, the attribute information obtaining section selects at least one small region from the at least two small regions in which at least one of the number of pixels and the area is the same, and obtains the attribute information relating to that small region, and the target value obtaining section selects the selected small region from the at least two small regions in which at least one of the number of pixels and the area is the same, then it is possible to subject an image in which the color balance of, for example, intermediate tones is destroyed to a more suitable enhancement process.

In this image enhancement apparatus, the selected small region may be located in a region of intermediate tones of the histograms. If the selected small region is located in a region of intermediate tones of the histograms, then it is possible to subject an image in which the color balance of, for example, intermediate tones is destroyed to a more suitable enhancement process.

In this image enhancement apparatus, the attribute information obtaining section may obtain for each color an average value of the density values for the at least one small region as the attribute information. If the attribute information obtaining section obtains for each color an average value of the density values for the at least one small region as the attribute information, then it is possible to subject an image in which the color balance of, for example, intermediate tones is destroyed to a more suitable enhancement process.

In this backlight image enhancement apparatus, the target value obtaining section may obtain information relating to the luminance for each of the at least one small region, based on an average value of the density values for each color obtained by the attribute information obtaining section, and obtain the target value from this information relating to the luminance. If the target value obtaining section obtains information relating to the luminance of the at least one small region from an average value of the density values of each color obtained by the attribute information obtaining section to obtain the target value based on information relating to this luminance, then it is possible to subject an image in which the color balance of, for example, intermediate tones is destroyed to a more suitable enhancement process.

In this image enhancement apparatus, the target value obtaining section may obtain an average value of the luminance of the pixels for the at least one small region as the information relating to the luminance. If the target value obtaining section obtains an average value of the luminance of the pixels for the at least one small region as the information relating to the luminance, then it is possible to subject an image in which the color balance of, for example, intermediate tones is destroyed to a more suitable enhancement process.

In this image enhancement apparatus, the target value obtaining section may obtain the target value based on a value obtained by adding at least one of the average values of the luminance obtained respectively for the at least one small region and the average value of the luminance of the overall image. If the target value obtaining section obtains the target value based on a value obtained by adding at least one of the average values of the luminance obtained respectively for the at least one small region and the average value of the overall luminance of the image, then it is possible to subject an image in which the color balance of, for example, intermediate tones is destroyed to a more suitable enhancement process.

In this image enhancement apparatus, the enhancement processing section may convert the density values of the pixels constituting the image when subjecting the image to the enhancement process. If the enhancement processing section converts the density values of the pixels constituting the image when performing the enhancement process on the image, then the enhancement process can be carried out in a simple manner.

In this image enhancement apparatus, the enhancement processing section may obtain information relating to a correspondence relationship between the density values before the conversion and the density values after the conversion, in order to subject the image to the enhancement process. If the enhancement processing section obtains this information, then the enhancement process can be carried out in a simple manner.

This image enhancement apparatus may further include a judgment section that judges whether the image is an image in which the color balance in the selected small region is destroyed. If such a determining section is provided, then it can be determined whether the image is an image in which the color balance in the selected small region is destroyed.

In this image enhancement apparatus, the enhancement processing section may subject the image to the enhancement process if the judgment section has judged that the image is an image in which the color balance in the selected small region is destroyed. If the image is subjected to the enhancement process when the judgment section has judged that the image is an image in which the color balance in the selected small region is destroyed, then it is possible to subject an image in which the color balance of, for example, intermediate tones is destroyed to a suitable enhancement process.

Also provided is (E) an image enhancement apparatus comprising:

(A) a histogram data generation section that, based on data of pixels constituting an image to be determined, generates data of histograms for each color, the histograms representing a distribution of the number of pixels with respect to density values of each color of those pixels;

(B) an attribute information obtaining section that partitions regions represented by the histograms for each color into at least three small regions according to the magnitude of the density values, based on the data of the histograms for each color generated by the histogram data generation section, selects at least one small region from the at least three small regions and obtains, for each color, attribute information relating to that small region;

(C) a target value obtaining section that selects for each color from the at least three small regions, as a selected small region, at least one small region whose density values are larger than those of another small region and whose density values are smaller than those of yet another small region, and that obtains a target value that is common for all colors for the attribute information relating to the selected small region, based on the attribute information obtained by the attribute information obtaining section;

(D) an enhancement processing section that subjects the image to an enhancement process, such that the attribute information of each color relating to the selected small region becomes the target value, which is common for all colors, that has been obtained by the target value obtaining section;

(F) wherein histogram data of the colors red, green and blue is generated by the histogram data generation section as the histogram data of each color;

(G) the at least three small regions include at least two small regions that have the same area;

(H) the at least three small regions include at least two small regions that have the same pixel number;

(I) the at least three small regions contain at least two small regions in which at least one of the number of pixels and the area is the same, the attribute information obtaining section selects at least one small region from the at least two small regions in which at least one of the number of pixels and the area is the same, and obtains the attribute information relating to that small region, and the target value obtaining section selects the selected small region from the at least two small regions in which at least one of the number of pixels and the area is the same;

(J) the attribute information obtaining section obtains, for each color, an average value of the density values of each of the at least one first small region as the attribute information;

(K) the selected small region is located in a region of intermediate tones of the histograms;

(L) the attribute information obtaining section obtains for each color an average value of the density values for the at least one small region as the attribute information;

(M) the target value obtaining section obtains information relating to the luminance of the at least one small region from an average value of the density values of each color obtained with the attribute information obtaining section, to obtain the target value based on information relating to this luminance;

(N) the target value obtaining section obtains an average value of the luminance of the individual pixels for the at least one small region as the information relating to the luminance;

(O) the target value obtaining section obtains the target value based on a value obtained by adding at least one of the average values of the luminance obtained respectively for the at least one small region to the average value of the overall luminance of the image;

(P) the enhancement processing section converts the density values of the pixels constituting the image when performing the enhancement process on the image;

(Q) the enhancement processing section obtains information relating to a correspondence relationship between the density values before the conversion and the density values after the conversion, in order to subject the image to the enhancement process;

(R) the image enhancement apparatus further comprises a judgment section that judges whether the image is an image in which the color balance in the selected small region is destroyed; and (S) the enhancement processing section subjects the image to the enhancement process if the judgment section has judged that the image is an image in which the color balance in the selected small region is destroyed.

Also provided is (G) an image enhancement method comprising:

(A) a step of generating, based on data of pixels constituting an image, data of histograms for each color, the histograms representing a distribution of the number of pixels with respect to density values of each color of those pixels;

(B) a step of partitioning regions represented by the histograms for each color each into at least three small regions according to the magnitude of the density values, based on the generated data of the histograms for each color;

(C) a step of selecting at least one small region from the at least three small regions and obtaining, for each color, attribute information relating to that small region;

(D) a step of selecting from the at least three small regions, as a selected small region, for each color at least one small region whose density values are larger than those of another small region and whose density values are smaller than those of yet another small region;

(E) a step of obtaining a target value that is common for all colors for the attribute information relating to the selected small region, based on the obtained attribute information; and (F) a step of subjecting the image to an enhancement process, such that the attribute information of each color relating to the selected small region becomes the obtained target value, which is common for all colors.

Also provided is (A) an image enhancement program executed by an image enhancement apparatus, (H) the image enhancement program executing:

(B) a step of generating, based on data of pixels constituting an image, data of histograms for each color, the histograms representing a distribution of the number of pixels with respect to density values of each of the colors of those pixels;

(C) a step of partitioning regions represented by the histograms for each of the colors into at least three small regions according to the magnitude of the density values, based on the generated data of the histograms for each of the colors;

(D) a step of obtaining, for each color, attribute information relating to that small region and selecting at least one small region from the at least three small regions;

(E) a step of selecting from the at least three small regions, as a selected small region, for each color at least one small region whose density values are larger than those of another small region and whose density values are smaller than those of yet another small region;

(F) a step of obtaining a target value that is common for all colors for the attribute information relating to the selected small region, based on the obtained attribute information; and (G) a step of subjecting the image to an enhancement process, such that the attribute information of each of the colors relating to the selected small region becomes the obtained target value, which is common for all colors.

Also provided is (F) an image reading apparatus comprising:

(A) an image reading section that reads in an image from an original document;

(B) a histogram data generation section that, based on data of pixels constituting an image read in with the image reading section, generates data of histograms for each color, the histograms representing a distribution of the number of pixels with respect to density values of each of the colors of those pixels;

(C) an attribute information obtaining section that obtains, for each color, attribute information relating to that small region by partitioning regions represented by the histograms for each of the colors into at least three small regions according to the magnitude of the density values, based on the data of the histograms for each of the colors generated by the histogram data generation section, and selecting at least one small region from the at least three small regions;

(D) a target value obtaining section that obtains a target value that is common for all colors for the attribute information relating to the selected small region, based on the attribute information obtained by the attribute information obtaining section by selecting from the at least three small regions, as a selected small region, for each color at least one small region whose density values are larger than those of another small region and whose density values are smaller than those of yet another small region;

(E) an enhancement processing section that subjects the image to an enhancement process, such that the attribute information of each of the colors relating to the selected small region becomes the target value, which is common for all colors, that has been obtained by the target value obtaining section.

Also provided is (H) an image reading method comprising:

(A) a step of reading an image from an original document;

(B) a step of generating, based on data of pixels constituting the image that has been read in, data of histograms for each color, the histograms representing a distribution of the number of pixels with respect to density values of each of the colors of those pixels;

(C) a step of partitioning regions represented by the histograms for each of the colors into at least three small regions according to the magnitude of the density values, based on the generated data of the histograms for each of the colors;

(D) a step of obtaining, for each color, attribute information relating to that small region by selecting at least one small region from the at least three small regions;

(E) a step of selecting from the at least three small regions, as a selected small region, for each color at least one small region whose density values are larger than those of another small region and whose density values are smaller than those of yet another small region;

(F) a step of obtaining a target value that is common for all colors for the attribute information relating to the selected small region, based on the obtained attribute information; and (G) a step of subjecting the image to an enhancement process, such that the attribute information of each of the colors relating to the selected small region becomes the obtained target value, which is common for all colors.

Also provided is (F) a printing apparatus comprising:

(A) a printing section that prints an image on a medium;

(B) a histogram data generation section that, prior to printing the image with the printing section and based on data of pixels constituting the image, generates data of histograms for each color, the histograms representing a distribution of the number of pixels with respect to density values of each of the colors of those pixels;

(C) an attribute information obtaining section that obtains, for each color, attribute information relating to a small region by partitioning regions represented by the histograms for each of the colors into at least three small regions according to the magnitude of the density values, based on the data of the histograms for each of the colors generated by the histogram data generation section, and selecting at least one small region from the at least three small regions;

(D) a target value obtaining section that obtains a target value that is common for all colors for the attribute information relating to the selected small region, based on the attribute information obtained by the attribute information obtaining section by selecting from the at least three small regions, as a selected small region, for each color at least one small region whose density values are larger than those of another small region and whose density values are smaller than those of yet another small region;

(E) an enhancement processing section that subjects the image to an enhancement process, such that the attribute information of each of the colors relating to the selected small region becomes the target value, which is common for all colors, that has been obtained by the target value obtaining section.

Overview of the Image Reading System

Figure 2:
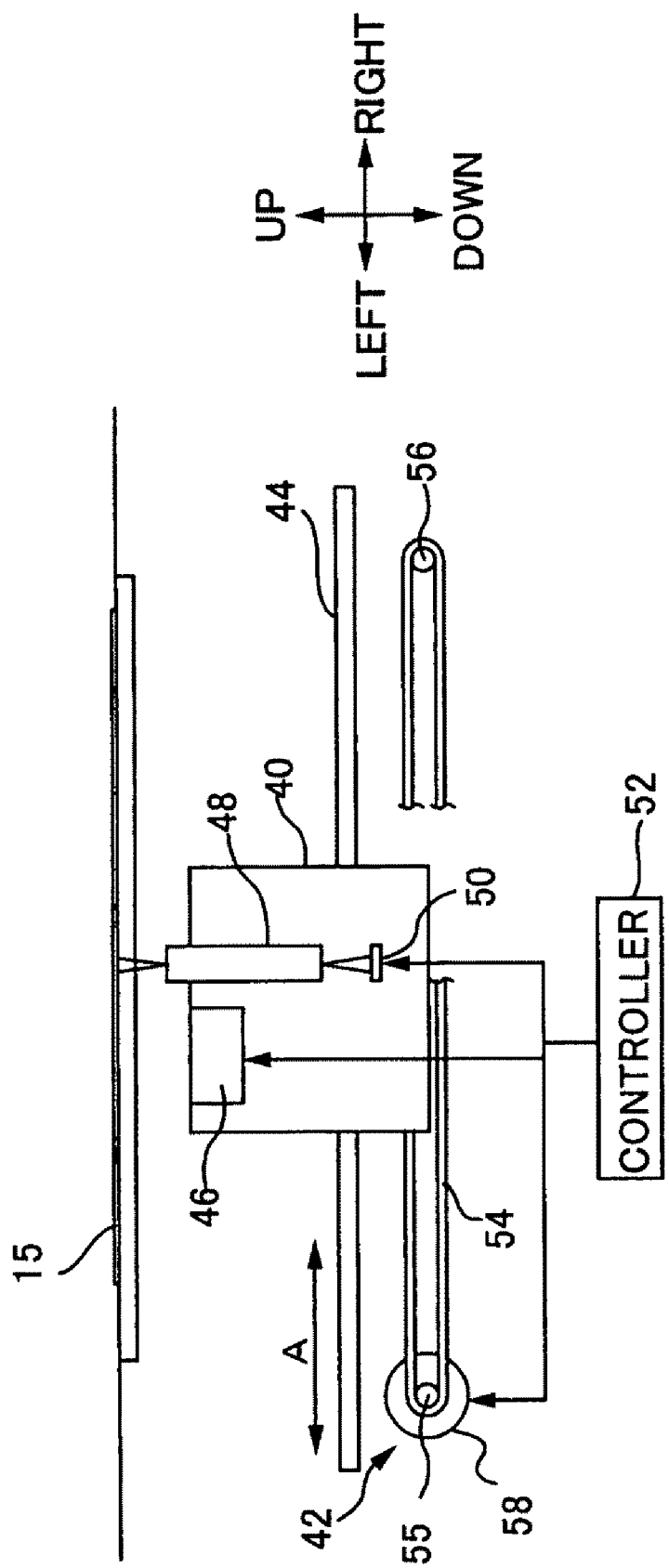
FIG. 2 is an explanatory diagram showing an example of the internal configuration of an image reading apparatus.
Figure 3:
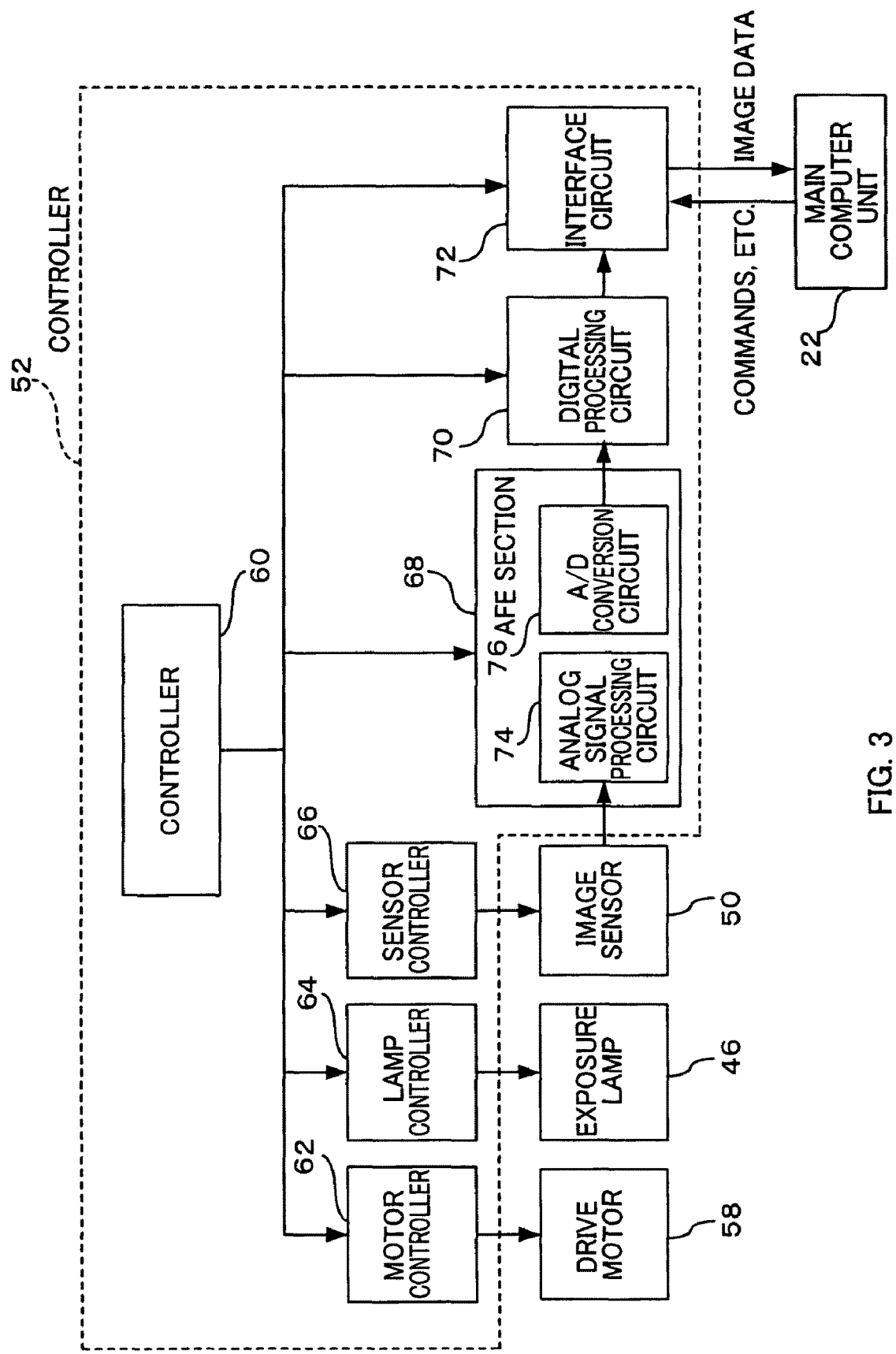
FIG. 3 is an explanatory diagram showing an example of the system configuration of the image reading apparatus.
Figure 4:
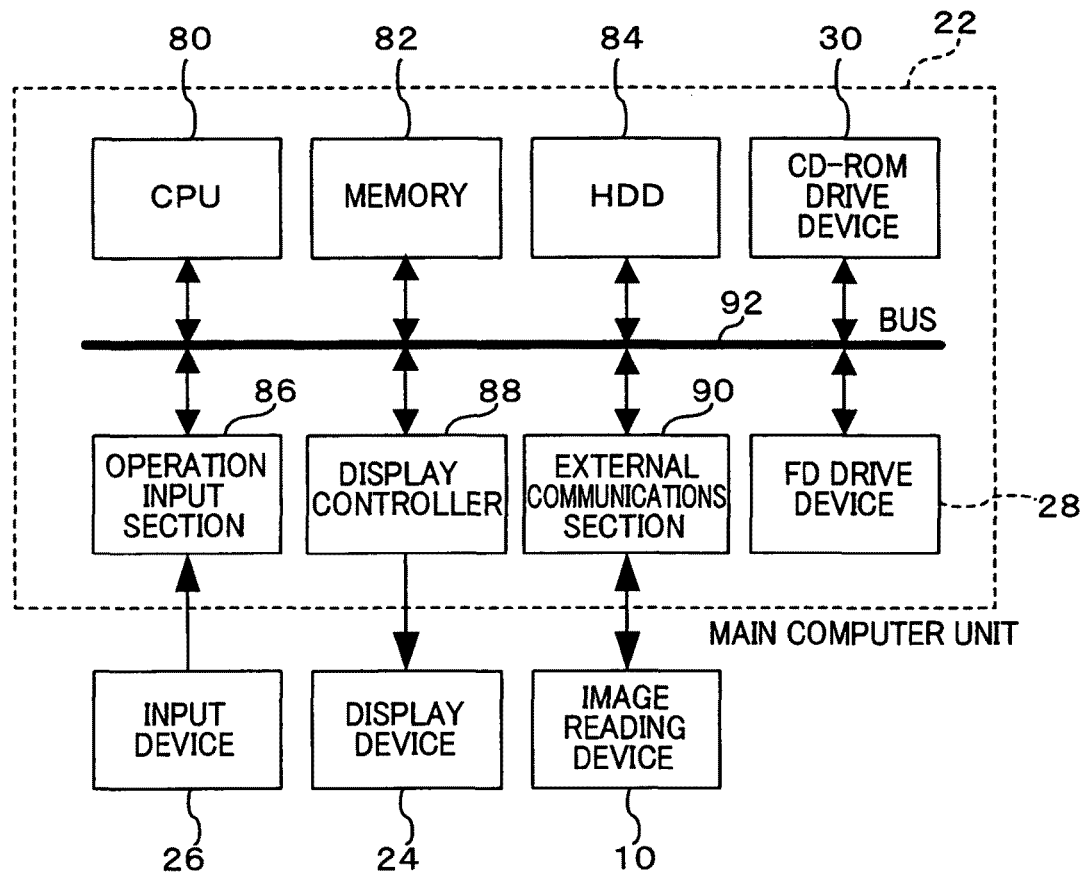
FIG. 4 is an explanatory diagram showing an example of the system configuration of a computer.

A case where an image determining apparatus according to this invention is applied to the image reading system is taken as an example and described below. FIGS. 1 through 4 are diagrams for describing an embodiment of the image reading system applied with the image determining apparatus. FIG. 1 describes an embodiment of the image reading system. FIG. 2 is a diagram describing an example of the internal structure of an image reading device. FIG. 3 is a diagram describing an example of the system configuration of the image reading device. FIG. 4 is a diagram describing the system configuration of a computer system.

As shown in FIG. 1, an image reading system 2 has an image reading device 10 and a computer system 20 that is communicably connected to the image reading device 10 through a wired or a wireless connection. The image reading device 10, as shown in FIG. 1, is a device generally referred to as a scanner, and is provided with an original document platen 12 and an original document platen cover 14 that opens and closes the upper surface portion of the original document platen 12. An original document 15 whose image is to be read is set on the original document platen 12. The original document plate cover 14 is provided at the rear end portion of the original document platen 12 in such a manner that it can open and close about hinge sections 18.

On the other hand, as shown in FIG. 1, the computer system 20 is for example provided with a main computer unit 22, a display device 24, and an input device 26. The main computer unit 22 is constituted by any of various types of computers such as a personal computer. Here, a reading device 32 such as a FD drive device 28 or a CD-ROM drive device 30 is provided in the main computer unit 22. It is also possible for the main computer unit 22 to be provided with a MO (Magnet Optical) disk drive device or a DVD drive device as well. The display device 24 is constituted by any one of various display devices, including CRT displays, plasma displays, and liquid crystal displays. The input device 26 is constituted by a keyboard 34 and a mouse 36, for example. It should be noted that here the display device 24 corresponds to the "image display section." The input device 26, such as the keyboard 34 and the mouse 36, corresponds to the "operation input section."

Image Reading Device

As shown in FIG. 2, within the original document platen 12 of the image reading device 10 are provided a carriage 40, a drive mechanism 42 that moves the carriage 40 parallel to direction of the arrow A in the drawing while keeping it a predetermined distance from the original document platen 12, and a guide 44 for supporting the carriage 40 while guiding its movement.

The carriage 40 is provided with an exposure lamp 46 that serves as a light source for irradiating light onto the original document 15 through the original document platen 12, a lens 48 on which the reflection light that has been reflected by the original document 15 is incident, and an image sensor 50 that is incorporated into the carriage 40 and that receives the reflection light through the lens 48. The image sensor 50 is constituted by, for example, a linear CCD sensor in which photoelectric conversion elements such as photodiodes for converting light signals into electrical signals are disposed in rows. The data of the image that is read by the image sensor 50 are output to a controller 52.

The drive mechanism 42 is provided with a timing belt 54 that is connected to the carriage 40, a pair of pulleys 55 and 56 between which the timing belt 54 is engaged, and a drive motor 58 for rotatively driving the one pulley 55. The driving of the drive motor 58 is controlled by control signals from the controller 52.

As shown in FIG. 3, the controller 52 is provided with a controller 60, a motor controller 62, a lamp controller 64, a sensor controller 66, an AFE (Analog Front End) section 68, a digital processing circuit 70, and an interface circuit 72. The AFE (Analog Front End) section 68 is provided with an analog signal processing circuit 74 and an A/D conversion circuit 76.

The controller 60 controls the motor controller 62 and the lamp controller 64, the sensor controller 66, the AFE (Analog Front End) section 68, the digital processing circuit 70, and the interface circuit 72, based on commands from the main computer unit 22, for example. The motor controller 62 controls the driving of the drive motor 58 for moving the carriage 40 based on commands from the controller 60. The lamp controller 64 controls the emission of light by the exposure lamp 46. The sensor controller 66 performs control of the image sensor 50.

The analog signal processing circuit 74 of the AFE (Analog Front End) section 68 performs signal processing on the analog signals of the image that has been read by the image sensor 50. The A/D conversion circuit 76 of the AFE (Analog Front End) section 68 A/D converts the signal of the image that has been signal processed by the analog signal processing circuit 74 into a digital signal.

The digital processing circuit 70 executes digital signal processing on the digital signals that are sent from the A/D conversion circuit 76 of the AFE (Analog Front End) section 68. Here, specifically, various types of image processing is executed, including enhancements such as shading enhancement. The digital signals on which digital signal processing has been executed are output to the outside, that is, here the main computer unit 22 that is connected to the image reading device 10, by the interface circuit 72 as data (image data) of the image that has been read from the original document 15. In addition to this, the interface circuit 72 receives commands from the main computer unit 22 to the image reading device 10, for example.

Main Computer Unit

As shown in FIG. 4, the main computer unit 22 is provided with a CPU 80, a memory 82, a HDD (hard disk drive device) 84, an operation input section 86, a display controller 88, an external communications section 90, and a bus 92. In addition to these, the main computer unit 22 is also provided with the CD-ROM drive device 30 and the FD drive device 28 described earlier. The CPU 80, the memory 82, the HDD (hard disk drive device) 84, the CD-ROM drive device 30, the FD drive device 28, the operation input section 86, the display controller 88, and the external communications section 90 are communicably connected to one another via the bus 92.

The CPU 80 carries out the overall control of the main computer unit 22. The memory 82 is for holding the programs that are executed by the CPU 80 and various types of data such as the working data that are used by those programs. The HDD (hard disk drive device) 84 stores not only the Operating System (OS) that is run on the CPU 80 but also various programs, such as various types of application programs and drivers, and various types of data such as image data. The operation input section 86 is connected to the input device 26, such as the keyboard 34 or the mouse 36, and through these input devices 26 it obtains information that has been input by the user. The display controller 88 controls the images that are displayed on the screen of the display device 24, for example, based on commands from the CPU 80. The external communications section 90 is for performing communication between the various peripheral devices, such as the image reading device 10, connected to outside of the main computer unit 22.

The CPU 80 reads programs from the HDD (hard disk drive device) 84 and runs those programs under the Operating System (OS). The programs that are executed here are not only various application programs but also the various drivers for controlling the image reading device 10, the operation input section 86, and the display controller 88, for example.

The driver for controlling the image reading device 10 is generally called the scanner driver. The scanner driver is a program that is installed on the main computer unit 22 through various types of communications lines, such as the Internet, or by way of various types of storage media such as CD-ROM and floppy disk (FD). By installing the scanner driver on the main computer unit 22, the main computer unit 22 functions as a control device for controlling the image reading device 10.

Scanner Driver

Figure 5:
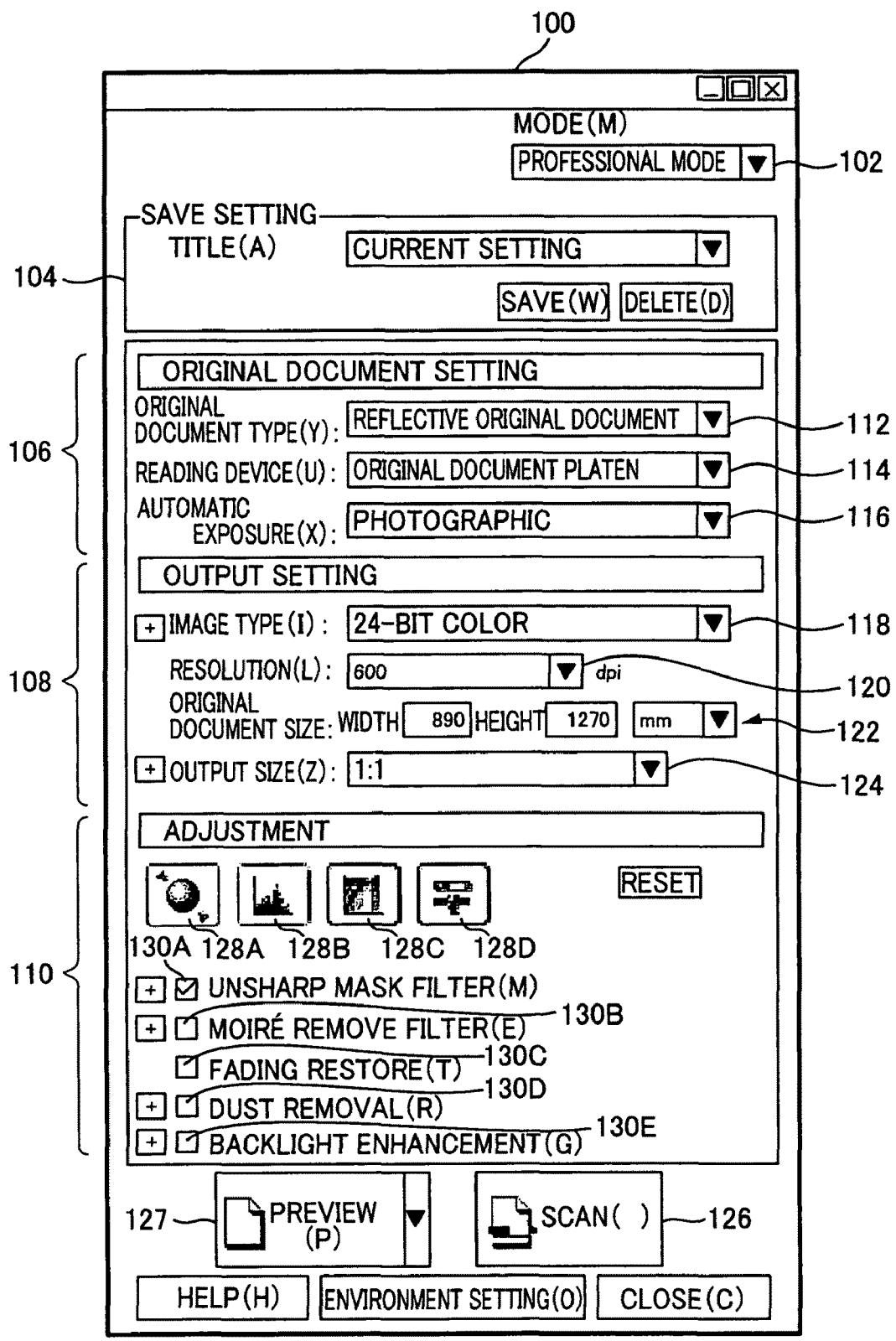
FIG. 5 is an explanatory diagram showing an example of a main dialog box of a scanner driver.

An example of the user interface of the scanner driver is described next. FIG. 5 shows a main dialog box 100 of this user interface. This user interface is displayed on the display screen of the display device 24 by the CPU 80 of the main computer unit 22 through the display controller 88. While viewing the dialog box 100 of the user interface that is displayed on the display screen of the display device 24, the user can alter the various settings of the scanner driver using the input device 26, such as the keyboard 34 or the mouse 36.

The main dialog box 100 includes a "mode selection field" 102, a "save setting field" 104, an "original document setting field" 106, an "output setting field" 108, and an "adjustment field" 110. In the "mode selection field" 102 it is possible for the user to select one mode from among a plurality of mode types. Here, the "professional mode" has been selected. Also in the "save setting field" 104, the user can save or delete the current settings by clicking a "save button" or a "delete button."

In the "original document setting field" 106, the user can alter the settings for an "original document type" 112, a "reading device" 114, and an "automatic exposure" 116. In the "original document type" 112, it is possible to select the type of the original document that has been set. For example, it is possible to select a "reflective original document" or a "film", for example. In the "reading device" 114, it is possible to select an "original document platen", for example. In the "automatic exposure" 116, it is possible to change the exposure settings to those suited for the original document type to be read. For example, it is possible to select "for photographs" or "for paper documents", for example.

In the "output setting field" 108, the user can carry out various settings relating to the image output. Specifically, in the "output setting field" 108, it is possible to adjust the settings for an "image type" 118 of the output image, a "resolution" 120 when reading, an "original document size" 122 when reading, and an "output size" 124. In the "image type" 118, it is possible to make a selection for the number of colors of the read image from among the three options of color, grayscale, and monochrome. In the "resolution" 120, it is possible to adjust the setting of the resolution of the image that is read. In the "original document size" 122, it is possible to adjust the setting of the size of the image to be read.

The scanner driver controls the external image reading device 10 based on information that has been set by the user through the dialog box 100 when the user clicks the "scan button" 126 in the lower section of the dialog box 100, and reads the image from original document that has been set in the image reading device 10. The data of the image that has been read are sent to the main computer unit. When the user clicks a "preview button" 127 located in the lower section of the dialog box 100, the scanner driver displays a preview window for displaying the image that has been read by the image reading device 10 on the display screen of the display device 24.

Additionally, the scanner driver has the function of adjusting the image that has been read by the image reading device 10. Adjustment of the image that has been read is carried out through the "adjustment field" 110 of the main dialog box 100. The "adjustment field" 110 is provided with four buttons and five check boxes for adjusting the image that has been read by the image reading device 10. The four buttons 128A, 128B, 128C, and 128D are the automatic exposure button 128A, the histogram adjustment button 128B, the density enhancement button 128C, and the image adjustment button 128D respectively. Also five check boxes 130A, 130B, 130C, 130D, and 130E are the check box 130A for an unsharp mask filter, the check box 130B for a moiré remove filter, the check box 130C for fading restore, the check box 130D for dust removal, and the checkbox 130E for backlight enhancement respectively.

The automatic exposure button 128A is the button that is clicked when the user would like the exposure to be adjusted automatically. The histogram adjustment button 128B is the button that is clicked when the user would like to adjust the contrast of the image. A histogram adjustment dialog box is called up when the histogram adjustment button 128B has been clicked. The density enhancement button 128C is the button that is clicked when the user would like to enhance the balance of the image density. A dialog box for density enhancement is called up when the density enhancement button 128C has been clicked. The image adjustment button 128D is the button that is clicked when the user wants to adjust the brightness, contrast, saturation, and color balance of the image. A dialog box for image adjustment is called up when the image adjustment button 128D is clicked.

On the other hand, the check box 130A for the unsharp mask filter is the check box for specifying whether or not to use the unsharp mask filter, and is checked when the user wants to sharpen up the image. The check box 130B for the moiré remove filter is the check box for specifying whether or not to use a filter for removing moiré (checkered shading), which occurs when scanning the printed material, and is checked by the user when the moiré is noticeable. The check box 130C for fading restore is checked when the colors of a faded photograph are to be restored. The check box 130D for dust removal is checked when the user wants to reduce dust on the film during film scanning. Further, the checkbox 130E for backlight enhancement is checked when the user wants to perform backlight enhancement to the read image. This backlight enhancement is described in detail later.

Image Adjustment

Figure 6:
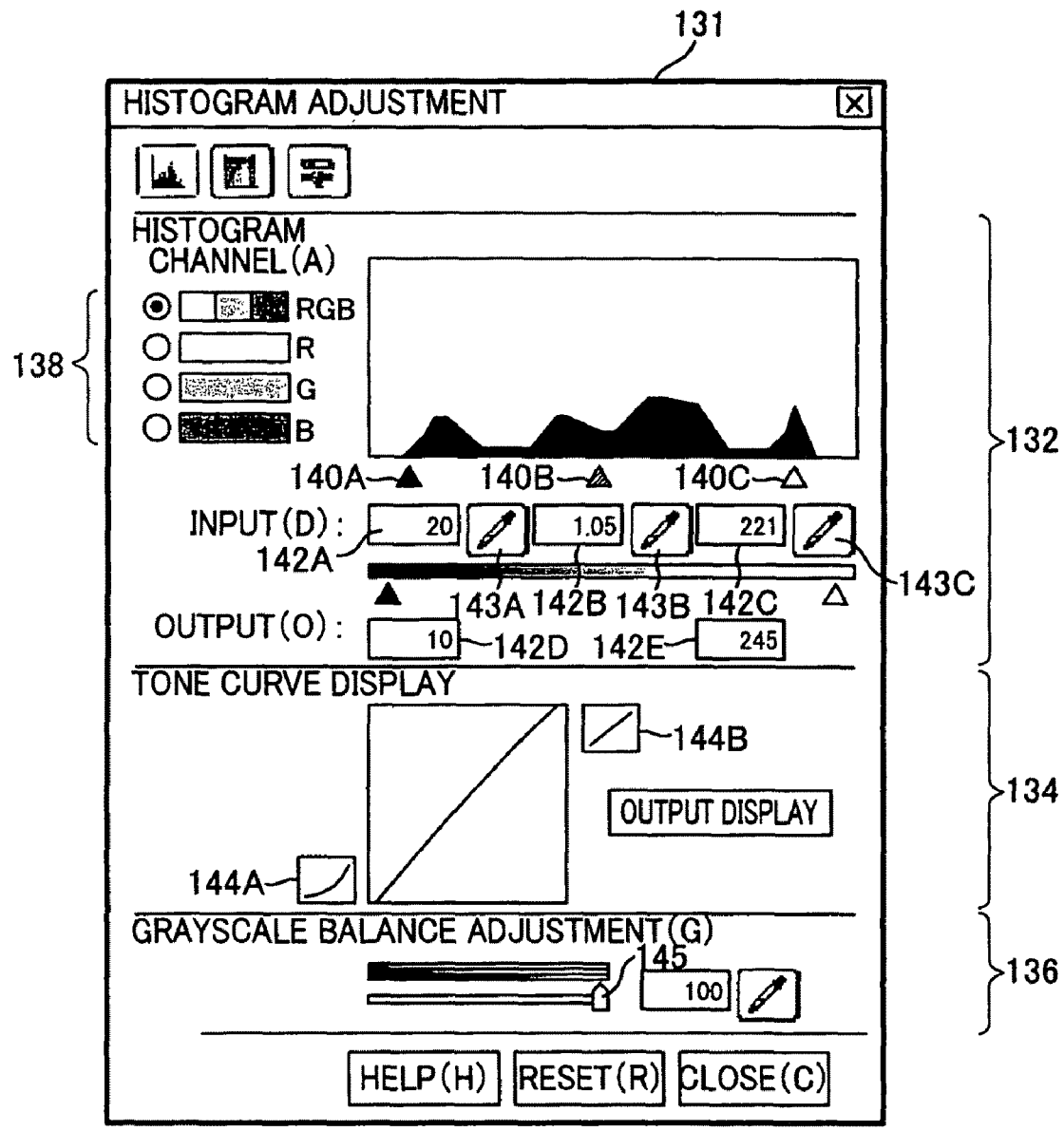
FIG. 6 is an explanatory diagram showing an example of a dialog box for a histogram adjustment.
Figure 7:
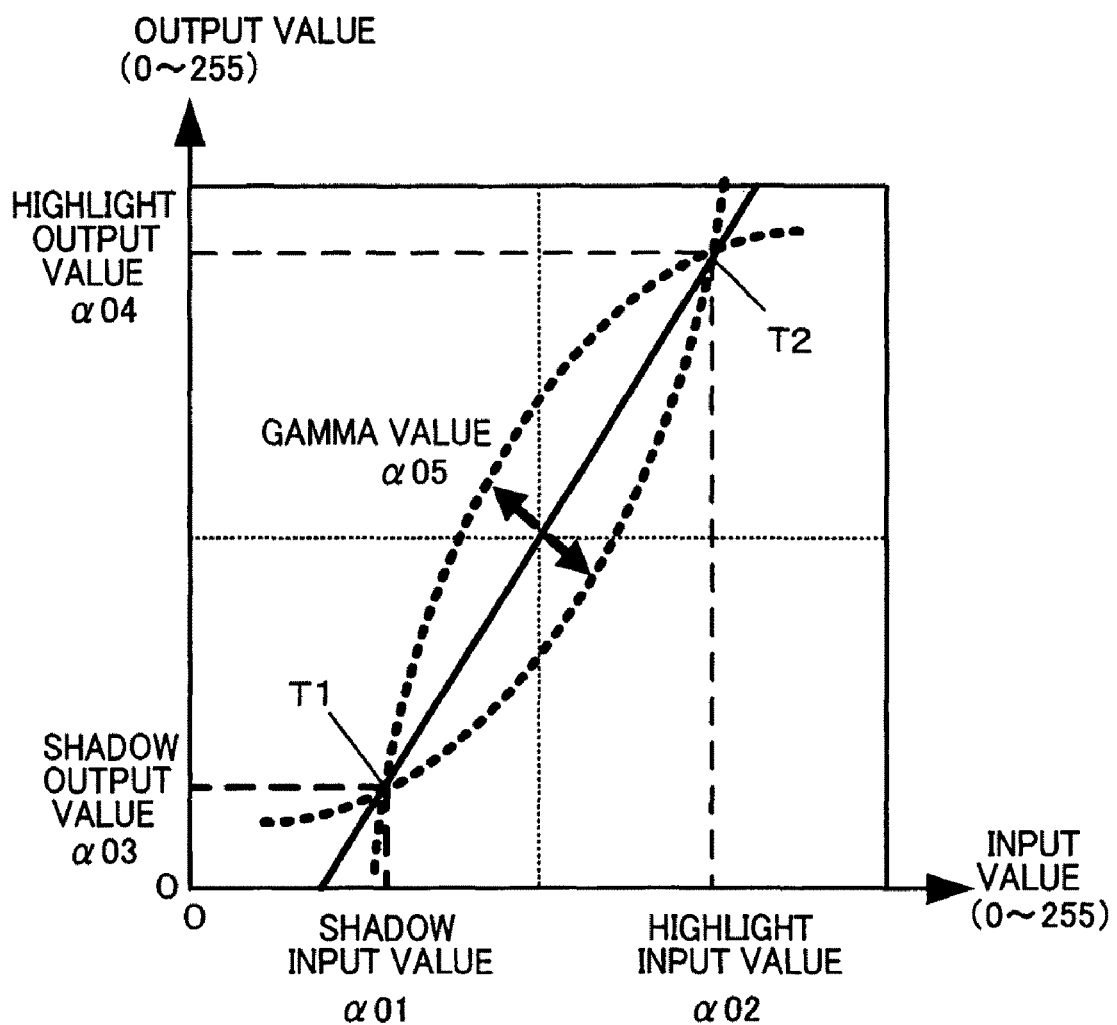
FIG. 7 is an explanatory diagram of a tone curve adjustment method.
Figure 8:
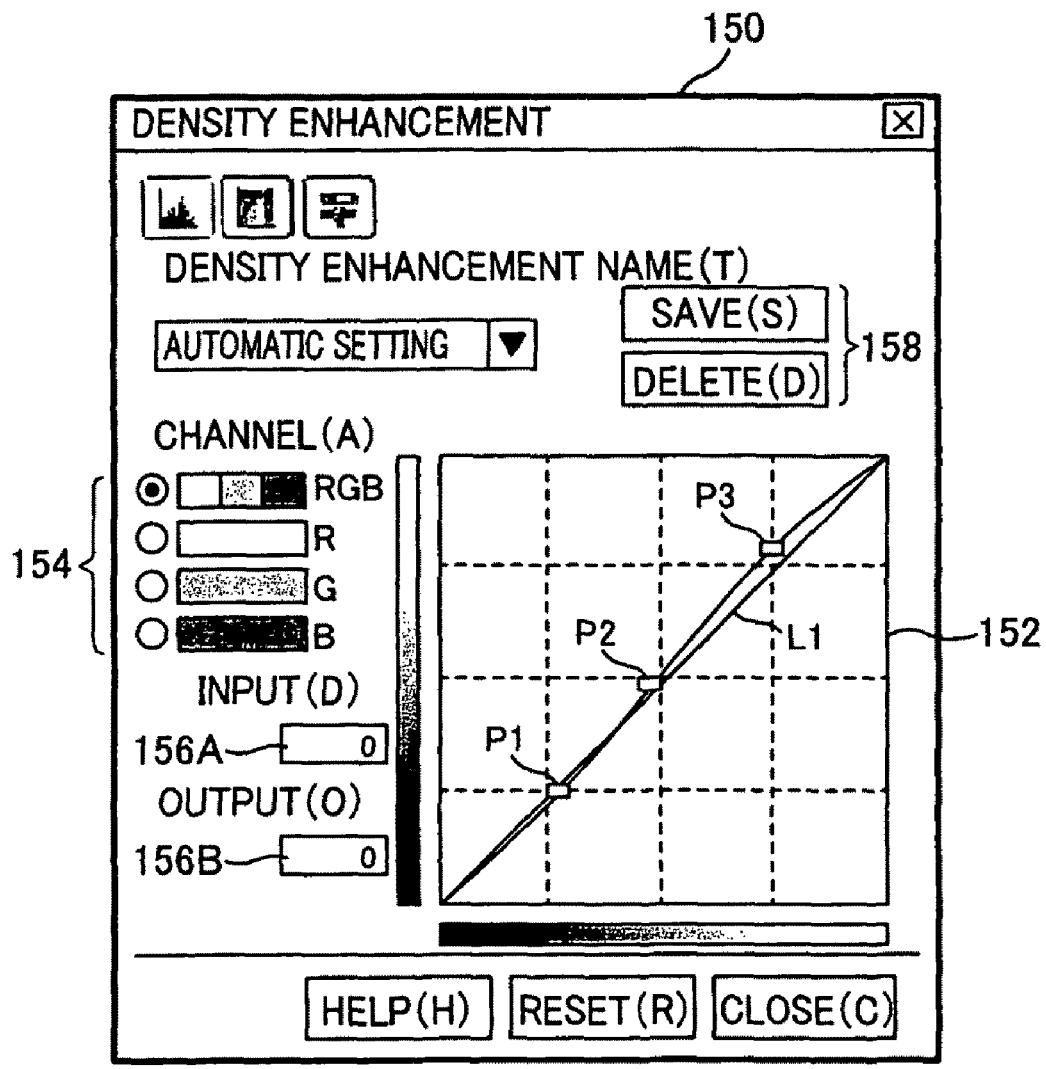
FIG. 8 is an explanatory diagram showing an example of a main dialog box for density enhancement.
Figure 9:
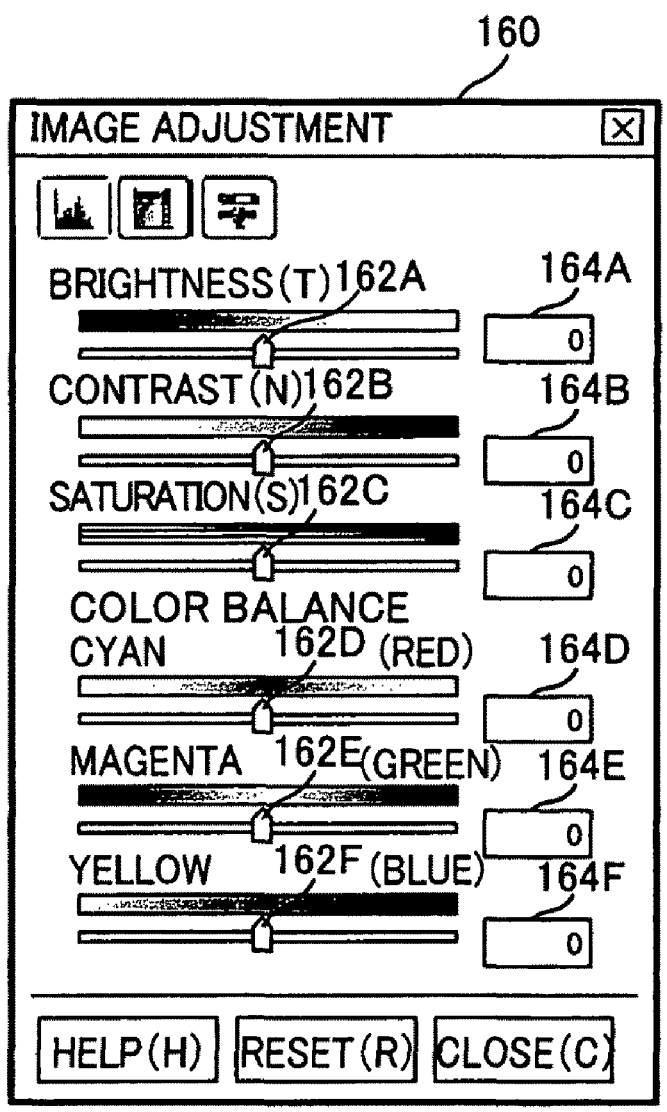
FIG. 9 is an explanatory diagram showing an example of a dialog box for an image adjustment.

Next, a histogram adjustment, a density enhancement, and an image adjustment for adjusting the image are described. FIGS. 6 through 9 are for describing the histogram adjustment, the density enhancement, and the image adjustment, respectively. FIG. 6 shows the dialog box for the histogram adjustment. FIG. 7 describes an overview of a specific adjustment through the histogram adjustment. FIG. 8 shows the dialog box for the density enhancement. FIG. 9 shows the dialog box for the image adjustment.

Histogram Adjustment

In the "histogram adjustment", the contrast of an image, for example, is adjusted so as to improve the appearance of the image that has been read. As shown in FIG. 6, a dialog box 131 for histogram adjustment is provided with a histogram display field 132 in which a histogram of the image to be edited is displayed, a tone curve display field 134 in which the tone curve that expresses the outcome of adjustment by the histogram is displayed, and a grayscale balance adjustment field 136 for adjusting the grayscale balance in order to exclude color fogging. Here, the "histogram" displays the distribution of the brightness and the color of the overall image, and expresses the data distribution of the image from black to white (pixel number) on a graph.

The histogram display field 132 is provided with a channel field 138 for selecting the type (channel (color)) of the histogram to be displayed. In the channel field 138, it is possible to select from among the four options of all RGB (red, green, blue) colors, R (red) only, G (green) only, and B (blue) only. When the user wants to adjust all the RGB (red, green, blue) colors, and selects the uppermost switch in the channel field 138, a histogram of all RGB (red, green, blue) colors is displayed on the right side. For example, when the user wants to adjust R (red) only, and selects the second switch from the top of the channel field 138, a histogram of R (red) only is displayed on the right side.

When adjusting the histogram that has been displayed, three sliders 140A, 140B, 140C that are provided below the histogram displayed are used for this adjustment. The three sliders 140A, 140B, 140C are the slider 140A for adjusting shadow, the slider 140B for adjusting gamma, and the slider 140C for adjusting highlight respectively. The slider 140A for adjusting the shadow is displayed by a solid black triangle. The slider 140B for adjusting gamma is displayed by a solid gray triangle. The slider 140C for adjusting highlighting is displayed by an empty triangle. When an adjustment is performed by using these three sliders 140A, 140B, and 140C, the three sliders 140A, 140B, 140C are respectively moved in the left and right direction independently. Specifically, the slider 140A for adjusting shadow is moved to a position slightly to the right side from the left end of the histogram peak. The slider 140C for adjusting highlighting is moved to a position slightly to the left side from the right end of the histogram peak. The slider 140B for adjusting gamma is moved to the left and right between the slider 140A for adjusting shadow and the slider 140C for adjusting highlighting so as to adjust the contrast of the intermediate section to an appropriate contrast. By doing this, the balance of the overall contrast of the image to be edited becomes good, and the appearance of the image can be improved.

The histogram display field 132 is also provided with numerical value input fields 142A, 142B, and 142C for independently and directly specifying with numerical values the positions of the three sliders 140A, 140B, and 140C, respectively. A shadow input value is input to the numerical value input field 142A. A gamma value is input to the numerical value input field 142B. A highlight input value is input to the numerical value input field 142C. Thus, the shadow input value, the highlight input value, and the gamma value can be easily specified by directly inputting the numerical values to each of the numerical value input fields 142A, 142B, and 142C.

To the right of these three numerical value input fields 142A, 142B, and 142C are provided pipette buttons 143A, 143B, and 143C respectively. These pipette buttons 143A, 143B, and 143C are buttons for directly specifying a point on the image to be edited that is displayed on the preview screen, which is displayed separately from the dialog box for histogram adjustment. Numerical values corresponding to a point (pixel) that has been designated on the image to be edited on the preview screen are directly input to the three numerical value input fields 142A, 142B, and 142C using these pipette buttons 143A, 143B, and 143C.

Further, below these two numerical value input fields 142A and 142C to which the shadow input value and the highlight input value are input, are provided two numerical value input fields 142D and 142E respectively. A shadow output value that corresponds to the shadow input value is input to the numerical value input field 142D on the left side. A highlight output value that corresponds to the highlight input value is input to the numerical value input field 142E on the right side.

There are four kinds of adjustment possibilities using these sliders 140A, 140B, and 140C and the numerical value input fields 142A, 142B, 142C, 142D, and 142E, and these are all RGB (red, green, blue) colors, R (red) only, G (green) only, and B (blue) respectively.

FIG. 7 describes this histogram adjustment in detail. In the histogram adjustment, the tone curve that expresses the correlation between the input data and the output data, such as shown in FIG. 7, is defined based on the shadow input value $\alpha 01$, the shadow output value $\alpha 03$, the highlight input value $\alpha 02$, the highlight output value $\alpha 04$, and the gamma value $\alpha 05$, which are set through the sliders 140A, 140B, and 140C or the numerical value input fields 142A, 142B, 142C, 142D, and 142E. In other words, the tone curve that is defined here is formed passing through a point T1 (also called a shadow point) defined by the shadow input value $\alpha 01$ and the shadow output value $\alpha 03$ that have been set and a point T2 (also called a highlight point) defined by the highlight input value $\alpha 02$ and the highlight output value $\alpha 04$ that have been set. Further, the tone curve is formed bulging toward either of one side of a straight line that connects these point T1 and point T2, in accordance with the gamma value $\alpha 05$ that has been set. Thus, the tone curve that expresses the correlation between the input data and the output data is defined based on the shadow input value $\alpha 01$, the shadow output value $\alpha 03$, the highlight input value $\alpha 02$, the highlight output value $\alpha 04$, and the gamma value $\alpha 05$ that have been set in this way. It should be noted that the tone curve is defined for each color of R (red), G (green), and B (blue) respectively.

The tone curve that has been defined in this way is displayed in the tone curve display field 134 as shown in FIG. 6.

In the tone curve display field 134, the tone curve that corresponds to the outcome of the adjustment performed through the histogram display field 132 is displayed. The tone curve can be more finely tuned in the tone curve display field 134 by adjusting the gradation outside the point T1 (shadow point) or the point T2 (highlight point). Specifically, the user clicks on end portion curve shape change buttons 144A and 144B, which are provided at the lower left side and the upper right side of the tone curve respectively, and selects the desired end portion curve shape from the pull-down menu that is displayed. Here, for example, the user can select the end portion curve shape from the three options which are "boost," "normal," and "soft." Here, "boost" is selected when the user wants to remove unevenness by making a portion of a white background stark white or by making a portion of a black background pitch black. Also "normal" is selected when the highlight portion and the shadow portion are to be expressed as they are. "Soft" is selected when reverting a stark white portion to the original white background or when reverting a pitch black portion to the original black background.

A slider 145 for adjusting the grayscale balance is provided in the grayscale balance adjustment field 136. By moving the slider 145 to the left and right, it is possible to adjust the grayscale balance and remove color fogging.

Density Enhancement

"Density enhancement" is the adjustment that is used when partially changing the expression of lightness and darkness in the image. Specifically, with "density enhancement," the tone curve is adjusted so as to improve the appearance of the image that has been read. In other words, by adjusting the density curve (tone curve) which changes to a shadow (darkest), a mid-tone (intermediate tone), and a highlight (lightest), it is possible to produce a balanced brightness and contrast in the image overall. To this end, as shown in FIG. 8, a dialog box 150 for density enhancement is provided with a tone curve display section 152 and a channel field 154 for selecting the type (channel (color)) of the tone curve that is displayed on the tone curve display section 152.

In the channel field 154, it is possible to make a selection from among the four options of all RGB (red, green, blue) colors, R (red) only, G (green) only, and B (blue) only. When the user wants to adjust all RGB (red, green, blue) colors, and selects the uppermost switch of the channel field 154, the tone curves of all the RGB (red, green, blue) colors are displayed to the right side. For example, when the user wants to adjust R (red) only, and selects the second switch from the top of the channel field 154, the tone curve of R (red) only is displayed to the right side.

The tone curve whose horizontal axis is the input value and vertical axis is the output value is displayed in the tone curve display section 152. If settings have been made such that the output value does not change from the input value, the tone curve becomes a straight light as shown by line L1 in the drawing.

If the tone curve is to be adjusted, then any point is set on the tone curve that is displayed in the tone curve display section 152 and the tone curve is adjusted by shifting this point in the up, down, left, and right directions. In this embodiment, three points P1, P2, and P3 are arbitrarily set on the tone curve that is displayed in the tone curve display section 152, and these three points P1, P2, and P3 are shifted by moving them in the up, down, left, and right directions from the reference line L1 respectively. By doing this, the user forms a desired tone curve on the tone curve display section 152. It should be noted that coordinates of each of the three points P1, P2, and P3 also can be set through two numerical value input fields 156A and 156B which are provided to the left side of the tone curve display section 152 respectively. Here, by entering the input value to the upper numerical value input field 156A and entering the output value to the lower numerical value input field 156B, it is possible to set the coordinates for each of the points P1, P2, and P3 respectively.

Four types of tone curve adjustment are possible, those being all RGB (red, green, blue) colors, R (red) only, G (green) only, and B (blue) only. The tone curve settings can be saved through a density enhancement setting save field 158 that is provided in an upper portion of the density enhancement dialog box 150.

Image Adjustment

"Image adjustment" encompasses four types of adjustment, such as (1) a brightness adjustment, (2) a contrast adjustment, (3) a saturation adjustment, and (4) a color balance adjustment, as shown in an image adjustment dialog box 160 of FIG. 9. Further, "(4) the color balance adjustment" encompasses three types of adjustments, such as an adjustment between cyan (C) and red (R), an adjustment between magenta (M) and green (G), and an adjustment between yellow (Y) and blue (B).

(1) Brightness Adjustment

"(1) The brightness adjustment" is performed when the image is too bright or too dark. "(1) The brightness adjustment" can be performed by moving a slider 162A left and right or by directly inputting the numerical value into a numerical value input field 164A that is provided to the right side of the slider 162A.

(2) Contrast Adjustment

"(2) The contrast adjustment" is performed to enhance the contrast, or conversely, to reduce the difference between light and dark. "(2) The contrast adjustment" can be performed by moving a slider 162B left and right or by directly inputting the numerical value into a numerical value input field 164B that is provided to the right side of the slider 162B.

(3) Saturation Adjustment

"(3) The saturation adjustment" is performed when a more vivid color tone is desired. "(3) The saturation adjustment" can be performed by moving a slider 162C left and right or by directly inputting the numerical value into a numerical value input field 164C that is provided to the right side of the slider 162C.

(4) Color Balance Adjustment

"(4) The color balance adjustment" is performed when the image has a red or blue tone, for example. "(4) The color balance adjustment" can be performed by moving each of sliders 162D, 162E, and 162F left and right or by directly inputting the numerical value into numerical value input fields 164D, 164E, and 164F, which are provided to the right side of each of the sliders 162D, 162E, and 162F, respectively. By doing this, it is possible to adjust the image to an appropriate color tone. Specifically, by moving the slider 162D for adjustment between "cyan (C) and red (R)" to the left or right, it is possible to adjust the strength of cyan (C) and red (R). By moving the slider 162E for adjustment between "magenta (M) and green (G)" to the left or right, it is possible to adjust the strength of magenta (M) and green (G). By moving the slider 162F for adjustment between "yellow (Y) and blue (B)" to the left or right, it is possible to adjust the strength of yellow (Y) and blue (B).

Here, "(1) the brightness adjustment" and "(4) the color balance adjustment" each is processing in which conversion for shifting the overall darkness is performed for all three colors R (red), G (green), and B (blue), or for each individual color. "(2) The contrast adjustment" is a processing in which conversion for strengthening or weakening the change in darkness is performed for all three colors R (red), G (green), and B (blue).

On the other hand, "(3) the saturation adjustment" is a processing that employs the following conversion formulas (1) through (3) to convert the data of each of the colors R (red), G (green), and B (blue) respectively. Here, the input data of each of the colors R (red), G (green), and B (blue) are indicated by "R", "G", and "B" respectively. The output data of each of the colors R (red), G (green), and B (blue) are indicated by "R'", "G'", and "B'" respectively.

$$R'=S11\times R+S12\times G+S13\times B \tag{1}$$

$$G'=S21\times R+S22\times G+S23\times B \tag{2}$$

$$B'=S31\times R+S32\times G+S33\times B \tag{3}$$

Here, S11, S12, S13, S21, S22, S23, S31, S32, and S33 are coefficients that are set according to the value of the saturation that has been set. If the saturation is to be increased, then S11, S22, and S33 are set to values that are greater than 1, and on the other hand, S12, S13, S21, S23, S31, and S32 are set to negative values. In this manner, "(3) the saturation enhancement" is carried out.

Setting Data

FIGS. 10A through 10C are for describing the data that are set through the histogram adjustment, the density enhancement, and the image adjustment, respectively. FIG. 10A describes the data that are set through the histogram adjustment. FIG. 10B describes the data that are set through the density enhancement. FIG. 10C describes the data that are set through the image adjustment.

As shown in FIG. 10A, in the case of the histogram adjustment, the shadow input values $\alpha 11$, $\alpha 21$, $\alpha 31$, the shadow output values $\alpha 13$, $\alpha 23$, $\alpha 33$, the highlight input values $\alpha 12$, $\alpha 22$, $\alpha 32$, the highlight output values $\alpha 14$, $\alpha 24$, $\alpha 34$, and the gamma values $\alpha 15$, $\alpha 25$, $\alpha 35$ of each of the colors R (red), G (green), and B (blue) are set as data. In addition to this, here, data $\alpha 41$ and $\alpha 42$ of the "lower end portion shape" and the "upper end portion shape" are set as data for the end portion shape of the tone curve, and an adjustment value $\alpha 51$ for the grayscale balance adjustment is set as data. The scanner driver stores these data $\alpha 11$, $\alpha 21$, $\alpha 31$, $\alpha 13$, $\alpha 12$, $\alpha 22$, $\alpha 32$, $\alpha 23$, $\alpha 33$, $\alpha 14$, $\alpha 24$, $\alpha 34$, $\alpha 15$, $\alpha 25$, $\alpha 35$, $\alpha 41$, $\alpha 42$, and $\alpha 51$ as setting data. It should be noted that in addition to these setting data $\alpha 11$, $\alpha 21$, $\alpha 31$, $\alpha 13$, $\alpha 23$, $\alpha 33$, $\alpha 12$, $\alpha 22$, $\alpha 32$, $\alpha 14$, $\alpha 24$, $\alpha 34$, $\alpha 15$, $\alpha 25$, $\alpha 35$, $\alpha 41$, $\alpha 42$, and $\alpha 51$ being set by the user through the histogram adjustment dialog box 131 illustrated in FIG. 6, for example, it is also possible for those setting data to be set automatically through a computation, for example, by the scanner driver. The scanner driver executes image adjustment on the input image based on the stored setting data $\alpha 11$, $\alpha 21$, $\alpha 31$, $\alpha 13$, $\alpha 23$, $\alpha 33$, $\alpha 12$, $\alpha 22$, $\alpha 32$, $\alpha 14$, $\alpha 24$, $\alpha 34$, $\alpha 15$, $\alpha 25$, $\alpha 35$, $\alpha 41$, $\alpha 42$, and $\alpha 51$.

In the case of the density enhancement, as shown in FIG. 10B, the input coordinates $\beta 11$, $\beta 13$, $\beta 21$, $\beta 23$, $\beta 31$, $\beta 33$, ... and output coordinates $\beta 12$, $\beta 14$, $\beta 22$, $\beta 24$, $\beta 32$, $\beta 34$, ..., for a plurality of points P1, P2, P3, ... that have been set on the tone curves of the colors R (red), G (green), and B (blue), respectively, are set as data. The scanner driver stores the input coordinates $\beta 11$, $\beta 13$, $\beta 21$, $\beta 23$, $\beta 31$, $\beta 33$, ... and the output coordinates $\beta 12$, $\beta 14$, $\beta 22$, $\beta 24$, $\beta 32$, $\beta 34$, ... for a plurality of the points P1, P2, P3, ... as setting data. It should be noted that in addition to the setting data $\beta 11$, $\beta 13$, $\beta 21$, $\beta 23$, $\beta 31$, $\beta 33$, ... $\beta 12$, $\beta 14$, $\beta 22$, $\beta 24$, $\beta 32$, $\beta 34$, ... being set by the user through the density enhancement dialog box 150 described in FIG. 8, for example, it is also possible for those setting data to be set automatically through a computation, for example, by the scanner driver. The scanner driver executes the density enhancement based on the stored setting data β11, β13, β21, β23, β31, β33, . . . and β12, β14, β22, β24, β32, β34, In the case of image adjustment, as shown in FIG. 10C, a setting value γ1 for "(1) the brightness adjustment," a setting value γ2 for "(2) the contrast adjustment," a setting value γ3 for "(3) the saturation adjustment," and setting values γ4, γ5, γ6 for "(4) the color balance adjustment" are set. There are three settings for the "(4) color balance adjustment," which are the setting value γ4 between cyan (C) and red (R), the setting value γ5 between magenta (M) and green (G), and the setting value γ6 between yellow (Y) and blue (B). The scanner driver stores the setting values γ1, γ2, γ3, γ4, γ5, and γ6 as setting data. It should be noted that in addition to the setting data γ1, γ2, γ3, γ4, γ5, and γ6 being set by the user through the image adjustment dialog box 160 shown in FIG. 9, it is also possible for the setting data to be set automatically through a computation by the scanner driver, for example. The scanner driver executes image adjustment based on the stored setting data γ1, γ2, γ3, γ4, γ5, and γ6.

Adjustment Procedure

Figure 11:
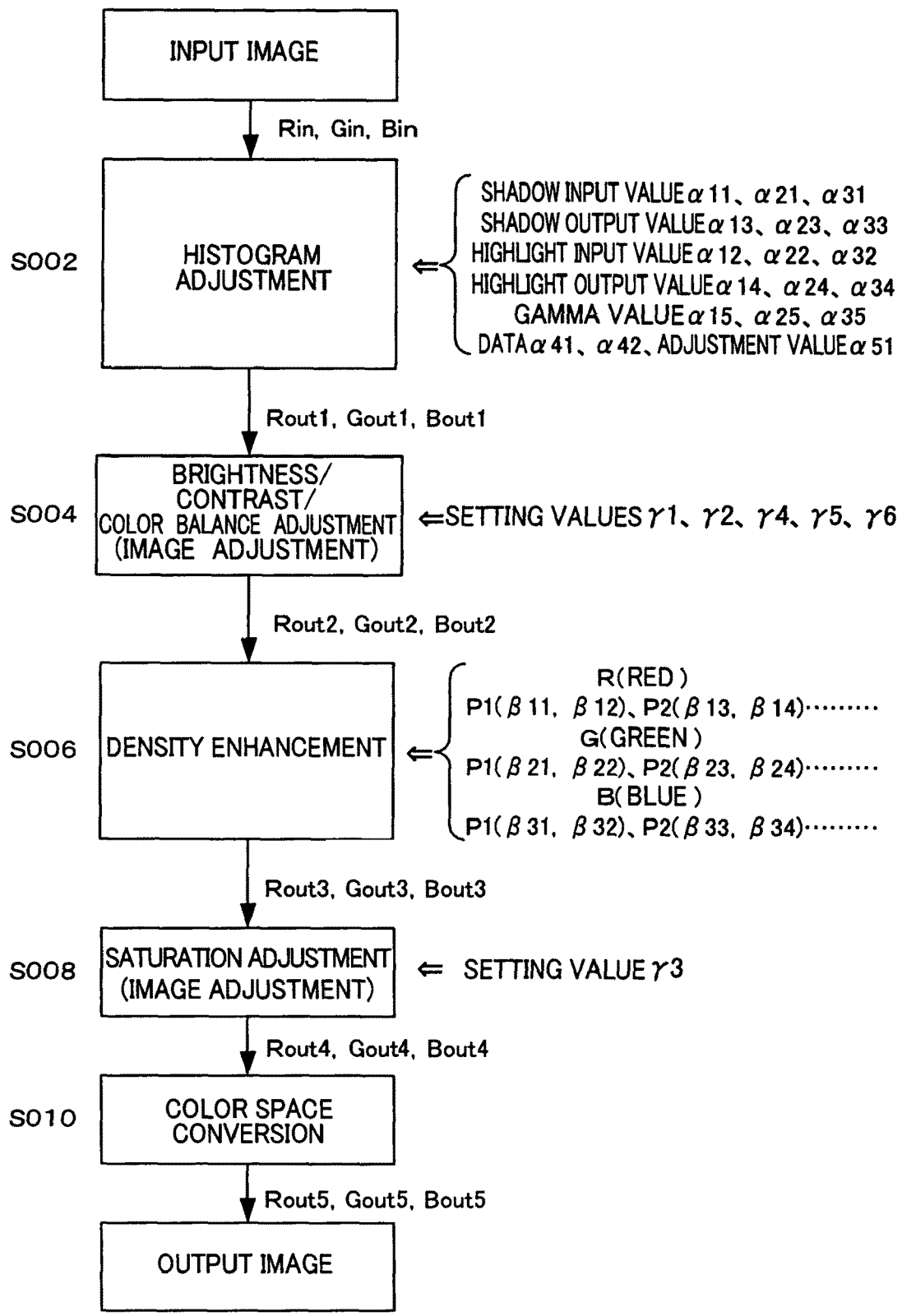
FIG. 11 is an explanatory diagram showing an example of an image adjustment procedure.

An example of the procedure for adjusting the input image, that is, here the image that is read by the image reading device 10, based on the data that has been set through the histogram adjustment, the density enhancement, and the image adjustment is described. FIG. 11 shows an example of this procedure.

The scanner driver executes the histogram adjustment on the input image, that is, here the image that is read by the image reading device 10 (S002). In this histogram adjustment, the scanner driver converts and outputs the data Rin, Gin, and Bin of each of the pixels of the input image for each of the colors R (red), G (green), and B (blue) respectively, based on the tone curve defined for each of the colors R (red), G (green), and B (blue) respectively. Here, the scanner driver refers to the shadow input values α11, α21, α31, the shadow output values α13, α23, α33, the highlight input values α12, α22, α32, the highlight output values α14, α24, α34, the gamma values α15, α25, α35, or the data α41 and α42 on the end portion shape of the tone curve or the adjustment value α51 for the grayscale balance adjustment and the like, for each of the colors R (red), G (green), and B (blue), which have been set either automatically or by the user through the histogram adjustment dialog box 131 described in FIG. 6, and based on these data, executes the histogram adjustment. Thus, the scanner driver converts the data Rin, Gin, and Bin (input data) of each of the pixels of the input image into output data Rout1, Gout1, and Bout1 and outputs these.

After the histogram adjustment has been performed in this way, the scanner driver advances the procedure to step S004, and executes the image adjustment on the data of the image that have been subjected to the histogram adjustment (S004). Here, the scanner driver carries out image adjustment by executing (1) the brightness adjustment, (2) the contrast adjustment, and (3) the color balance adjustment. That is to say, the scanner driver executes adjustment based on the setting value γ1 for "(1) the brightness adjustment," the setting value γ2 for "(2) the contrast adjustment," and the setting values γ4, γ5, γ6 for "(4) the color balance adjustment." Thus, the scanner driver converts the output data Rout1, Gout1, and Bout1 obtained by the histogram adjustment into output data Rout2, Gout2, and Bout2 and outputs them.

Then, after the image adjustment (excluding (3) saturation adjustment) has been performed in this way, next, the scanner driver advances the procedure to step S006 and executes the density enhancement on the data of the image subjected to the image adjustment (S006). In the density enhancement, the scanner driver converts and outputs the data of each of the pixels of the input image for each of the colors R (red), G (green), and B (blue) based on the tone curve that has been adjusted for each color of R (red), G (green), and B (blue) respectively. That is, here the scanner driver refers to the setting data for the input coordinates β11, β13, β21, β23, β31, β33, . . . and the output coordinates β12, β14, β22, β24, β32, β34, . . . of a plurality of points P1, P2, P3, . . . that have been set on the tone curve for each of the colors R (red), G (green), and B (blue), and executes the density enhancement based on the tone curve formed based on these setting data. Thus, the scanner driver converts the output data Rout2, Gout2, and Bout2 obtained by the image adjustment (excluding (3) saturation adjustment) into output data Rout3, Gout3, and Bout3 and outputs them.

After the density enhancement has been performed in this way, next, the scanner driver advances the procedure to step S008 and executes "(3) the saturation adjustment" as the image adjustment on the data of the image subjected to the density enhancement (S008). Here, the scanner driver executes adjustment based on the setting value γ3 for "(3) the saturation adjustment." Thus, the scanner driver converts the output data Rout3, Gout3, and Bout3 obtained by the density enhancement into output data Rout4, Gout4, and Bout4 and outputs them.

After "(3) the saturation adjustment" has been performed as the image adjustment in this way, next, the scanner driver executes a color conversion processing on the data of the image subjected to "(3) the saturation adjustment)" (S010). The color conversion processing is processing for converting to data suitable for handling on various output devices (here, the display device as well as various types of printers, for example). Specifically, it is carried out through the following conversion formulas (4) to (6), for example.

$$R' = A11 \times R + A12 \times G + A13 \times B \quad (4)$$

$$G' = A21 \times R + A22 \times G + A23 \times B \quad (5)$$

$$B' = A31 \times R + A32 \times G + A33 \times B \quad (6)$$

Here, "R," "G," and "B" denote the input data for each of the colors red (R), green (G), and blue (B) before conversion, respectively. Likewise, "R'," "G'," and "B'" denote the output data for each of the colors red (R), green (G), and blue (B) after conversion, respectively. Also, A11, A12, A13, A21, A22, A23, A31, A32, and A33 are coefficients that are suitably set in correspondence with the characteristics of the various output devices (the display device 24 and the printer, for example).

In this way, the scanner driver executes the color conversion processing in accordance with the characteristics of various types of output devices, on the data of the image subjected to "(3) the saturation adjustment." Thus, the scanner driver converts the output data Rout4, Gout4, and Bout4 obtained by the image adjustment (excluding (3) saturation adjustment) into output data Rout5, Gout5, and Bout5 and outputs them. Then, after executing the color conversion processing in this way, the scanner driver outputs the color-converted image as the output image.

It should be noted that the example described here is a case in which the color conversion processing is executed in the last step, however it is also possible for the color conversion processing to be performed as necessary.

Pre-Scan

Figure 12:
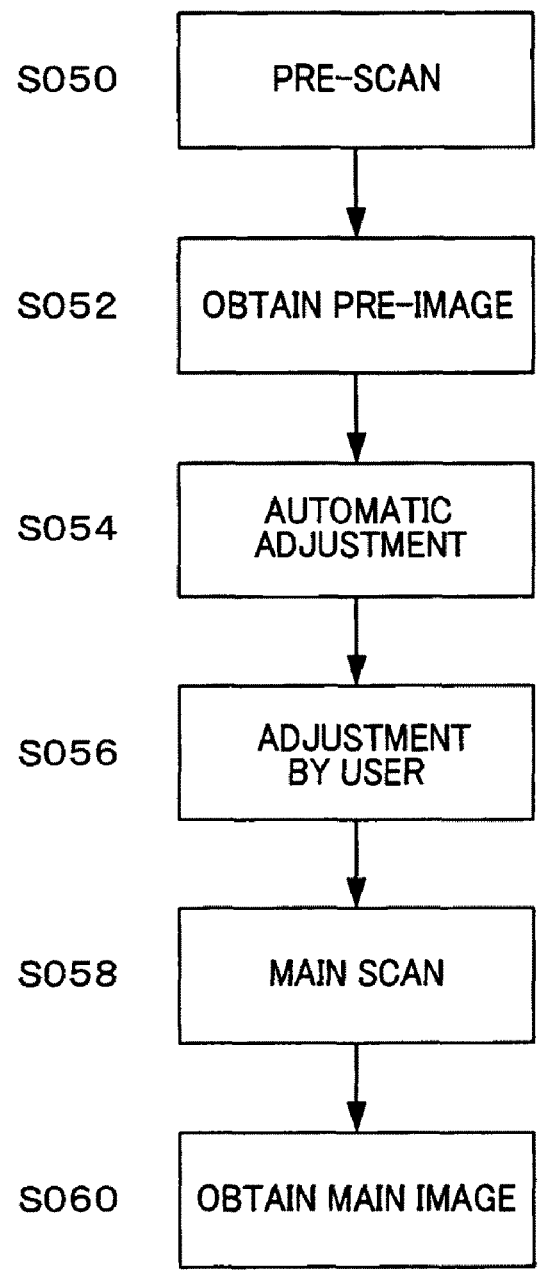
FIG. 12 is an explanatory diagram showing an example of an image reading procedure.

FIG. 12 illustrates an example of an image reading procedure by the image reading device 10. When the image reading device 10 reads an image, it may execute a pre-scan. If an image is to be read at high resolution, for example, a pre-scan refers to reading an image a single time, for example, at low resolution, before executing the operation of reading the image at high resolution (main scan), rather than executing the operation of reading the image at high resolution initially.

The pre-scan is executed first, as shown in the drawing (S050). The scanner driver obtains a pre-scan image (pre-image) through this pre-scan operation (S052). Next, the scanner driver executes automatic adjustment, for example, on the pre-scan image (pre-image) that has been obtained. Here, the scanner driver finds suitable adjustment values, for example, for the histogram adjustment, the density enhancement, or the image adjustment, for example, for the pre-scan image (pre-image) that has been obtained, and automatically enhances the pre-scan image (pre-image) (S054). Here, the automatically enhanced image is displayed on the display device 24 and the like, for example.

In this way, the user performs various adjustments (enhancements) while viewing the pre-scan image (pre-image) displayed on the display device 24 or the like (S056). Here, the user performs the various adjustments (enhancements) through the histogram adjustment dialog box 131 of FIG. 6, the density enhancement dialog box 150 of FIG. 8, and the image adjustment dialog box 160 of FIG. 9, for example.

After the various adjustments (enhancements) have been performed by the user in this way, the main scan is executed. With the main scan, an image is read at high resolution from the original document 15 by the image reading device 10 (S058). The scanner driver then executes the various adjustments (enhancements) such as the histogram adjustment, the density enhancement, and the image adjustment, on the high-resolution image that is obtained through the main scan, based on the data that has been set by the user and the like. Thus, the main image that has been subjected to the various adjustments (enhancements) is obtained (S060).

Conventional Problems and Solutions

Conventional Problems

Even when, through the histogram adjustment, density adjustment and image adjustment as described above, the various types of adjustments (enhancements) were automatically performed on the image read in with the image reading device, for example, it was not possible to perform a sufficient enhancement process in respect to an image in which the color balance of, for example, intermediate tones is destroyed. Moreover, it was very difficult for the user to perform a sufficient adjustment (enhancement), for example, to an image in which the color balance of, for example, intermediate tones is destroyed, through the histogram adjustment, density adjustment and image adjustment.

Accordingly, in order to make it possible to sufficiently adjust (enhance) such an image in which the color balance of, for example, intermediate tones is destroyed, it is necessary to provide a function of enhancing such an image.

On the other hand, if such a function for enhancing images is to be carried out, it is also necessary to accurately determine whether the image to be determined is in fact an image in which the color balance of, for example, intermediate tones is destroyed. This is because if the process for enhancing an image is performed on an image in which the color balance of, for example, intermediate tones is not destroyed, then the information originally present in the image may be altered considerably, and there is the risk that the overall image becomes unbalanced.

Solution 1

Accordingly, in this embodiment, the following determining method is carried out, for example, in order to determine accurately whether it is an image in which the color balance of, for example, intermediate tones is destroyed.

Solution 2

Accordingly, in this embodiment, the following enhancement method is carried out, for example, in order to perform an appropriate enhancement process on the image in which the color balance of, for example, intermediate tones is destroyed.

Herebelow, the determining method and enhancement method to be carried out is explained in more detail.

(1) Determining an Image

The following is a detailed explanation of a method, performed in accordance with the present embodiment, for determining whether an image is an image in which the color balance of, for example, intermediate tones is destroyed. It should be noted that in this embodiment, the determination whether an image is an image in which the color balance of, for example, intermediate tones is destroyed is performed by the scanner driver. The scanner driver, accordingly, corresponds to an "image determining program". Moreover, the computer system 20 on which the scanner driver is executed corresponds to an "image determining apparatus." Here, the scanner driver performs an enhancement process on any image that is judged to be an image in which the color balance of, for example, intermediate tones is destroyed. Thus, the computer system 20 on which the scanner driver is executed corresponds to an "image enhancement apparatus."

Figure 13A:
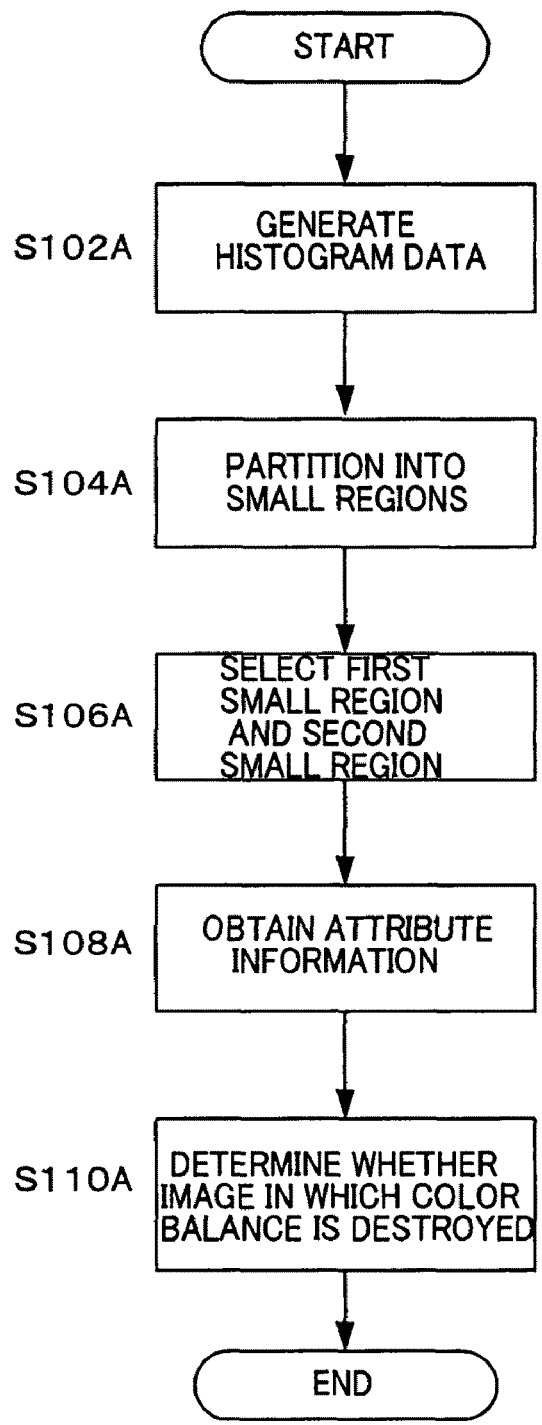
FIG. 13A is a flowchart illustrating an image determining method according to this embodiment.

FIG. 13A illustrates the image determining method that is carried out here. Here, the scanner driver first generates histogram data, based on the data of the image read in with the image reading apparatus 10 (S102A). It should be noted that the scanner driver, accordingly, corresponds to a "histogram data generation section". The histograms that are generated here refer to graphs that represent the distribution of the number of pixels with respect to density values of the pixels constituting the image read in with the image reading apparatus 10. The horizontal axis of the histograms marks the density values of the pixels and the vertical axis of the histograms marks the number of pixels. The histograms are made of rectangular bar graphs or the like, each representing the number of pixels of a given density value on the horizontal axis of the graph. The bar graphs formed in this manner are connected to each other in the horizontal direction, thus forming a graph overall having a region with a certain shape.

After the scanner driver has generated the data of the histograms in this manner, it then partitions the regions represented by the histograms into at least three small regions, according to the magnitude of the density values of the pixels, based on the data of the generated histogram (S104A). The number of partitioned small regions can also be four, and can, of course, also be five or greater. Moreover, the areas of the partitioned small regions may be set such that they are substantially equal to each other, but they may also be set such that they are not equal to each other. Of course, it is also possible to set the areas of some of the three or more partitioned small regions, that is, of two or more of the small regions such that they are substantially equal to each other. Moreover, it is possible to set the pixel numbers in the partitioned small regions such that they are substantially equal to each other, but they may also be set such that they are not equal to each other. Of course, it is also possible to set the pixel numbers of some of the three or more partitioned small regions, that is, of two or more of the small regions such that they are substantially equal to each other.

After the scanner driver has partitioned the regions represented by the histograms into three or more small regions in this manner, it then selects from these partitioned three or more small regions a first small region and a second small region (S106A). Here, the first small region is a small region whose density values are larger than those of at least one of the three or more small regions, and whose density values are smaller than those of at least one other of the three or more small regions. This first small region is selected in order to obtain the necessary information for accurately determining whether the image read in with the image reading apparatus 10 is an image in which the color balance of, for example, intermediate tones is destroyed. At least one first small region is selected from the three or more partitioned small regions. That is to say, the number of small regions selected as the first small region may be one, it may be two, and it may also be three or more.

On the other hand, a second small region is a small region that is selected from the remaining other small regions besides the first small region. Like the first small region, this second small region is selected in order to obtain the necessary information for accurately determining whether the image read in with the image reading apparatus 10 is an image in which the color balance of, for example, intermediate tones is destroyed. At least one second small region is selected from the small regions besides the first small region. That is to say, the number of small regions selected as the second small region may be one, it may be two, and it may also be three or more.

After the first and second small regions have been selected in this manner from the three or more small regions, the scanner driver then obtains individual attribute information for each of the first and second small regions (S108A). Here, "attribute information" means a quality or characteristic of the first or second small regions. Examples of attribute information obtained by the scanner driver are an average value of the density values of the pixels in the first or the second small regions, a maximum value or a minimum value of the density values of the pixels in the first or second small regions, a density value corresponding to a border line between neighboring small regions, and the size of the area of the first or second small regions or the like. The scanner driver may obtain one type of attribute information of these various types of attribute information, but it may also obtain a plurality of types of attribute information. The scanner driver obtains the information necessary for determining whether the image read in with the image reading apparatus 10 is an image in which the color balance of, for example, intermediate tones is destroyed as the attribute information from the first and second small regions. Here, the scanner driver obtains the attribute information for each color individually from the first and second small regions. That is to say, if the scanner driver produces histograms for each of the colors R (red), G (green) and B (blue), for example, based on the data of the image read in with the image reading apparatus 10, partitions the histograms for each color into three or more small regions each, and selects the first and second small regions from the three or more small regions into which the histograms for each color have been partitioned, then it obtains the attribute information individually from the first and second small regions of the histograms for each of the colors R (red), G (green) and B (blue). In other words, the scanner driver obtains the attribute information for each color individually from the first and second small regions. It should be noted that the scanner driver, accordingly, corresponds to an "attribute information obtaining section".

Then, the scanner driver determines whether the image read in with the image reading apparatus 10 is an image in which the color balance of, for example, intermediate tones is destroyed, based on the attribute information thus obtained from the first and second small regions, respectively (S110A). It should be noted that the scanner driver, accordingly, corresponds to a "determining section". Here, the scanner driver, for example, may compare the attribute information for each color obtained from the first small region with the attribute information for each color obtained from the second small region, and based on the result of this comparison, may determine whether the image read in with the image reading apparatus 10 is an image in which the color balance of, for example, intermediate tones is destroyed. More specifically, for example, the scanner driver may determine the difference of a value obtained for each color as the attribute information of each color relating to the first small region, determine the difference of a value obtained for each color as the attribute information of each color relating to the second small region, and based on these differences, may determine whether the image read in with the image reading apparatus 10 is an image in which the color balance of, for example, intermediate tones is destroyed. That is to say, it may determine whether the image read in with the image reading apparatus 10 is an image in which the color balance of, for example, intermediate tones is destroyed, by checking whether the divergence between these differences exceeds a predetermined threshold value. Thus, the scanner driver terminates the process for determining whether the image read in with the image reading apparatus 10 is an image in which the color balance of, for example, intermediate tones is destroyed.

Then, after the scanner driver has determined whether the image read in with the image reading apparatus 10 is an image in which the color balance of, for example, intermediate tones is destroyed, if it has determined that the image is an image in which the color balance of, for example, intermediate tones is destroyed, it may carry out an enhancement process on this image.

(2) Enhancing an Image

The following is a detailed explanation of a method, in accordance with the present embodiment, for enhancing an image in which the color balance of, for example, intermediate tones is destroyed. It should be noted that in this embodiment, the process for enhancing an image in which the color balance of, for example, intermediate tones is destroyed is performed by the scanner driver. Accordingly, the scanner driver corresponds to an "image enhancement program". Moreover, the computer system 20 on which the scanner driver is executed corresponds to an "image enhancement apparatus."

Figure 13B:
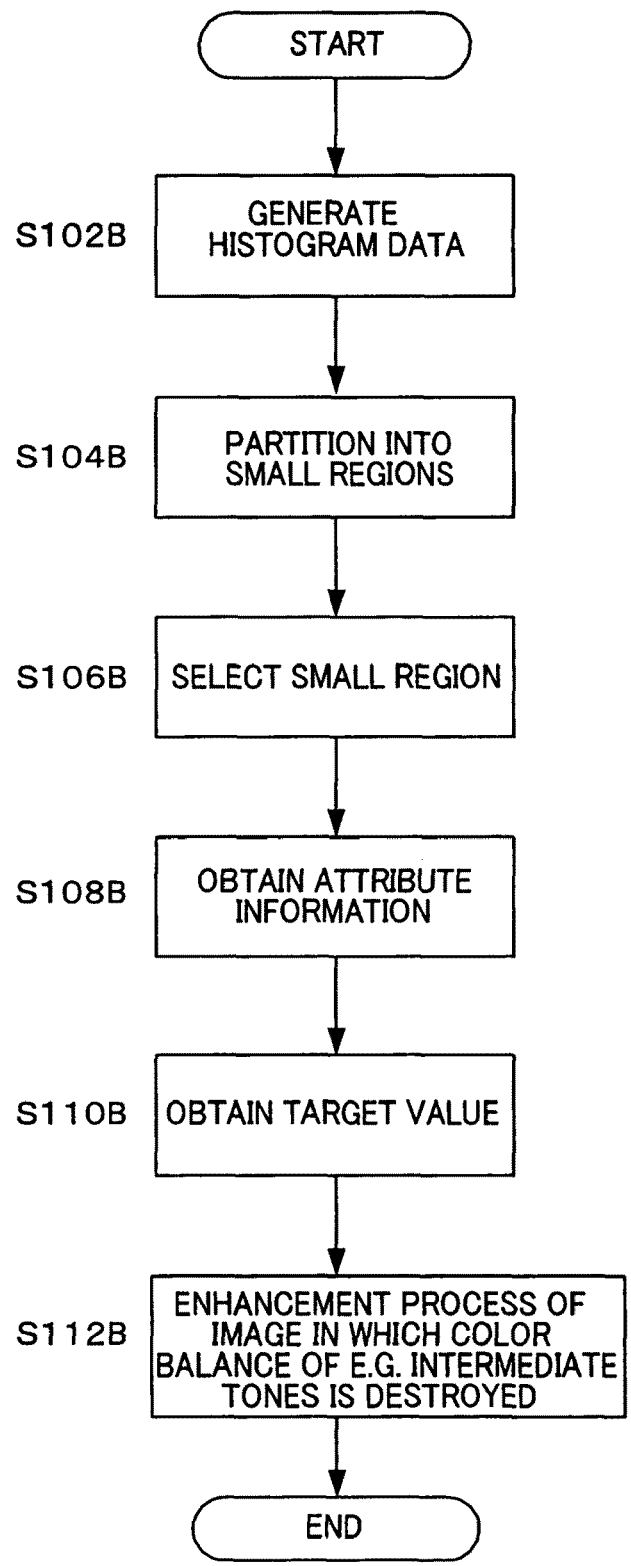
FIG. 13B is a flowchart illustrating an image enhancement method according to this embodiment.

FIG. 13B illustrates the image enhancement method that is carried out here. The scanner driver first generates histogram data, based on the data of the image read in with the image reading apparatus 10 (S102B). It should be noted that the scanner driver, accordingly, corresponds to a "histogram data generation section". The histograms that are generated here are graphs that represent the distribution of the number of pixels with respect to density values of the pixels constituting the image read in with the image reading apparatus 10. The horizontal axis of the histograms marks the density values of the pixels and the vertical axis of the histograms marks the number of pixels. The histograms are made of rectangular bar graphs or the like, each representing the number of pixels of a given density value on the horizontal axis of the graph. The bar graphs formed in this manner are connected to each other in the horizontal direction, thus forming a graph overall having a region with a certain shape.

After the scanner driver has generated the data of the histograms in this manner, it then partitions the regions represented by the histograms into at least three small regions, according to the magnitude of the density values of the pixels, based on the data of the generated histograms (S104B). The number of partitioned small regions can also be four, and can, of course, also be five or greater. Moreover, the areas of the partitioned small regions may be set such that they are substantially equal to each other, but they may also be set such that they are not equal to each other. Needless to say, it is also possible to set two or more of the partitioned small regions such that their area is substantially the same. Moreover, it is possible to set the pixel numbers in the partitioned small regions such that they are substantially equal to each other, but they may also be set such that they are not equal to each other. Of course, it is also possible to set the pixel numbers of some of the two or more partitioned small regions such that they are substantially equal to each other.

After the scanner driver has partitioned the region represented by the histograms into three or more small regions in this manner, it then selects from these partitioned three or more small regions at least one small region (S106B). Here, the scanner driver may also select two small regions, and it may also select three or more small regions. Needless to say, the scanner driver may also select all small regions. It should be noted that it is preferable that the small region selected by the scanner driver is a small region from which it is possible to retrieve the information necessary for the scanner driver to perform a process for enhancing an image in which the color balance of, for example, intermediate tones is destroyed on the image read in with the image reading apparatus 10.

After selecting at least one small region from the two or more small regions obtained by partitioning the regions represented by the histograms, the scanner driver then obtains attribute information from the selected small region (S108B). It should be noted that the scanner driver here corresponds to an "attribute information obtaining section".

Here, the attribute information obtained by the scanner driver is information relating to the quality or characteristics of the small region selected by the scanner driver. Examples of attribute information obtained by the scanner driver are an average value of the density values of the pixels in the small region selected by the scanner driver, a maximum value or a minimum value of the density values of the pixels in the small region selected by the scanner driver, a density value corresponding to a border line between the small region selected by the scanner driver and a neighboring small region, and the size of the area of the small region selected by the scanner driver or the like. The scanner driver obtains at least one type of attribute information from these various types of attribute information. That is to say, the scanner driver may obtain one type of attribute information, or it may obtain a plurality of types of attribute information from these various types of attribute information.

The scanner driver may obtain the attribute information individually for each of the small regions selected from the at least three small regions obtained by partitioning the regions represented by the histograms, or it may obtain attribute information relating to two or more of the selected small regions. Thus, the scanner driver obtains the information necessary for performing the process for enhancing an image in which the color balance of, for example, intermediate tones is destroyed on the image read in with the image reading apparatus 10.

Then, after the scanner driver has obtained the attribute information for the small region selected from the three or more small regions obtained by partitioning the regions represented by the histograms, it then obtains a target value based on the obtained attribute information (S110B). It should be noted that the scanner driver here corresponds to a "target value obtaining section". This target value is a target value for the attribute information relating to the selected small region that is selected from the three or more small regions obtained by the partitioning. As the selected small region, a small region is selected whose density values are larger than those of a given small region and whose density values are smaller than those of another small region. The target value is a value for carrying out an enhancement process that is suitable for an image in which the color balance is destroyed in this selected small region. Here, the target value obtained by the scanner driver is the same target value for all colors.

There are several methods for obtaining the target value based on the attribute information obtained by the scanner driver. More specifically, there is for example the method of obtaining information relating to the luminance from the obtained attribute information, and obtaining the target value based on this information relating to the luminance. If the information relating to luminance is obtained, then the target value can be obtained in a simple manner. As a method for obtaining this information relating to luminance, it is possible to simply obtain the density values for each of the colors red (R), green (G) and blue (B).

After the target value has been obtained in this manner, the scanner driver carries out the enhancement process on the image, based on the obtained target value, which is the same for all colors (S112B). It should be noted that the scanner driver here corresponds to an "enhancement processing section". The scanner driver carries out the enhancement process in such a manner that for each color the attribute information relating to the selected small region becomes the obtained target value, which is the same for all colors. As the enhancement process performed by the scanner driver, it is possible to employ any of a number of enhancement processes. More specifically, if the scanner driver carries out the enhancement process through the above-mentioned "density enhancement" for example, then the tone curve in the "density enhancement" is adjusted such that for each color, the attribute information relating to the selected small region becomes the obtained target value, which is the same for all colors. Therefore, the scanner driver may set any point for adjusting the tone curve in the "density enhancement". Other than that, the scanner driver may carry out the enhancement process by changing the parameters of the various adjustments (enhancements) that are already performed on the image read in with the image reading apparatus 10.

Here, the image that is subjected to the enhancement process by the scanner driver may be an image on which a histogram adjustment, a density enhancement, an image adjustment or other adjustment (enhancement) has already been performed, and it may also be an image that is read in with the image reading apparatus 10. Thus, the scanner driver subjects the image read in with the image reading apparatus 10 to a process for enhancing an image in which the color balance in the selected small region is destroyed. Thus, it is possible to achieve an improvement of the image quality of an image in which the color balance of, for example, intermediate tones is destroyed. After this, the scanner driver immediately terminates the process.

It should be noted that the scanner driver, accordingly, corresponds to an "image enhancement program".

Application to Actual Processing

In the present embodiment, this determination of whether an image is one in which the color balance of, for example, intermediate tones is destroyed is performed together with other image determination processes and various kinds of enhancement processes when the "backlight enhancement checkbox 130E" in the main dialog box 100 of the user interface illustrated in FIG. 5 is checked by the user.

In the present embodiment, this enhancement of an image in which the color balance of, for example, intermediate tones is destroyed is performed together with various image determination processes and other image enhancement processes when the "backlight enhancement checkbox 130E" in the main dialog box 100 of the user interface illustrated in FIG. 5 is checked by the user.

The image that is to be processed by the scanner driver is an image that has been adjusted (enhanced) automatically or by the user through the above-described histogram adjustment, density adjustment, image adjustment and the like. After the scanner driver has performed various determination processes on the image read in with the image reading apparatus 10, an enhancement process is performed on the image in accordance with the result of this determination.

Here, the determination processes performed by the scanner driver are the following processes:

(1) A process for determining whether the image is a backlight image, (2) A process for determining whether the image is an image in which the color balance of intermediate tones is destroyed, (3) A process for determining whether the image is an image of a sunset or sunrise.

Furthermore, the enhancement processes performed by the scanner driver are the following processes:

(4) A process for enhancing an ordinary backlight image, (5) A process for enhancing a backlight image in which the color balance of intermediate tones is destroyed, and (6) A process for enhancing a backlight image of a sunset or sunrise.

Figure 14:
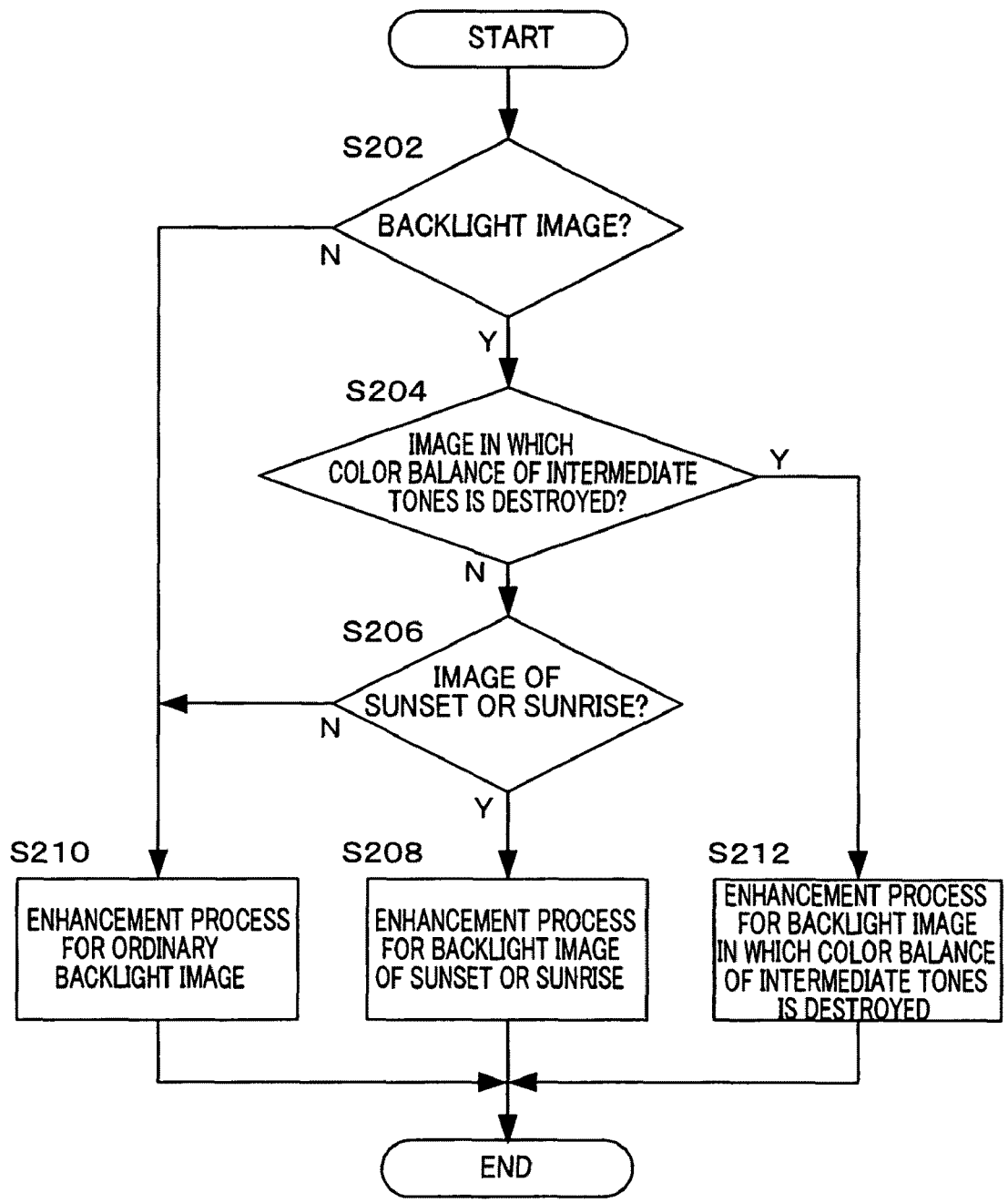
FIG. 14 is a flowchart illustrating an example of a procedure for backlight enhancement performed by the scanner driver.

FIG. 14 is a flowchart illustrating the processing procedure performed by the scanner driver in the present embodiment. The scanner driver first determines whether the image read in with the image reading apparatus 10 is a backlight image or not (S202). Here, if it is determined that the image read in with the image reading apparatus 10 is not a backlight image, then the scanner driver advances to Step S210, and performs a "process for enhancing an ordinary backlight image" on the image read in with the image reading apparatus 10 (S210). It should be noted that the "process for enhancing an ordinary backlight image" that is performed in the present embodiment is an enhancement process that does not have a large influence when carried out on images that are not backlight images. That is to say, if the image read in with the image reading apparatus 10 is not a backlight image, then it will hardly be adversely affected if subjected to the "process for enhancing an ordinary backlight image." After performing the "process for enhancing an ordinary backlight image" on the image read in with the image reading apparatus 10 at Step S210, the scanner driver immediately terminates the process.

On the other hand, if the scanner driver determines at Step S202 that the image read in with the image reading apparatus 10 is a backlight image, then the scanner driver advances to Step S204. Here, the scanner driver determines whether the image read in with the image reading apparatus 10 is an image in which the color balance of intermediate tones is destroyed (S204). It should be noted that the scanner driver, accordingly, corresponds to a "determining section". Here, if the scanner driver has determined that the image read in with the image reading apparatus 10 is an image in which the color balance of intermediate tones is destroyed, then it advances to Step S212, and performs a "process for enhancing a backlight image in which the color balance of intermediate tones is destroyed" on the image read in with the image reading apparatus 10 (S212). This "process for enhancing a backlight image in which the color balance of intermediate tones is destroyed" is a different process from the above-noted "process for enhancing an ordinary backlight image", and is performed to accomplish an improvement of the image quality of backlight images in which the color balance of intermediate tones is destroyed. After performing this "process for enhancing a backlight image in which the color balance of intermediate tones is destroyed" on the image read in with the image reading apparatus 10, the scanner driver immediately terminates the process.

On the other hand, if the scanner driver determines at Step S204 that the image read in with the image reading apparatus 10 is not an image in which the color balance of intermediate tones is destroyed, then the scanner driver advances to Step S206. Then, the scanner driver performs a process for determining whether the image read in with the image reading apparatus 10 is an image of a sunset or sunrise (S206). Here, if the scanner driver determines that the image read in with the image reading apparatus 10 is an image of a sunset or sunrise, then it advances to Step S208, and performs a "process for enhancing a backlight image of a sunset or sunrise" on the image read in with the image reading apparatus 10 (S208). This "process for enhancing a backlight image of a sunset or sunrise" is a process that is different from the above-mentioned "process for enhancing an ordinary backlight image" and the "process for enhancing a backlight image in which the color balance of intermediate tones is destroyed." This enhancement process is performed in order to accomplish an improvement of the image quality of backlight images of a sunset or sunrise. After performing this "process for enhancing a backlight image of a sunset or sunrise" on the image read in with the image reading apparatus 10, the scanner driver immediately terminates the process.

On the other hand, if the scanner driver determines at Step S206 that the image read in with the image reading apparatus 10 is not an image of a sunset or sunrise, then the scanner driver advances to Step S210, and performs a "process for enhancing an ordinary backlight image" on the image read in with the image reading apparatus 10 (S210). This is because, by determining that the image read in with the image reading apparatus 10 is neither an image in which the color balance of intermediate tones is destroyed nor an image of a sunset or sunrise, this image read in with the image reading apparatus 10 is judged to be an "ordinary backlight image". Therefore, the scanner driver subjects the image read in with the image reading apparatus 10 to the "ordinary backlight enhancement process". After performing the "process for enhancing an ordinary backlight image" on the image read in with the image reading apparatus 10, the scanner driver immediately terminates the process.

With the above-described procedure, the scanner driver according to the present embodiment performs on the image read in with the image reading apparatus 10 various kinds of image determining process and various kinds of image enhancement processes. The following is a detailed explanation of the various kinds of image determining processes and the various kinds of image enhancement processes performed by the scanner driver.

Determining a Backlight Image

If the "backlight enhancement checkbox 130E" in the main dialog box 100 of the user interface illustrated in FIG. 5 has been checked by the user, as explained in FIG. 14, first "a process for determining whether the image is a backlight image" is performed to the image read in with the image reading device 10. Hereafter, "a process of determining whether or not it is backlight image" carried out here is described in detail.

Determining Procedure

Figure 15:
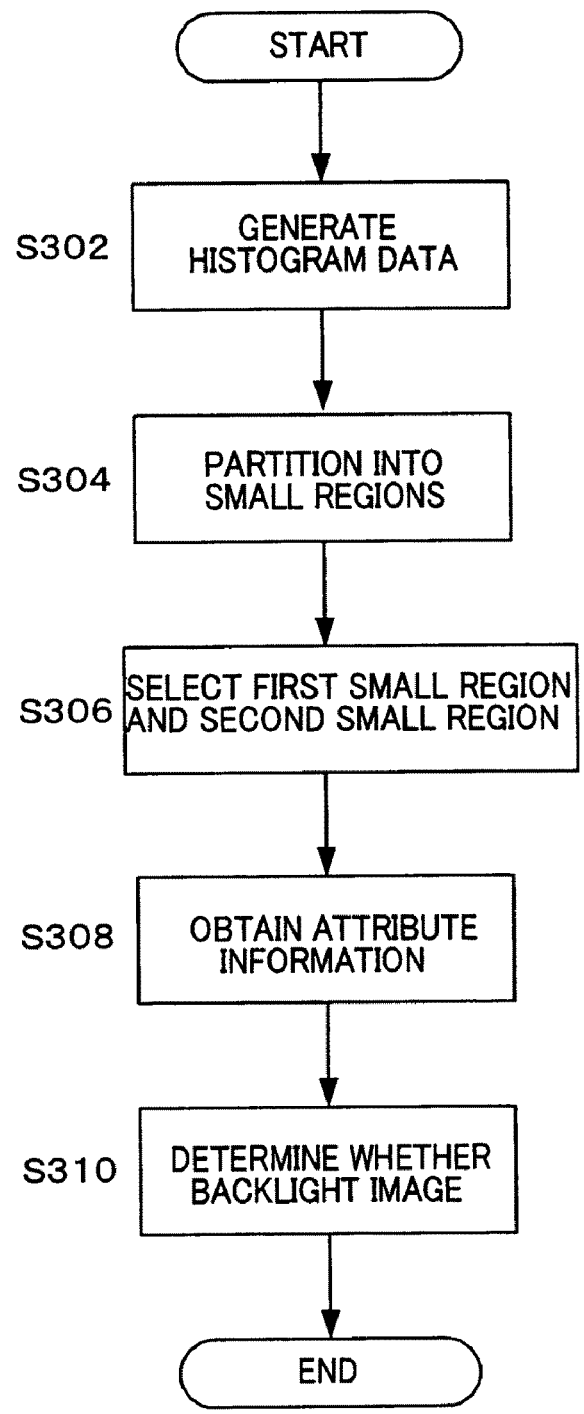
FIG. 15 is a flowchart illustrating a backlight image determining method.

FIG. 15 illustrates an example of a determining procedure of "a process of determining whether the image is a backlight image" carried out by the scanner driver. Histogram data is generated, based on the data of the image read in with the image reading device 10 (S302). The histogram that is generated here is the same as the histogram described previously. That is, this histogram is a graph that represents the distribution of the number of pixels with respect to density values of the pixels constituting the image read in with the image reading device 10.

After the scanner driver has generated the data of the histogram in this manner, it then partitions the region given by the histogram into at least three small regions, according to the magnitude of the density values of the pixels, based on the data of the generated histogram (S304). The number of partitioned small regions can also be four, and can, of course, also be five or greater. Moreover, the areas of the partitioned small regions are set such that they are substantially equal to each other, but they can also be set such that they are not substantially equal to each other. Of course, it is also possible to set the areas of some of the three or more partitioned small regions, that is, of two or more of the small regions such that they are substantially equal to each other. Moreover, it is also possible to set the pixel numbers in the partitioned small regions such that they are substantially equal to each other, but they can also be set such that they are not substantially equal to each other. Of course, it is also possible to set the pixel numbers of some of the three or more partitioned small regions, that is, of two or more of the small regions such that they are substantially equal to each other.

After the scanner driver has partitioned the region given by the histogram into three or more small regions in this manner, it then selects from these partitioned three or more small regions a first small region and a second small region (S306). Here, the first small region is at least one small region that is selected from the partitioned three or more small regions. This first small region is selected in order to obtain the necessary information from the image read in with the image reading device 10 and determine whether it is a backlight image or not. The number of small regions selected as the first small region may be one, it may be two, and it may also be three or more.

As in the case of the first small region, also the second small region is at least one small region selected from the partitioned three or more small regions. However, here, a small region whose density values are larger than those of the first small region and that does not border on the first small region is selected as the second small region. This is also true when there are two or more first small regions. That is to say, when there are two or more first small regions, the second small region does not border on any of these two or more first small regions, and the density values of the second small region are larger than those of the two or more first small regions. This is also true when there are two or more second small regions. That is to say, these two or more second small regions do not border on the one or two or more first small regions, and the density values of each of the second small regions are larger than those of the one or two or more first small regions. The number of small regions selected as the second small region may be one, it may be two, and it may also be three or more. Moreover, as in the case of the first small region, this second small region is selected in order to obtain the necessary information from the image read in with the image reading device 10 and determine whether it is a backlight image or not.

After the first and second small regions have been selected from the three or more small regions, the scanner driver then obtains individual attribute information for each of the first and second small regions (S308). Here, "attribute information" means a quality or characteristic of the first or second small regions. Examples of attribute information obtained by the scanner driver are an average value of the density values of the pixels in the first or the second small regions, a maximum value or a minimum value of the density values of the pixels in the first or second small regions, a density value corresponding to a border line between neighboring small regions, and the size of the area of the first or second small regions. The scanner driver may obtain one type of attribute information of these types of attribute information, but it may also obtain a plurality of types of attribute information. The scanner driver obtains the information necessary for determining whether the image read in with the image reading device 10 is a backlight image as the attribute information from the first and second small regions.

Then, the scanner driver determines whether the image read in with the image reading device 10 is a backlight image, based on the attribute information thus obtained from the first and second small regions, respectively (S310). It should be noted that the scanner driver, accordingly, corresponds to a "backlight image determining section". Here, the scanner driver, for example, may compare the attribute information obtained from the first small region with the attribute information obtained from the second small region, and based on the result of this comparison, may determine whether the image read in with the image reading device 10 is a backlight image. More specifically, the scanner driver determines the difference between the value obtained as the attribute information from the first small region and the value obtained as the attribute information from the second small region, and based on this difference, determines whether the image read in with the image reading device 10 is a backlight image by checking whether this difference exceeds a predetermined value, for example. Thus, the scanner driver terminates the process of determining whether the image read in with the image reading device 10 is a backlight image.

Histogram Generation

Figure 16:
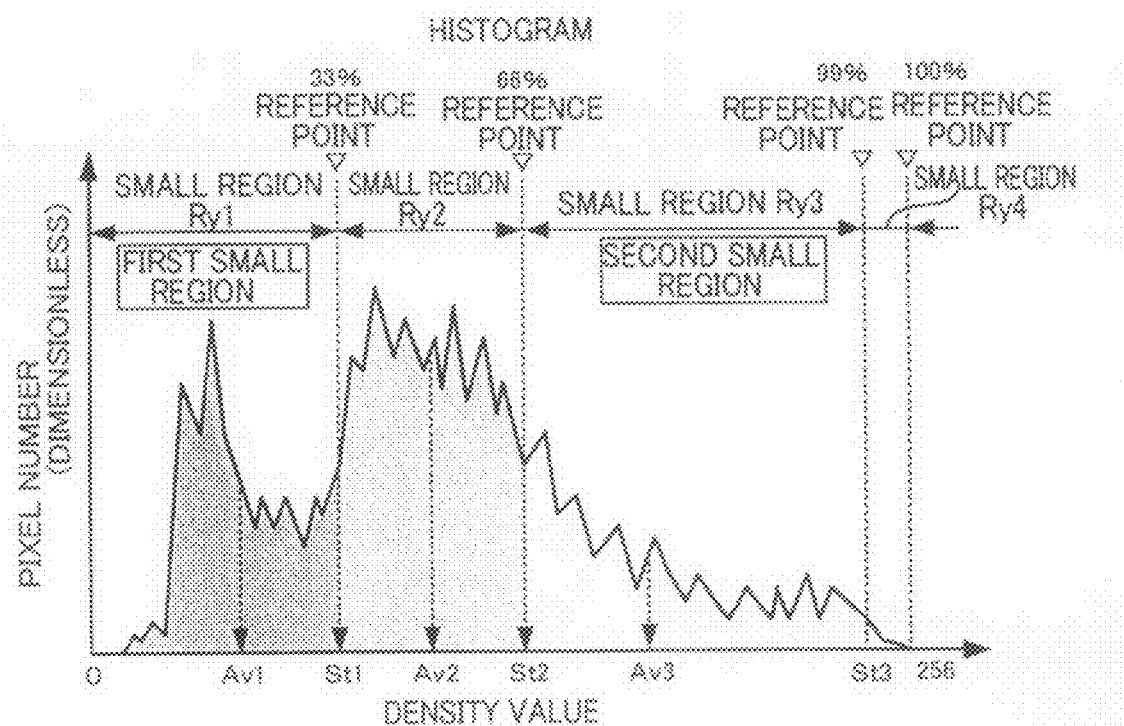
FIG. 16 is an explanatory diagram showing an example of a histogram.

FIG. 16 describes an example of a histogram to be generated by the scanner driver. In this embodiment, the data of the pixels constituting the image read in with the image reading device 10 is given as data of density values of the three colors red (R), green (G) and blue (B). Therefore, in this embodiment, the histogram is generated for each of these colors red (R), green (G) and blue (B). That is to say, three histograms, namely a histogram generated based on the density values of red (R) of the pixels constituting the image, a histogram generated based on the density values of green (G) of the pixels constituting the image, and a histogram generated based on the density values of blue (B) of the pixels constituting the image, are generated. Based on the data of the histograms for the three colors red (R), green (G) and blue (B) generated in this manner, the scanner driver determines whether or not the image is a backlight image.

Partitioning into Small Regions

Next, the scanner driver carries out the process of partitioning the regions given by the histograms of each color into three or more small regions, based on the data of the histograms for the three colors red (R), green (G) and blue (B), generated in this manner. Here, the scanner driver partitions the regions given by the histograms of each color according to the magnitude of the density values. Thus, the three or more small regions are partitioned by border lines set in correspondence to density values along the direction of the vertical axis of the histograms of each color, and are arranged next to each other along the direction of the horizontal axis of the histograms of each color, as shown in FIG. 16.

In this embodiment, the scanner driver partitions each of the regions given by the histograms for the three colors red (R), green (G) and blue (B) into four small regions Ry1, Ry2, Ry3 and Ry4, as shown in FIG. 16. Of these four partitioned small regions Ry1, Ry2, Ry3 and Ry4, the three small regions Ry1, Ry2 and Ry3 are set such that their area is substantially the same. That is to say, these three small regions Ry1, Ry2 and Ry3 represent substantially the same number of pixels.

Here, the area of each of these three small regions Ry1, Ry2 and Ry3 covers about 33% of the total number of pixels constituting the image. That it to say, the small region Ry1 is positioned on the side of the smallest density values, so that it is made of the pixels from 0 to 33%, in order from the pixels with small density values, of the pixels constituting the image to be determined. The small region Ry2 is positioned next the small region Ry1 on the side with the second smallest density values, so that it is made of the pixels from 34 to 66%, in order from the pixels following the pixels included in the small region Ry1, of the pixels constituting the image to be determined. The small region Ry3 is positioned next the small region Ry2 on the side with the third smallest density values, so that it is made of the pixels from 67 to 99%, in order from the pixels following the pixels included in the small region Ry2, of the pixels constituting the image to be determined. Thus, the small region Ry1 is positioned in a shadow region. Further, the small region Ry2 is positioned in an intermediate tone region. Further, the small region Ry3 is positioned in a highlight region.

On the other hand, the small region Ry4 is set such that the area (pixel number) that it takes up differs from that of the three small regions Ry1, Ry2 and Ry3. Here, the small region Ry4 is positioned next to the small region Ry3 on the side of the fourth smallest density values, and is positioned on the side of the largest density values, so that it is made of the remaining 1% of the pixels constituting the image to be determined.

Selecting the Small Regions

After the regions given by the histograms for the three colors red (R), green (G) and blue (B) each have been partitioned into the four small regions Ry1, Ry2, Ry3 and Ry4, the scanner driver then carries out for each color a process of selecting a first small region and a second small region from these four partitioned small regions Ry1, Ry2, Ry3 and Ry4. Here, the first small region is at least one region that is selected from the four partitioned small regions Ry1, Ry2, Ry3 and Ry4, and is a region that fulfills the conditions that it is not adjacent to a second small region, and has density values that are smaller than those of the second small region. Moreover, the second small region is at least one region that is selected from the four partitioned small regions Ry1, Ry2, Ry3 and Ry4, and is a region that fulfills the condition that it is not adjacent to a first small region, and has density values that are larger than those of the first small region.

In this embodiment, the scanner driver selects for each color, as a first small region, the small region Ry1 from the four small regions Ry1, Ry2, Ry3 and Ry4 (see FIG. 16). Moreover, in this embodiment, the scanner driver selects for each color, as a second small region, the small region Ry3 from the four small regions Ry1, Ry2, Ry3 and Ry4 (see FIG. 16). The reason why the first small region and the second small region are selected like this is as follows. Of the four partitioned small regions Ry1, Ry2, Ry3 and Ry4 in this embodiment, the three small regions Ry1, Ry2 and Ry3 are set such that their area (pixel number) is substantially the same, namely to 33% each of the total pixel number. That is to say, the three small regions Ry1, Ry2 and Ry3 are set such that they each take up substantially ⅓ of the region given by the histograms of the colors red (R), green (B) and blue (B). When the first and the second small regions are selected from these three small regions Ry1, Ry2 and Ry3, the only choice due to the condition that they do not border on each other is to select the small region Ry1 as the first small region and to select the small region Ry3 as the second small region.

It should be noted that if the regions given by the histograms for the colors red (R), green (G) and blue (B) are partitioned by a method other than the method described above, then it is also possible to select the first and the second small regions by another approach.

Obtaining the Attribute Information

After the small region Ry1 has been selected for each color as the first small region and the small region Ry3 has been selected for each color as the second small region from the four small regions Ry1, Ry2, Ry3 and Ry4, the scanner driver then obtains for each color the attribute information from the small region Ry1 selected as the first small region and the small region Ry3 selected as the second small region. In this embodiment, the maximum value St1 of the small region Ry1 and the maximum value St3 of the small region Ry3 is obtained for each color as the attribute information. It should be noted that the maximum value St1 of the small region Ry1 of each color is the density value corresponding to the border line to the adjacent small region Ry2. Similarly, also the maximum value St3 of the small region Ry3 of each color is the density value corresponding to the border line to the adjacent small region Ry4. The maximum value St1 of the small region Ry1 of each color is also referred to as the "33% reference point". Moreover, the maximum value St3 of the small region Ry3 of each color is also referred to as the "99% reference point". It should be noted that the maximum value St2 of the small region Ry2 of each color is also referred to as the "66% reference point".

Here, the reason why the maximum values St1 and St3 are obtained as the attribute information of the small region Ry1 and the small region Ry3 is as follows. With the maximum value St1 of the small region Ry1 and the maximum value St3 of the small value Ry3, it is possible to carry out a more accurate determination of whether an image is a backlight image than with other attribute information. That is to say, the maximum values St1 and St3 of the small region Ry1 and the small region Ry3 can become more important determination elements for determining whether an image is a backlight image than other attribute information of the small region Ry1 and the small region Ry3.

For example, if the average value Av1 of the density values of the pixels in the small region Ry1 and the average values Av3 of the density values of the pixels in the small region Ry3 are obtained as the attribute information of the small region Ry1 selected as the first small region and the small region Ry3 selected as the second small region, then the difference between these average values Av1 and Av3 may become much smaller than the difference between the maximum values St1 and St3 of the small regions Ry1 and Ry3. Accordingly, for the determination of whether the image read in with the image reading device 10 is a backlight image, it is preferable that the maximum value St1 of the small region Ry1 and the maximum value St3 of the small region Ry3 are obtained for each color as the attribute information of the small regions Ry1 and Ry3.

Determination

After the regions given by the histograms for the three colors red (R), green (G) and blue (B) have been partitioned into the four small regions Ry1, Ry2, Ry3 and Ry4, and the maximum value St1 of the small region Ry1 and the maximum value St3 of the small region Ry3 have been obtained for each color as the attribute information of the small region Ry1 selected as the first small region and the small region Ry3 selected as the second small region, the scanner driver then carries out a process of determining whether the image read in with the image reading device 10 is a backlight image, based on the obtained maximum value St1 of the small region Ry1 and the maximum value St3 of the small region Ry3, for each color.

Here, in this embodiment, the scanner driver first performs a calculation to determine, from the maximum value St1 of the small region Ry1 and the maximum value St3 of the small region Ry3 obtained for each of the histograms for the three colors red (R), green (G) and blue (B), a value corresponding to the case that these values are converted into luminance. For this calculation, an equation is used for converting the density values of each of the colors red (R), green (G) and blue (B) into the actual luminance values. An example of this arithmetic equation is given by the following Equation (7):

$$\text{Actual luminance value} = 1/5 \times R + 3/5 \times G + 1/5 \times B \quad (7)$$

Here, "R" means the density value of the red (R) component of the pixel. "G" means the density value of the green (G) component of the pixel. "B" means the density value of the blue (B) component of the pixel. Furthermore, Equation (7) is given for the case that the ratio among the colors red (R), green (G) and blue (B) is "1:3:1", but other ratios than this are also possible.

Using this Equation (7), the scanner driver obtains the value St10 corresponding to the actual luminance value from the maximum value St1 of the small region Ry1 obtained from each of the histograms for the three colors red (R), green (G) and blue (B). This value St10 is the "33% reference point" corresponding to the actual luminance value. Moreover, using the Equation (7), the scanner driver obtains the value St30 corresponding to the actual luminance value from the maximum value St3 of the small region Ry3 obtained from each of the histograms for the three colors red (R), green (G) and blue (B). This value St30 is the "99% reference point" corresponding to the actual luminance value.

After this, the scanner driver determines the difference ΔSt between the actual luminance value St10 ("33% reference point") determined from the maximum value St1 of the small region Ry1 of each of the histograms of the colors RGB and the actual luminance value St30 ("99% reference point") determined from the maximum value St3 of the small region Ry3 of each of the histograms of the colors RGB. Here, the scanner driver performs the calculation of subtracting the actual luminance value St10 ("33% reference point") that was determined from the maximum value St1 of the small region Ry1 of the histograms for the red, green and blue colors from the actual luminance value St30 ("99% reference point") that was determined from the maximum value St3 of the small region Ry3 of the histograms for the red, green and blue colors.

Then, the scanner driver compares the difference ΔSt determined in this manner with a predetermined threshold value ΔStk, and if the determined difference ΔSt is equal to or greater than the predetermined threshold value ΔStk, then the judgment is made that the image read in with the image reading device 10 is a backlight image. On the other hand, when the scanner driver compares the difference ΔSt determined in this manner with a predetermined threshold value ΔStk and the determined difference ΔSt is smaller than the predetermined threshold value ΔStk, then it determines that the image read in with the image reading device 10 is not a backlight image. It should be noted that the predetermined threshold value ΔStk is a value that is set suitably for judging whether an image is a backlight image. This predetermined threshold value ΔStk may be set suitably based on the result of an analysis, such as a simulation that was carried out beforehand, or heuristically, for example.

Figure 17A:
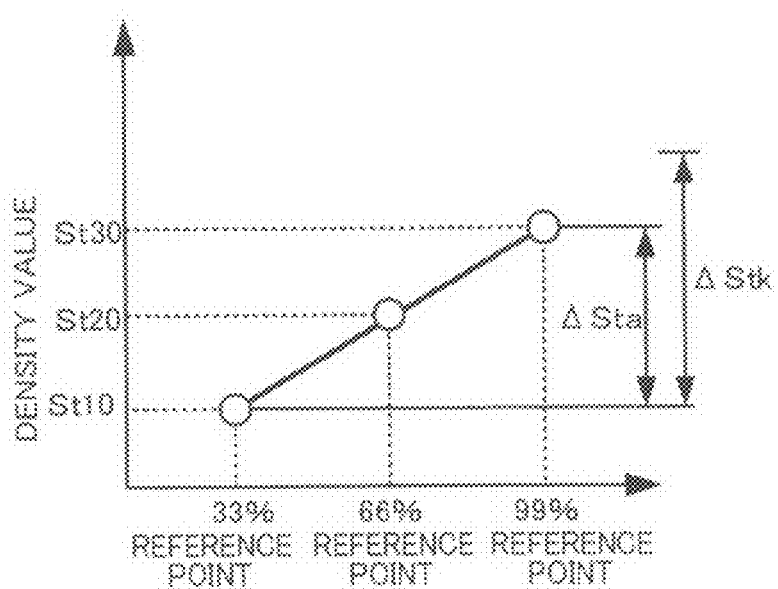
FIG. 17A is an explanatory diagram of the case where an image is determined not to be a backlight image.
Figure 17B:
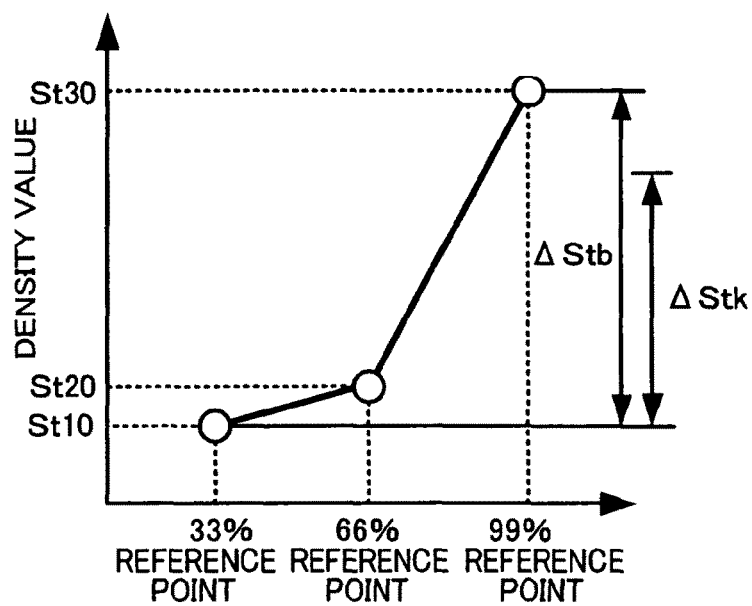
FIG. 17B is an explanatory diagram of the case where an image is determined to be a backlight image.

FIG. 17A and FIG. 17B illustrate the method for determining whether an image is a backlight image that is performed by the scanner driver. FIG. 17A illustrates the case that the scanner driver determines that the image to be determined is not a backlight image. FIG. 17B illustrates the case that the scanner driver determines that the image to be determined is a backlight image.

If the image read in with the image reading device 10 is not a backlight image, the distribution of pixels over the density values given by the histograms for the three colors red (R), green (G) and blue (G) is substantially uniform. Therefore, if the image read in with the image reading device 10 is not a backlight image, the value St10 for the "33% reference point", the value St20 for the "66% reference point", and the value St30 for the "99% reference point" increase successively at a small rate of increase with a smooth angle of inclination, as shown in FIG. 17A. It should be noted that the value St20 for the "66% reference point" is the value obtained by converting the maximum value St2 of the small region Ry2 of the histograms for the three colors red (R), green (G) and blue (B) into the actual luminance value using the above-noted equation (7). For this reason, the difference ΔSta between the value St10 for the "33% reference point" and the value St30 for the "99% reference point" is a value that is smaller than the predetermined threshold value ΔStk.

On the other hand, if the image read in with the image reading device 10 is a backlight image, there is a bias (i.e. one-sidedness) in the distribution of pixels over the density values given by the histograms for the three colors red (R), green (G) and blue (G). Therefore, if the image read in with the image reading device 10 is a backlight image, the value St10 for the "33% reference point", the value St20 for the "66% reference point", and the value St30 for the "99% reference point" are in an unbalanced relation, as shown in FIG. 17B. Thus, the value St10 for the "33% reference point" will be too small or the value St30 for the "99% reference point" will be too large. Therefore, the angle of inclination from the value St10 for the "33% reference point" to the value St30 for the "99% reference point" becomes too steep, and the rate of increase becomes too large. For this reason, the difference ΔStb between the value St10 for the "33% reference point" and the value St30 for the "99% reference point" is a value that is larger than the predetermined threshold value ΔStk.

With this method, it is possible to determine more accurately whether an image is a backlight image, by determining with the scanner driver whether an image to be determined, that is, an image read in with the image reading device 10 is a backlight image. More specifically, it is possible to determine smoothly whether an image is a backlight image not only for ordinary backlight images, but also for backlight images in which the color balance, intermediate tones and the likes, is destroyed, or backlight images with a sunset or sunrise in the background.

Determination of an Image in which the Color Balance of Intermediate Tones is Destroyed The following is an explanation of the "determination whether an image is an image in which the color balance of intermediate tones is destroyed." The "determination whether an image is an image in which the color balance of intermediate tones is destroyed" is performed by the procedure illustrated in FIG. 13. As the histograms, the histograms generated in the previous "backlight image determination" are used. The small regions are selected from the small regions into which these histograms are partitioned. That is to say, for the "determination whether an image is an image in which the color balance of intermediate tones is destroyed," the histograms for the colors RGB generated in the "backlight image determination" are used, at least two small regions are selected from the four small regions Ry1, Ry2, Ry3 and Ry4 obtained by partitioning these histograms for the colors RGB, attribute information is obtained for each of the selected small regions, and the "determination whether the image is an image in which the color balance of the intermediate tones is destroyed" is carried out based on this attribute information. This method is described in greater detail below.

Figure 18A:
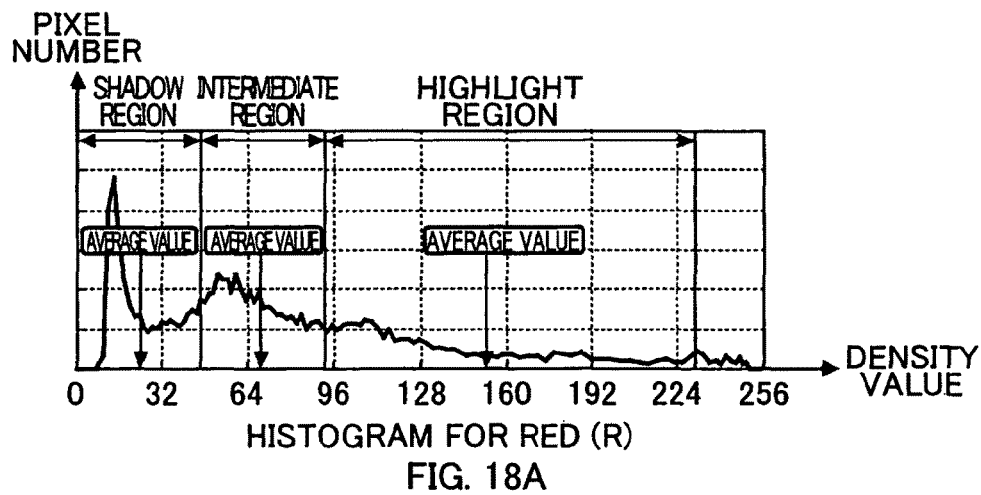
FIG. 18A is an explanatory diagram of an example of a histogram for red (R) in an image in which the color balance of intermediate tones is destroyed.
Figure 18B:
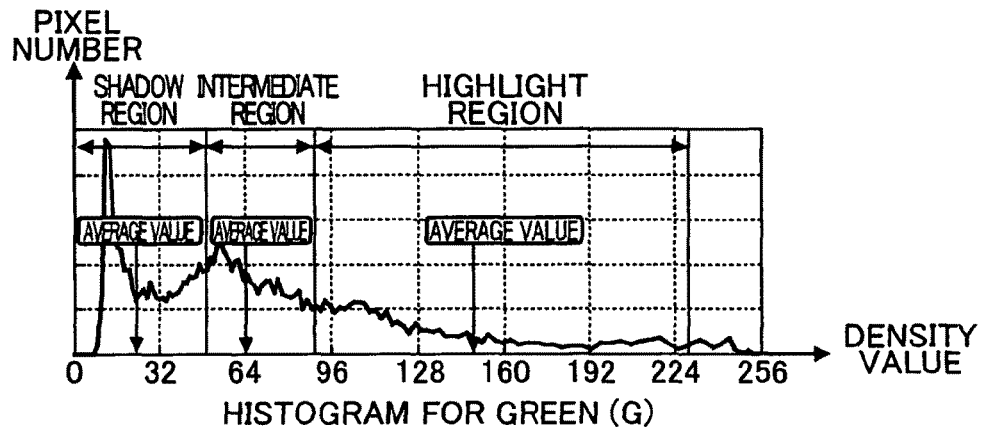
FIG. 18B is an explanatory diagram of an example of a histogram for green (G) in an image in which the color balance of intermediate tones is destroyed.
Figure 18C:
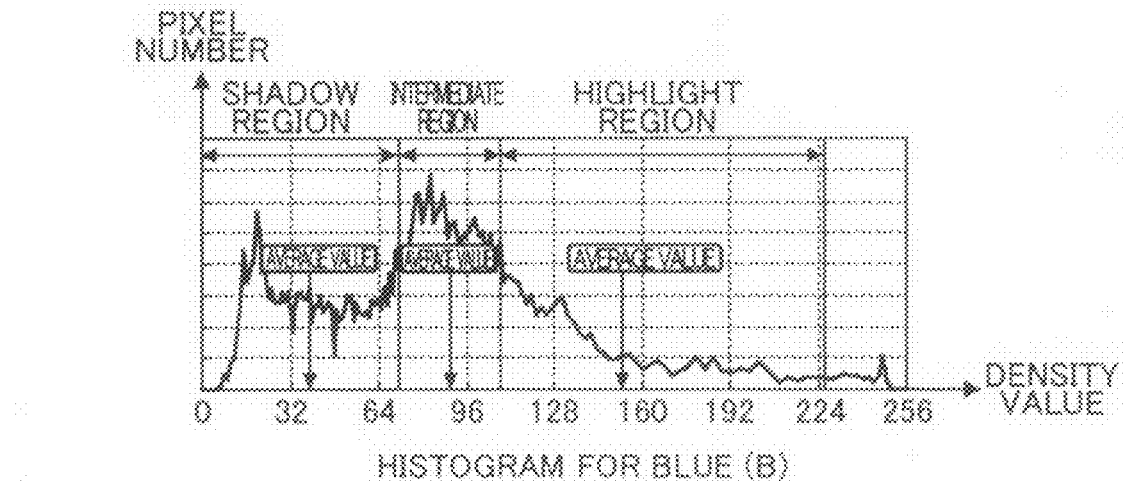
FIG. 18C is an explanatory diagram of an example of a histogram for blue (B) in an image in which the color balance of intermediate tones is destroyed.

Characteristics of Images in which the Color Balance of Intermediate Tones is Destroyed FIGS. 18A to 18C show an example of the histograms for the colors RGB of an image in which the color balance of the intermediate tones is destroyed. FIG. 18A shows the histogram for red (R). FIG. 18B shows the histogram for green (G). FIG. 18C shows the histogram for blue (B).

In an image in which the color balance of intermediate tones is destroyed, one of the colors red (R), green (G) and blue (B) has characteristics of intermediated tones that are different from those of the other colors. That is to say, more specifically, if the characteristics of the intermediate tones of blue (B) are different for example, then the region of intermediate tones for blue (B) differs in its location from the regions of intermediate tones for red (R) and green (G), as shown in FIGS. 18A to 18C. Thus, the attributes of the region of intermediate tones for blue (B), that is, for example the maximum value, minimum value or average value, differ from the attributes of the regions of intermediate tones for red (R) and green (G). Accordingly, by determining the attributes of the intermediate regions of the histograms for the colors RGB, it is possible to determine in a simple manner whether the image is an image in which the color balance of the intermediate tones is destroyed.

Selecting the Small Regions

Figure 19:
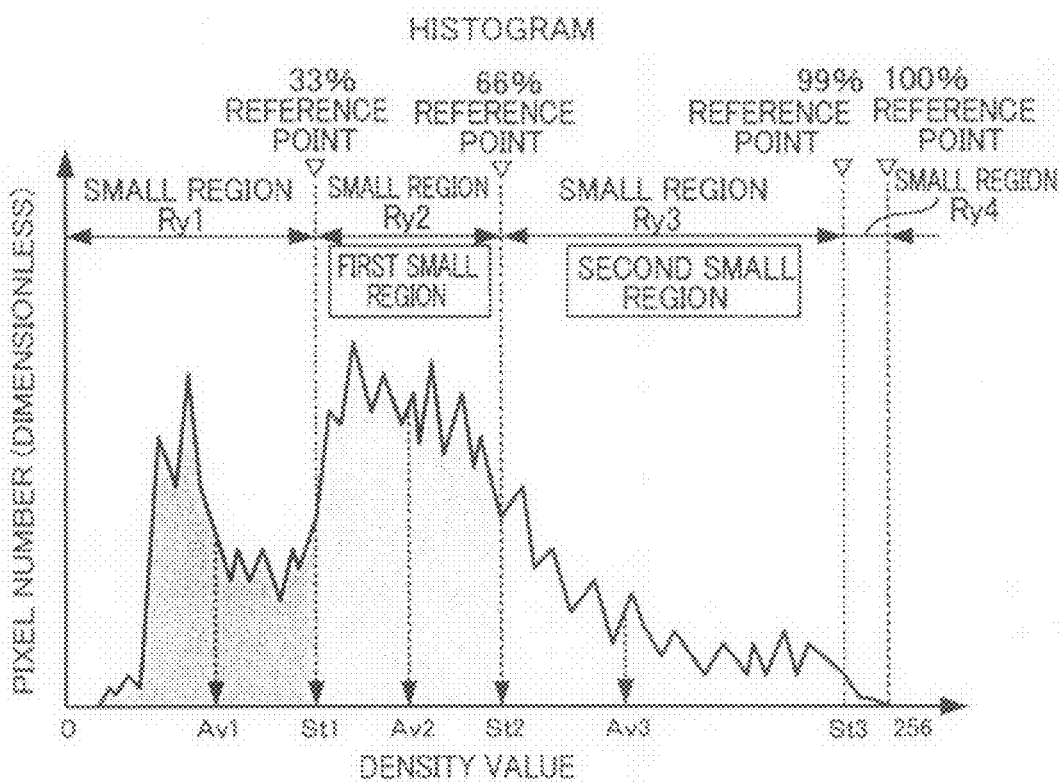
FIG. 19 is an explanatory diagram of a method for selecting a small region in the determination of an image in which the color balance of intermediate tones is destroyed.

FIG. 19 illustrates the selection of the small regions in the "determination whether the image is an image in which the color balance of the intermediate tones is destroyed." Here, as shown in this figure, the first small region and the second small region are selected from the three small regions Ry1, Ry2 and Ry3 out of the four small regions Ry1, Ry2, Ry3 and Ry4, which have been obtained by partitioning the histograms generated in the "backlight image determination." As explained above, the first small region has density values that are larger than those of at least one of the three small regions Ry1, Ry2 and Ry3, and has density values that are smaller than those of at least one other of the three small regions Ry1, Ry2 and Ry3. In the present embodiment, the small region Ry2 is selected as the first small region.

On the other hand, as explained above, a second small region is selected from the remaining other small regions besides the first small region. In the present embodiment, the small region Ry3 is selected as the second small region. Here, the reason why the small region Ry3 is selected as the second small region is because there are cases in which its reliability as attribute information is greater than that of the small region Ry1. For example, if the image is read in from a negative film, there may be instances in which there are shadow regions, that is, the reliability of the small region Ry1 as attribute information may be small. If the small region Ry3 is selected as the second small region, it is possible to obtain attribute information with high reliability, regardless of the type of the image that has been read in. It should be noted that it is also possible to select the small region Ry1 instead of the small region Ry3 as the second small region.

This selection of the first small region and the second small region is carried out for each color individually in the histograms for each of the colors red (R), green (G) and blue (B).

Obtaining the Attribute Information

In this manner, after the scanner driver has selected the first small region and the second small region in the histograms for each of the colors red (R), green (G) and blue (B), it then obtains the attribute information of the first small region and the second small region for each of these colors individually. In the present embodiment, the scanner driver obtains for each color the maximum value St2 ("66% reference point") of the first small region (small region Ry2) and the maximum value St3 ("99% reference point") of the second small region (small region Ry3) as attribute information.

Here, the reason why the maximum values St2 and St3 of the first small region (small region Ry2) and the second small region (small region Ry3) are obtained as the attribute information is that with the maximum values St2 and St3 of the first small region (small region Ry2) and the second small region (small region Ry3), it is possible to perform a more accurate determination of whether an image is an image in which the color balance of intermediate tones is destroyed, than with other attribute information.

The maximum values of the first small region (small region Ry2) and the second small region (small region Ry3) of the histogram for red (R) are referred to as "Str2" and "Str3", respectively. The maximum values of the first small region (small region Ry2) and the second small region (small region Ry3) of the histogram for green (G) are referred to as "Stg2" and "Stg3", respectively. The maximum values of the first small region (small region Ry2) and the second small region (small region Ry3) of the histogram for blue (B) are referred to as "Stb2" and "Stb3", respectively.

Determination

Thus, after the scanner driver has obtained the attribute information for each color individually from the first small region (small region Ry2) and the second small region (Ry3), it determines, based on the obtained attribute information, whether the image read in with the image reading apparatus 10 is an image in which the color balance of intermediate tones is destroyed. More specifically, this determination is implemented as follows.

Figure 20A:
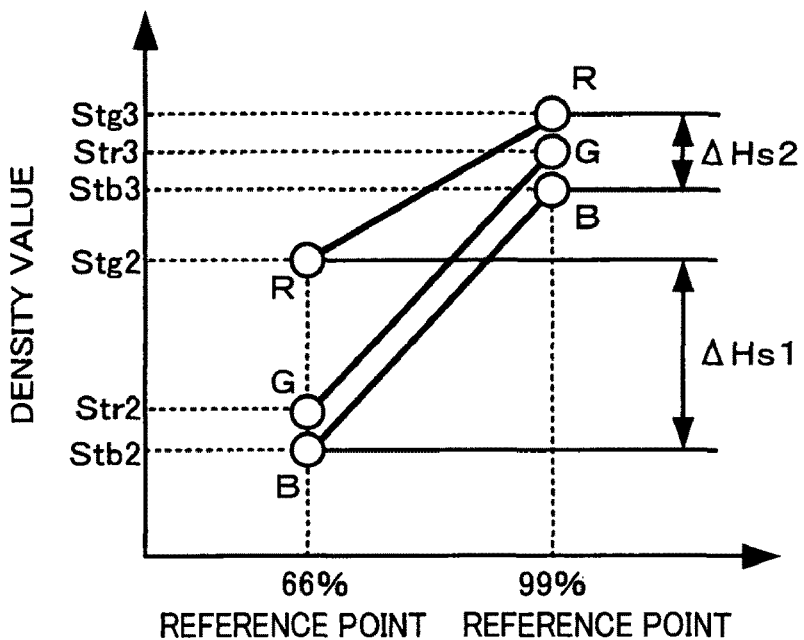
FIG. 20A is an explanatory diagram of a case in which it is determined that the image is an image in which the color balance of intermediate tones is destroyed.
Figure 20B:
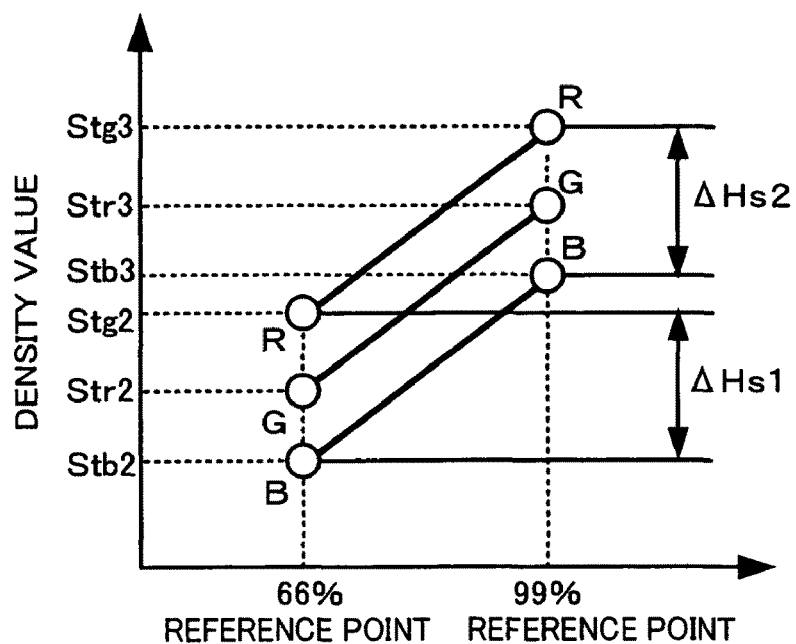
FIG. 20B is an explanatory diagram of a case in which it is determined that the image is not an image in which the color balance of intermediate tones is destroyed.

FIG. 20A and FIG. 20B illustrate the method with which the scanner driver determines whether the image is an image in which the color balance of intermediate tones is destroyed. FIG. 20A illustrates a case in which it is determined that the image is an image in which the color balance of intermediate tones is destroyed. FIG. 20B illustrates a case in which it is determined that the image is not an image in which the color balance of intermediate tones is destroyed.

Here, this is explained for an example in which the relation between the maximum values "Str2", "Stg2" and "Stb2" of each color of the first small region (small region Ry2) is Str2>Stg2>Stb2. Moreover, it is explained for an example in which the relation between the maximum values "Str3", "Stg3" and "Stb3" of each color of the second small region (small region Ry3) is Str3>Stg3>Stb3.

In the case of an image in which the color balance of intermediate tones is destroyed, the variance among the intermediate tones, that is here, among the maximum values "Str2", "Stg2" and "Stb2" of each color of the first small region (small region Ry2) is much larger than the variance among the maximum values "Str3", "Stg3" and "Stb3" of each color of the second small region (small region Ry3), as shown in FIG. 20A. From this, it can be easily determined whether the image is an image in which the color balance of intermediate tones is destroyed, by determining the maximum difference ΔHs1 between the maximum values "Str2", "Stg2" and "Stb2" of each color of the first small region (small region Ry2), and the maximum difference ΔHs2 between the maximum values "Str3", "Stg3" and "Stb3" of each color of the second small region (small region Ry3), and comparing these two differences ΔHs1 and ΔHs2. It should be noted that here, the difference ΔHs1 corresponds to a "first difference". Also, the difference ΔHs2 corresponds to a "second difference".

Here, the relation among the maximum values "Str2", "Stg2" and "Stb2" of each color of the first small region (small region Ry2) is Str2>Stg2>Stb2, so that the maximum difference ΔHs1 between the maximum values "Str2", "Stg2" and "Stb2" of each color of the first small region (small region Ry2) can be determined from the difference between the maximum value "Str2" for red (R) and the maximum value "Stb2" for blue (B). And since the relation among the maximum values "Str3", "Stg3" and "Stb3" of each color of the second small region (small region Ry3) is Str3>Stg3>Stb3, the maximum difference ΔHs2 between the maximum values "Str3", "Stg3" and "Stb3" of each color of the second small region (small region Ry3) can be determined from the difference between the maximum value "Str3" for red (R) and the maximum value "Stb3" for blue (B).

On the other hand, as shown in FIG. 20B, in the case of an image in which the color balance of intermediate tones is not destroyed, the variance among the intermediate tones, that is here, among the maximum values "Str2", "Stg2" and "Stb2" of each color of the first small region (small region Ry2) is not much larger than the variance among the maximum values "Str3", "Stg3" and "Stb3" of each color of the second small region (small region Ry3). Consequently, the divergence between the maximum difference ΔHs1 among the maximum values "Str2", "Stg2" and "Stb2" of each color of the first small region (small region Ry2) and the maximum difference ΔHs2 among the maximum values "Str3", "Stg3" and "Stb3" of each color of the second small region (small region Ry3) is not very large. Accordingly, it can be determined easily whether the image is an image in which the color balance of intermediate tones is destroyed.

The comparison between the maximum difference ΔHs1 among the maximum values "Str2", "Stg2" and "Stb2" of each color of the first small region (small region Ry2) and the maximum difference ΔHs2 among the maximum values "Str3", "Stg3" and "Stb3" of each color of the second small region (small region Ry3) can be performed easily by establishing whether the difference between the difference ΔHs1 and the difference ΔHs2 (corresponding to a "third difference"), that is, the value obtained by subtracting ΔHs2 from ΔHs1 is equal to or greater than a predetermined threshold value "Ks". That is to say, by checking whether the following Relation (8) is satisfied, it is possible to determine easily whether the image is an image in which the color balance is destroyed.

$$\Delta Hs1 - \Delta Hs2 \geq Ks \quad (8)$$

By making the determination with the scanner driver according to this method, it can be determined accurately whether an image to be subjected to the determination, that is in this case, the image read in with the image reading apparatus 10, is an image in which the color balance of intermediate tones is destroyed.

Process Flow

Figure 21:
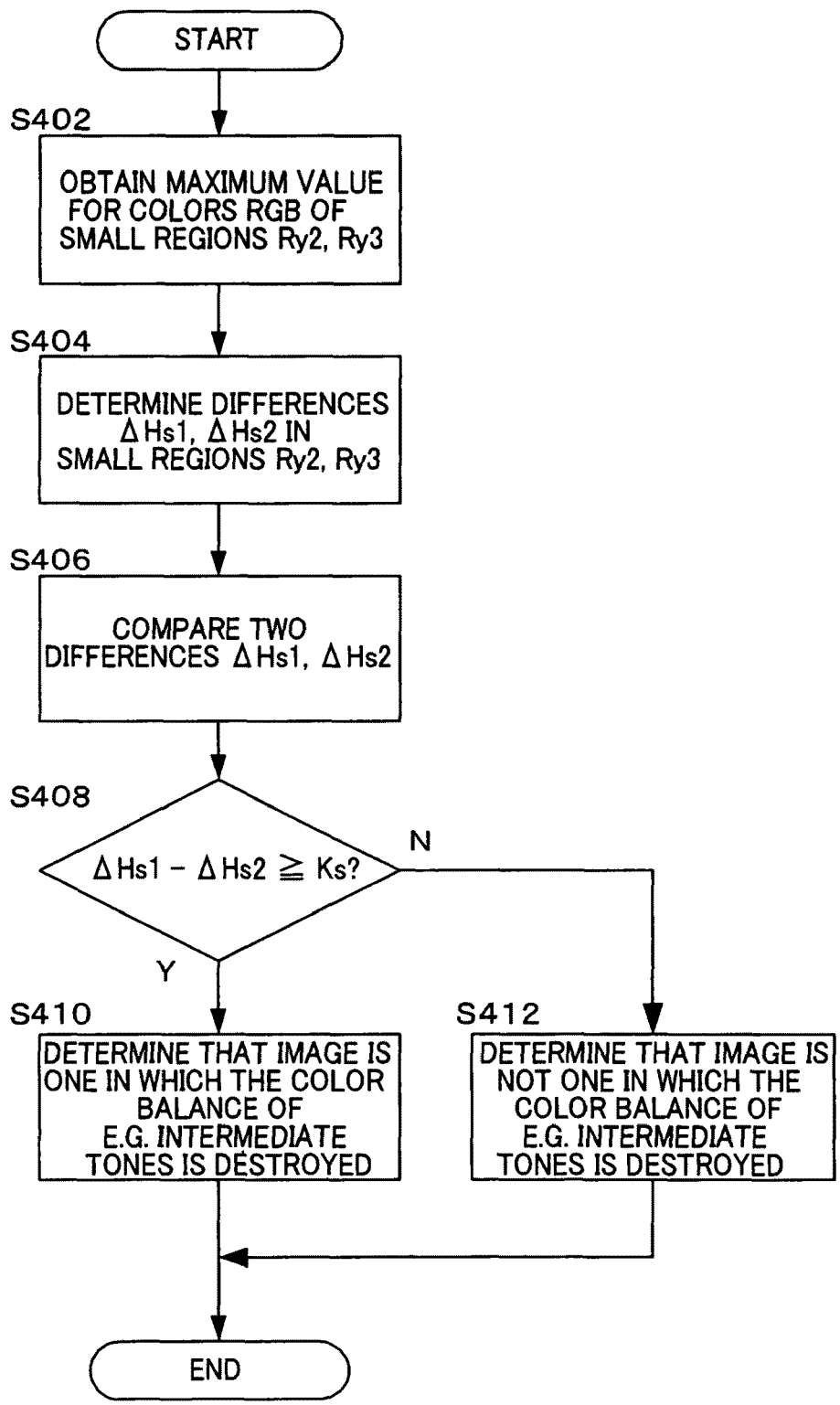
FIG. 21 is a flowchart of an example of a process for determining whether an image is one in which the color balance of intermediate tones is destroyed.

FIG. 21 illustrates the process flow for the determination with the scanner driver. As shown in this figure, the scanner driver first obtains the maximum values "Str2", "Stg2" and "Stb2" for the respective colors of the first small region (small region Ry2) and the maximum values "Str3", "Stg3" and "Stb3" for the respective colors of the second small region (small region Ry3) as the attribute information relating to the first small region (small region Ry2) and the second small region (small region Ry3) (S402). Next, the scanner driver determines the maximum difference ΔHs1 among the maximum values "Str2", "Stg2" and "Stb2" of each color of the first small region (small region Ry2) and the maximum difference ΔHs2 among the maximum values "Str3", "Stg3" and "Stb3" of each color of the second small region (small region Ry3) from the obtained maximum values "Str2", "Stg2", "Stb2", "Str3", "Stg3" and "Stb3" (S404). Then, the scanner driver compares the obtained two differences ΔHs1 and ΔHs2 (S406). In this comparison, it is checked whether the difference between the two differences ΔHs1 and ΔHs2, that is, ΔHs1−ΔHs2 is equal to or larger than a predetermined threshold value "Ks" (S408). Here, if ΔHs1−ΔHs2 is equal to or larger than the predetermined threshold value "Ks", then the scanner driver determines that the image is an image in which the color balance of the intermediate tones is destroyed (S410). On the other hand, if ΔHs1−ΔHs2 is not equal to or greater than the predetermined threshold value "Ks", then the scanner driver determines that the image is not an image in which the color balance of the intermediate tones is destroyed (S412). After the determination whether the image is an image in which the color balance of the intermediate tones is destroyed has been carried out, the scanner driver immediately terminates the process.

Determination of Images of Sunset/Sunrise

The following is an explanation of the "determination whether an image is an image of a sunset or sunrise". For the "determination whether an image is an image of a sunset or sunrise," as in the case of the "determination whether an image is an image in which the color balance of intermediate tones is destroyed," the histograms for the colors RGB generated in the previous "backlight image determination" are used, at least two small regions are selected from the four small regions Ry1, Ry2, Ry3 and Ry4 obtained by partitioning these histograms for the colors RGB, attribute information is obtained for each of the selected small regions, and the "determination whether an image is an image of a sunset or sunrise" is carried out based on this attribute information. This method is described in greater detail below.

Characteristics of Images of Sunset or Sunrise

Figure 22A:
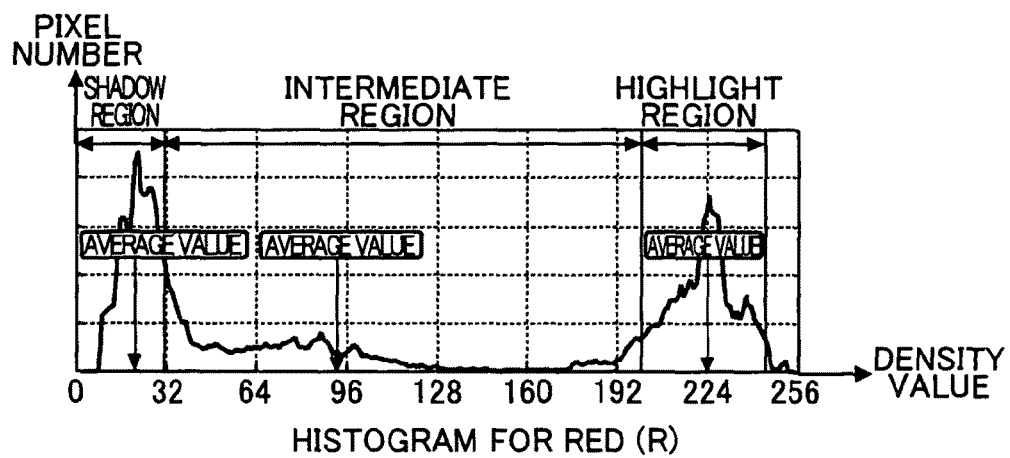
FIG. 22A is an explanatory diagram of an example of a histogram for red (R) in an image of a sunset or sunrise.
Figure 22B:
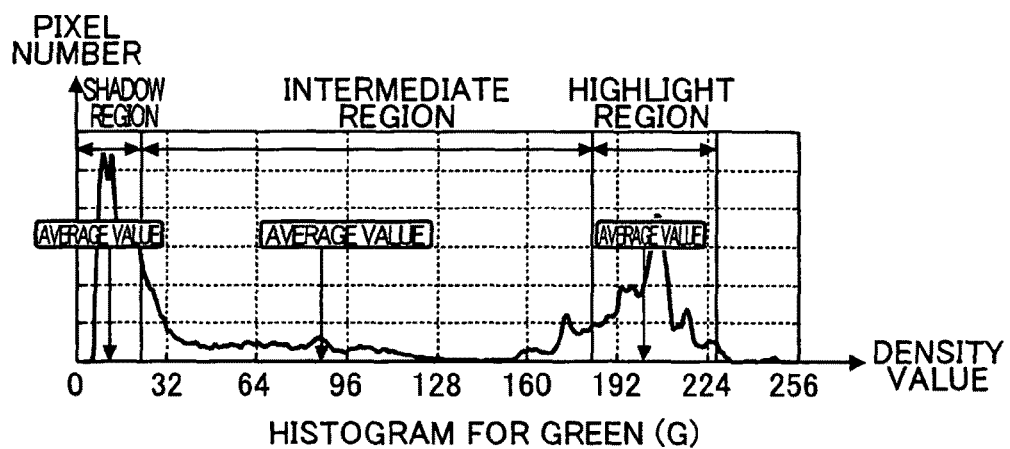
FIG. 22B is an explanatory diagram of an example of a histogram for green (G) in an image of a sunset or sunrise.
Figure 22C:
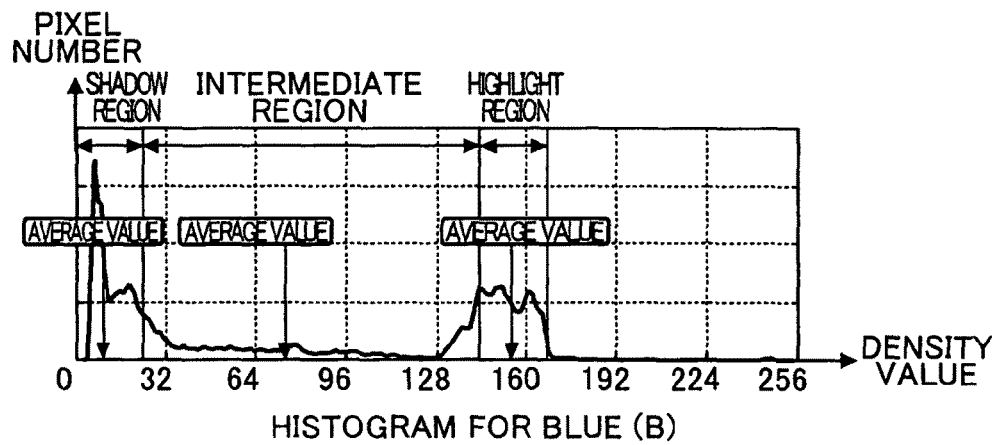
FIG. 22C is an explanatory diagram of an example of a histogram for blue (B) in an image of a sunset or sunrise.

FIGS. 22A to 22C show an example of the histograms for the colors RGB of an image of a sunset or sunrise. FIG. 22A shows an example of a histogram for red (R). FIG. 22B shows an example of a histogram for green (G). FIG. 22C shows an example of a histogram for blue (B).

In images of sunsets and sunrises, the characteristics of the highlight of one of the colors red (R), green (G) and blue (B) are different from those of the other colors. In particular in the case of an image of a sunset for example, the characteristics of the highlight region of red (R) are often different from those of the other colors. Moreover, in the case of an image of a sunrise, the highlight characteristics of blue (B) are often different from those of the other colors. More specifically, in the case of an image of a sunset for example, the density values of the highlight region of red (R) are much larger than those of green (G) and blue (B), as shown in FIGS. 22A to 22C. Thus, the attributes of the highlight region of red (R), that is, for example the maximum value, minimum value or average value, differ from the attributes of the highlight regions of blue (B) and green (G). And in an image of a sunrise, similarly, the attributes of a highlight region of blue (B), for example, differ from the attributes of the highlight regions of red (R) and green (G). Thus, by determining the attributes of the highlight regions of the histograms for the colors RGB, it is possible to easily determine whether the image is an image of a sunset or sunrise.

Selecting the Small Regions

Figure 23:
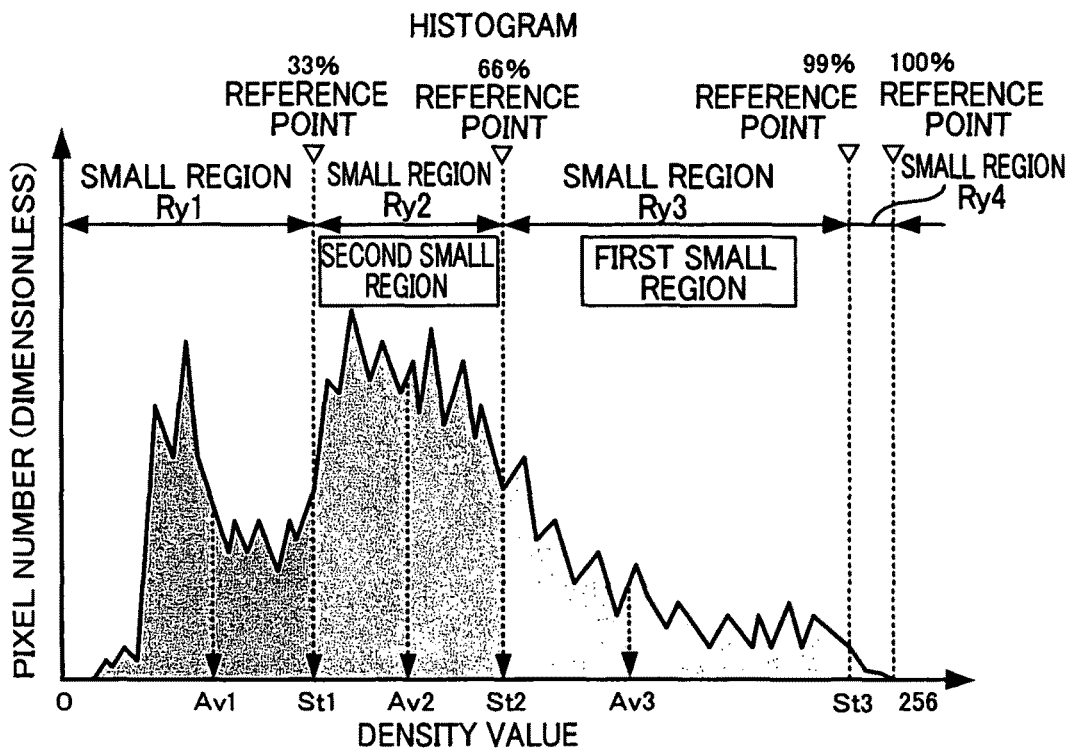
FIG. 23 is an explanatory diagram of a method for selecting a small region in the determination of whether an image is one of a sunset or sunrise.

FIG. 23 illustrates the selection of small regions in the "determination whether the image is an image of a sunset or sunrise". Here, as shown in this figure, the first small region and the second small region are selected from the three small regions Ry1, Ry2 and Ry3 out of the four small regions Ry1, Ry2, Ry3 and Ry4, which have been obtained by partitioning the histograms generated in the "backlight image determination." As already explained above, the first small region is a small region whose density values are larger than those of at least one other small region. In the present embodiment, the small region Ry3 is selected as the first small region. On the other hand, as already explained above, the second small region is a small region whose density values are smaller than those of at least one other small region. In the present embodiment, the small region Ry2 is selected as the second small region. It should be noted that it is also possible to select the small region Ry1 instead of the small region Ry2 as the second small region. This selection of the first small region and the second small region is carried out for each color individually in the histograms for each of the colors red (R), green (G) and blue (B).

Attribute Information

In this manner, after the scanner driver has selected the first small region and the second small region in the histograms for each of the colors red (R), green (G) and blue (B), it then obtains the attribute information of the first small region and the second small region for each of these colors individually. In the present embodiment, the scanner driver obtains for each color the maximum value St3 ("99% reference point") of the first small region (small region Ry3) and the maximum value St2 ("66% reference point") of the second small region (small region Ry2) as the attribute information. The maximum values of the first small region (small region Ry3) and the second small region (small region Ry2) of the histogram for red (R) are referred to as "Str3" and "Str2", respectively. The maximum values of the first small region (small region Ry3) and the second small region (small region Ry2) of the histogram for green (G) are referred to as "Stg3" and "Stg2", respectively. The maximum values of the first small region (small region Ry3) and the second small region (small region Ry2) of the histogram for blue (B) are referred to as "Stb3" and "Stb2", respectively.

Determination

Thus, after the scanner driver has obtained the attribute information for each color individually from the first small region (small region Ry3) and the second small region (Ry2), it determines, based on the obtained attribute information, whether the image read in with the image reading apparatus 10 is an image of a sunset or sunrise. More specifically, this determination is implemented as follows.

Figure 24A:
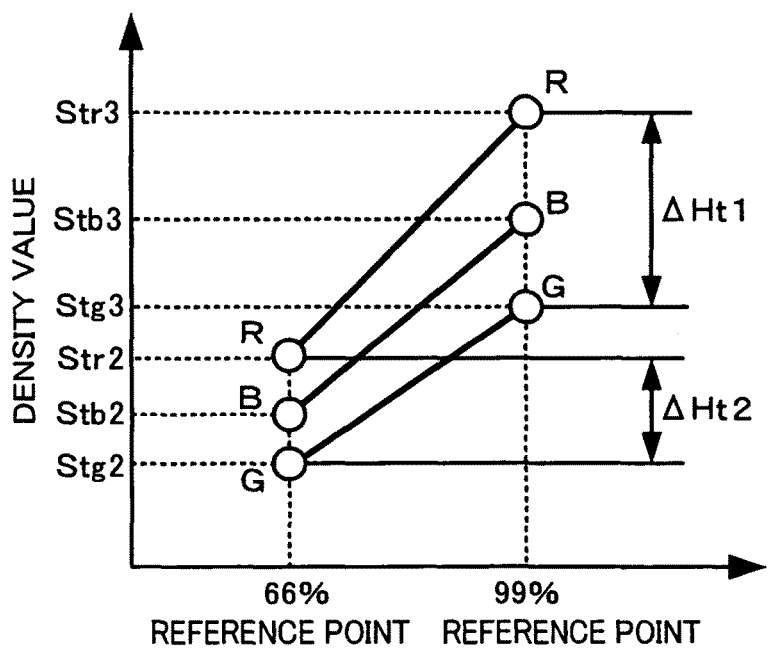
FIG. 24A is an explanatory diagram of a case in which it is determined that the image is an image of a sunset or sunrise.
Figure 24B:
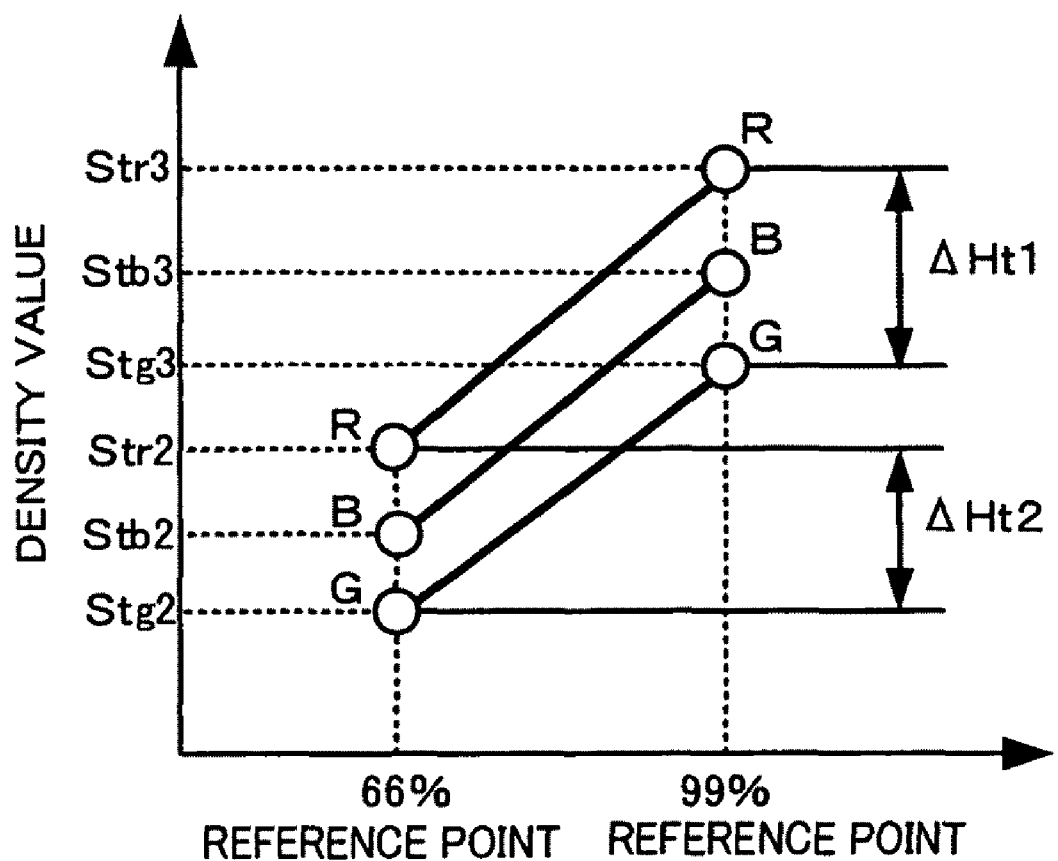
FIG. 24B is an explanatory diagram of a case in which it is determined that the image is not an image of a sunset or sunrise.

FIG. 24A and FIG. 24B illustrate the method for determining whether an image is an image of a sunset or sunrise that is performed by the scanner driver. FIG. 24A illustrates a case in which it is determined that the image is an image of a sunset or sunrise. FIG. 24B illustrates a case in which it is determined that the image is not an image of a sunset or sunrise.

Here, an example is explained in which the relation between the maximum values "Str3", "Stg3" and "Stb3" of each color of the first small region (small region Ry3) is Str3>Stb3>Stg3. Moreover, an example is explained in which the relation between the maximum values "Str2", "Stg2" and "Stb2" of each color of the second small region (small region Ry2) is Str2>Stb2>Stg2.

If the image is an image of a sunset or sunrise, then, as shown in FIG. 24A, the highlight, that is, the maximum value of a particular color from among the maximum values "Str3", "Stg3" and "Stb3" of each color of the first small region (small region Ry3) is much larger than the maximum values of the other colors. In other words, if the image is an image of a sunset, then for example the maximum value "Str3" of the first small region (small region Ry3) of red (R) is much larger than the maximum values of the other colors, that is, the maximum values "Stg3" and Stb3" of blue (B) and green (G) in this case. And if the image is an image of a sunrise, then for example the maximum value "Stb3" of the first small region (small region Ry3) of blue (B) is much larger than the maximum values of the other colors, that is, the maximum values of "Str3" and Stg3" of red (R) and green (G) in this case. On the other hand, for intermediate tones, that is, for the maximum values "Str2", "Stg2" and "Stb2" of each color in the second small region (small region Ry2), the characteristic that a particular color tends to be larger than the others cannot be observed.

From this, it can be easily determined whether the image is an image of a sunset or sunrise, by determining the maximum difference $\Delta$Ht1 between the maximum values "Str3", "Stg3" and "Stb3" of each of the colors of the first small region (small region Ry3), and the maximum difference $\Delta$Ht2 between the maximum values "Str2", "Stg2" and "Stb2" of each of the colors of the second small region (small region Ry2), and comparing these two differences $\Delta$Ht1 and $\Delta$Ht2.

Here, the relation among the maximum values "Str3", "Stg3" and "Stb3" of each of the colors of the first small region (small region Ry3) is Str3>Stb3>Stg3, so that the maximum difference $\Delta$Ht1 among the maximum values "Str3", "Stg3" and "Stb3" of each of the colors of the first small region (small region Ry3) can be determined from the difference between the maximum value "Str3" for red (R) and the maximum value "Stg3" for green (G). Moreover, the relation among the maximum values "Str2", "Stg2" and "Stb2" of each of the colors of the second small region (small region Ry2) is Str2>Stb2>Stg2, so that the maximum difference $\Delta$Ht2 among the maximum values "Str2", "Stg2" and "Stb2" of each of the colors of the second small region (small region Ry2) can be determined from the difference between the maximum value "Str2" for red (R) and the maximum value "Stg2" for green (G).

On the other hand, if the image is not an image of a sunset or sunrise, then, as shown in FIG. 24B, the highlight, that is, the maximum value of a particular color from among the maximum values "Str3", "Stg3" and "Stb3" of each of the colors of the first small region (small region Ry3) is not much larger than the maximum values of the other colors. Consequently, the divergence between the maximum difference $\Delta$Ht1 among the maximum values "Str3", "Stg3" and "Stb3" of each of the colors of the first small region (small region Ry3) and the maximum difference $\Delta$Ht2 among the maximum values "Str2", "Stg2" and "Stb2" of each of the colors of the second small region (small region Ry2) is not very large. From this, it can be easily determined that the image is not an image of a sunset or sunrise.

The comparison between the maximum difference ΔHt1 among the maximum values "Str3", "Stg3" and "Stb3" of each of the colors of the first small region (small region Ry3) and the maximum difference ΔHt2 among the maximum values "Str2", "Stg2" and "Stb2" of each of the colors of the second small region (small region Ry2) can be performed easily by establishing whether the divergence between the difference ΔHt1 and the difference ΔHt2, that is, the value obtained by subtracting ΔHt2 from ΔHt1 is equal to or greater than a predetermined threshold value "Kt". That is to say, by checking whether the following Relation (9) is satisfied, it is possible to determine easily whether the image is an image of a sunset or sunrise.

$$\Delta Ht1 - \Delta Ht2 \geq Kt \qquad (9)$$

By making the determination with the scanner driver according to this method, it can be determined accurately whether an image to be subjected to the determination, that is in this case, the image read in with the image reading apparatus 10, is an image of a sunset or sunrise.

Process Flow

Figure 25:
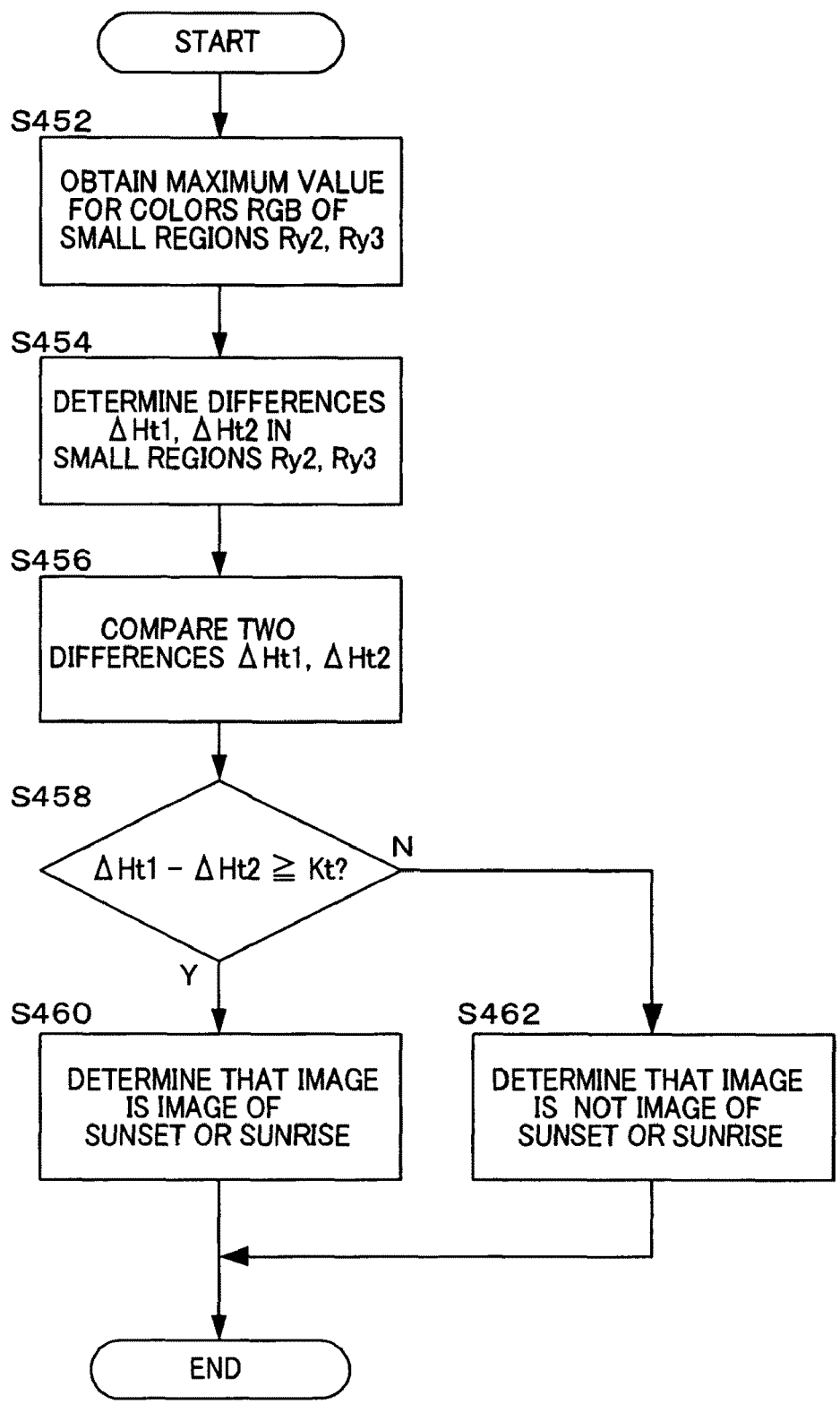
FIG. 25 is a flowchart showing an example of a process for determining whether an image is an image of a sunset or sunrise.

FIG. 25 illustrates the process flow for the determination with the scanner driver. As shown in this figure, the scanner driver first obtains the maximum values "Str3", "Stg3" and "Stb3" for the respective colors of the first small region (small region Ry3) and the maximum values "Str2", "Stg2" and "Stb2" for the respective colors of the second small region (small region Ry2) as the attribute information relating to the first small region (small region Ry3) and the second small region (small region Ry2) (S452). Next, the scanner driver determines the maximum difference ΔHt1 among the maximum values "Str3", "Stg3" and "Stb3" of each of the colors of the first small region (small region Ry3) and the maximum difference ΔHt2 among the maximum values "Str2", "Stg2" and "Stb2" of each of the colors of the second small region (small region Ry2) from the obtained maximum values "Str2", "Stg2", "Stb2", "Str3", "Stg3" and "Stb3" (S454). Then, the scanner driver compares the obtained two differences ΔHt1 and ΔHt2 (S456). In this comparison, it is checked whether the difference between the two differences ΔHt1 and ΔHt2, that is, ΔHt1−ΔHt2 is equal to or larger than a predetermined threshold value "Kt" (S458). Here, if ΔHt1−ΔHt2 is equal to or larger than the predetermined threshold value "Kt", then the scanner driver determines that the image is an image of a sunset or sunrise (S460). On the other hand, if ΔHt1−ΔHt2 is not equal to or larger than the predetermined threshold value "Kt", then the scanner driver determines that the image is not an image of a sunset or sunrise (S462). After the determination whether the image is an image of a sunset or sunrise has been carried out, the scanner driver immediately terminates the process.

Enhancement of Ordinary Backlight Image

The following is an explanation of the "process for enhancing an ordinary backlight image". This enhancement process is carried out if it has been determined in the "process for determining whether the image is a backlight image" that the image is not a backlight image, or if it has been determined in the "process for determining whether the image is an image of a sunset or sunrise" that the image is not an image of a sunset or sunrise.

This enhancement process is performed using the histograms for each of the colors RGB that have been generated previously for the "backlight image determination". That is to say, attribute information is obtained for the three small regions Ry1, Ry2 and Ry3 out of the four small regions Ry1, Ry2, Ry3 and Ry4 obtained by partitioning the histograms for each of the colors RGB generated previously for the "backlight image determination", and the process for enhancing the image is carried out based on this obtained attribute information. This enhancement method is described in greater detail below.

Obtaining the Attribute Information

The scanner driver first obtains the respective attribute information from the three small regions Ry1, Ry2 and Ry3 out of the four small regions Ry1, Ry2, Ry3 and Ry4 obtained by partitioning the histograms for each of the colors RGB generated previously for the "backlight image determination". Here, the average values of the density values of the pixels in the three small regions Ry1, Ry2 and Ry3 are respectively obtained as attribute information from the histograms for each of the colors RGB. Here, the average value of the density values of the pixels in the small region Ry1 of the histogram for red (R) is taken to be "AVr1", the average value of the density values of the pixels in the small region Ry2 of the histogram is taken to be "AVr2", and the average value of the density values of the pixels in the small region Ry3 of the histogram is taken to be "AVr3". Also, the average value of the density values of the pixels in the small region Ry1 of the histogram for green (G) is taken to be "AVg1", the average value of the density values of the pixels in the small region Ry2 of the histogram is taken to be "AVg2", and the average value of the density values of the pixels in the small region Ry3 of the histogram is taken to be "AVg3". Moreover, the average value of the density values of the pixels in the small region Ry1 of the histogram for blue (B) is taken to be "AVb1", the average value of the density values of the pixels in the small region Ry2 of the histogram is taken to be "AVb2", and the average value of the density values of the pixels in the small region Ry3 of the histogram is taken to be "AVb3".

Generation of Enhancement Information

After this, the scanner driver generates the enhancement information for performing the backlight enhancement process on the image read in with the image reading apparatus 10, based on the thusly obtained average values AVr1, AVr2, AVr3, AVg1, AVg2, AVg3, AVb1, AVb2 and AVb3. The following is an explanation of a method for generating the enhancement information in accordance with this embodiment.

(1) Obtaining the Information Relating to Luminance

In this embodiment, the scanner driver obtains, for the three small regions Ry1, Ry2 and Ry3, the average values Yav1, Yav2 and Yav3 of the luminance of the pixels in the respective regions Ry1, Ry2 and Ry3, from the average values AVr1, AVr2, AVr3, AVg1, AVg2, AVg3, AVb1, AVb2 and AVb3 of the density values for each of the colors of the pixels in the three small regions Ry1, Ry2 and Ry3 obtained from the three histograms for red (R), green (G) and blue (B). Here, the scanner driver obtains the average values Yav1, Yav2 and Yav3 of the luminance of the pixels in the small regions Ry1, Ry2 and Ry3 using the following Equations (10) to (12), for example.

$$Yav1 = 1/5 \times AVr1 + 3/5 \times AVg1 + 1/5 \times AVb1 \qquad (10)$$

$$Yav2 = 1/5 \times AVr2 + 3/5 \times AVg2 + 1/5 \times AVb2 \qquad (11)$$

$$Yav3 = 1/5 \times AVr3 + 3/5 \times AVg3 + 1/5 \times AVb3 \qquad (12)$$

It should be noted that these Equations (10) to (12) are given for the case that the ratio among the colors red (R), green (G) and blue (B) is "1:3:1", but other ratios than this are also possible.

The scanner driver obtains the average values Yav1, Yav2 and Yav3 of the luminance of the pixels in the three small regions Ry1, Ry2 and Ry3 in this manner. Then, the scanner driver determines the average value Yav0 of the luminance of the overall image read in with the image reading apparatus 10 from the average values Yav1, Yav2 and Yav3 of the luminance of the pixels in the three small regions Ry1, Ry2 and Ry3 obtained in this manner. In this embodiment, the three small regions Ry1, Ry2 and Ry3 take up 99% of the overall image, so that the average value of the average values Yav1, Yav2 and Yav3 of the luminance corresponding to the respective three small regions Ry1, Ry2 and Ry3 is taken as the average value Yav0 of the luminance of the overall image. Consequently, in this embodiment, the average value Yav0 of the luminance of the overall image read in with the image reading apparatus 10 can be determined by the following Equation (13), for example.

$$Yav0 = (Yav1 + Yav2 + Yav3)/3 \qquad (13)$$

Thus, the scanner driver obtains the average value Yav0 of the luminance of the overall image read in with the image reading apparatus 10.

(2) Obtaining the Target Values

After the scanner driver has thus obtained the average values Yav1, Yav2 and Yav3 of the luminance of the pixels in the three small regions Ry1, Ry2 and Ry3 and obtained the average value Yav0 of the luminance of the overall image read in with the image reading apparatus 10, it obtains target values. These target values are values that are obtained in order to perform the backlight enhancement process on the image read in with the image reading apparatus 10, and are the values serving as a target for determining the extent of the backlight enhancement process. In this embodiment, two target values Ym1 and Ym2 are obtained as target values. One target value Ym1 is obtained with respect to the small region Ry1 and represents the target value for the average value of the luminance of the pixels in the small region Ry1. The other target value Ym2 is obtained with respect to the small region Ry2 and represents the target value for the average value of the luminance of the pixels in the small region Ry2.

Figure 26:
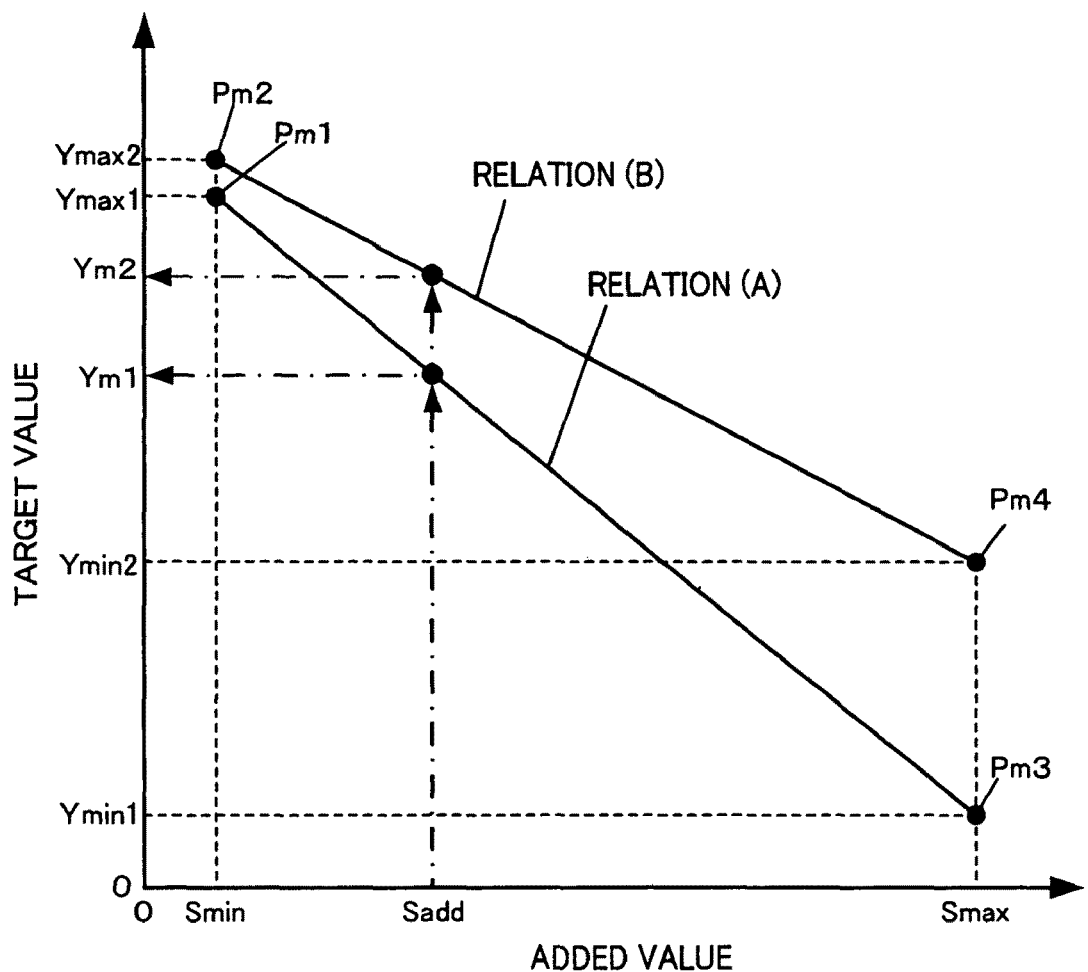
FIG. 26 is an explanatory diagram of an example of a target value obtaining method.

Next, a method for obtaining these two target values Ym1 and Ym2 is explained. FIG. 26 illustrates an example of a method for obtaining the two target values Ym1 and Ym2.

In this embodiment, the scanner driver obtains these two target values Ym1 and Ym2 based on the average value Yav1 of the luminance of the pixels in the small region Ry1 and the average value Yav0 of the luminance of the overall image. More specifically, the scanner driver adds the average value Yav1 of the luminance of the pixels in the small region Ry1 and the average value Yav0 of the luminance of the overall image, and obtains the two target values Ym1 and Ym2 based on the sum Sadd obtained through this. To obtain the two target values Ym1 and Ym2 from the sum Sadd, the two relations (A) and (B) shown in this figure are used.

The two relations (A) and (B) shown in this figure are expressed in the form of a graph in which the horizontal axis represents the sum and the vertical axis represents the target value. The relation (A) is for obtaining the target value Ym1 corresponding to the small region Ry1. The relation (B) is for obtaining the target value Ym2 corresponding to the small region Ry2.

Let us assume that the scanner driver has obtained the sum Sadd by adding the average value Yav1 of the luminance of the pixels in the small region Ry1 and the average value Yav0 of the luminance of the overall image. Thus, the scanner driver obtains the target value Ym1 corresponding to this sum Sadd from the relation (A), based on this sum Sadd. Moreover, the scanner driver obtains the target value Ym2 corresponding to this sum Sadd from the relation (B), based on this sum Sadd. Thus, the scanner driver can obtain, in a simple manner, the two target values, namely the target value Ym1 for the average value of the luminance of the pixels in the small region Ry1 and the target value Ym2 for the average value of the luminance of the pixels in the small region Ry2, from the sum Sadd obtained by adding the average value Yav1 of the luminance of the pixels in the first small region Ry1 and the average value Yav0 of the luminance of the overall image.

The reason why the scanner driver obtains the two target values Ym1 and Ym2 from the sum Sadd is explained in the following. The small region Ry1 for which the average value Yav1 is obtained is the small region in which the density values are smallest among the four small regions obtained by partitioning the histograms generated for each of the colors. Therefore, the magnitude of the average value Yav1 obtained from the small region Ry1 changes considerably in accordance with the extent of backlight of the image. However, it is not possible to judge whether the image is a backlight image based on the average value Yav1 obtained from the small region Ry1 alone. This is because also if the overall image is dark, the average value Yav1 obtained from the small region Ry1 is small. In this case, it is necessary to increase the luminance of the overall image. This is because a sufficient enhancement effect is not attained by merely increasing only the luminance of a portion of the pixels, as in the case of a backlight image.

Accordingly, the average value Yav0 of the luminance of the overall image should also be considered, so that the sum Sadd is obtained by adding the average value Yav0 of the luminance of the overall image to the average value Yav1 of the luminance of the pixels in the small region Ry1. This sum Sadd is a very suitable value for examining the extent of backlighting of the image. That is to say, if this sum Sadd is very small, then not only the average value Yav1 of the luminance of the pixels in the first small region Ry1 is small, but also the average value Yav0 of the luminance of the overall image is small, and it can be judged that the overall image is dark. Thus, it is possible to perform an enhancement to increase the luminance of the overall image.

On the other hand, if the sum Sadd is not so small, then the average value Yav0 of the luminance of the overall image is not small, but the average value Yav1 of the luminance of the pixels in the small region Ry1 is small, so that it is possible to judge that the image is a backlight image. Thus, it is possible to perform an enhancement to increase the luminance of a portion of the pixels, instead of the luminance of the overall image.

The above-described two relations (A) and (B) are each set such that the two target values Ym1 and Ym2 are established in accordance with the magnitude of this sum Sadd. That is to say, the two relations (A) and (B) are set such that if the sum Sadd is very small, that is, if the luminance of the overall image is low and the image is judged to be dark, then the target value Ym1 of the average values of the luminance of the pixels taking up the small region Ry1 and the target value Ym2 of the average values of the luminance of the pixels taking up the small region Ry2 both take on very large values, in order to perform an enhancement to increase the luminance of the overall image. Moreover, if the sum Sadd is not so small, that is, if the image is judged to be a backlight image, then the two relations (A) and (B) are set such that the target value Ym1 of the average values of the luminance of the pixels taking up the small region Ry1 and the target value Ym2 of the average values of the luminance of the pixels taking up the small region Ry2 both do not take on so large values. Thus, with the "process for enhancing an ordinary backlight image" of this embodiment, it is possible to carry out a suitable enhancement, even if the image read in with the image reading apparatus 10 is not a backlight image, but a dark image whose overall luminance is low.

The two relations (A) and (B) can be set for example as follows. Letting "Smin" be the minimum value that the sum Sadd can take on and "Smax" be the maximum value that the sum Sadd can take on, the maximum target value and the minimum target value corresponding to this minimum value "Smin" and maximum value "Smax" are set. Here, the maximum target value corresponding to the relation (A) is "Ymax1" and its minimum target value is "Ymin1". The maximum target value corresponding to the relation (B) is "Ymax2" and its minimum target value is "Ymin2". It should be noted that the minimum value "Smin" and the maximum value "Smax" of the sum Sadd, the maximum target value "Ymax1" and the minimum target value "Ymin1" of the relation (A) and the maximum target value "Ymax2" and the minimum target value "Ymin2" of the relation (B) can be suitably set heuristically.

Thus, the relation (A) can be set for example simply as a straight line connecting a point Pm1 given by the minimum value "Smin" of the sum Sadd and the maximum target value "Ymax1" of the relation (A) and a point Pm3 given by the maximum value "Smax" of the sum Sadd and the minimum target value "Ymin1" of the relation (A), as shown in FIG. 26. Moreover, the relation (B) can be set for example simply as a straight line connecting a point Pm2 given by the minimum value "Smin" of the sum Sadd and the maximum target value "Ymax2" of the relation (B) and a point Pm4 given by the maximum value "Smax" of the sum Sadd and the minimum target value "Ymin2" of the relation (B), as shown in FIG. 26.

Here, the minimum target value "Ymin1" of the relation (A) and the minimum target value "Ymin2" of the relation (B), which correspond to the maximum value "Smax" of the sum Sadd, are both set to very small values. Thus, if the sum Sadd is too large, it is possible to set the target value Ym1 for the average value of the luminance of the pixels in the small region Ry1 and the target value Ym2 for the average value of the luminance of the pixels in the small region Ry2 to a value that is sufficiently smaller than the standard value. Accordingly, it is possible to perform an enhancement on the image even if the luminance of the overall image is high, that is, if the overall image is bright. That is to say, in this embodiment, it is possible to subject the image to a suitable backlight enhancement process, without determining whether the image is a backlight image, that is, regardless of whether the image is a backlight image. Accordingly, with this embodiment, it is possible to perform a "process for enhancing an ordinary backlight image", even if it is determined in the "process for determining whether the image is a backlight image" that the image is not a backlight image.

Thus, the scanner driver can obtain, in a simple manner, the target value Ym1 for the average value of the luminance of the pixels in the small region Ry1 and the target value Ym2 for the average value of the luminance of the pixels in the small region Ry2, from the relations (A) and (B), based on the average value Yav1 of the luminance of the pixels in the small region Ry1 and the average value Yav0 of the luminance of the overall image.

It should be noted that in this embodiment, a straight line, that is, a linear function was used for the relations (A) and (B), in order to obtain the two target values Ym1 and Ym2 in a simple manner based on the sum Sadd obtained by adding the average value Yav1 of the luminance of the pixels in the small region Ry1 and the average value Yav0 of the luminance of the overall image, but it is not necessarily required to use such a linear function for the relations (A) and (B) used here. That is to say, it is also possible to use nonlinear functions for the relations (A) and (B).

Moreover, in this embodiment, the target values Ym1 and Ym2 are obtained based on the sum Sadd obtained by adding the average value Yav1 of the luminance of the pixels in the small region Ry1 and the average value Yav0 of the luminance of the overall image, but it is not necessarily required to determine this sum Sadd to obtain the target values Ym1 and Ym2. That is to say, it is also possible to obtain the target values from only the average value Yav1 of the luminance of the pixels taking up the small region Ry1, and it is also possible to obtain the target values from the average value Yav2 of the luminance of the pixels in the small region Ry2.

Moreover, in this embodiment, two target values Ym1 and Ym2 were obtained from the sum Sadd, but it is not necessarily required to obtain two target values Ym1 and Ym2 in this manner, and the number of target values may also be one or three or greater.

(3) Generation of Enhancement Information

The scanner driver generates the enhancement information based on the two target values Ym1 and Ym2 obtained in this manner. This enhancement information is information with which the scanner driver subjects the image read in with the image reading apparatus 10 to the backlight enhancement process. In this embodiment, the scanner driver performs the above-noted "density enhancement" as the backlight enhancement process. Accordingly, in this embodiment, the scanner driver generates the setting information for the "density enhancement" as the enhancement information. The following is a detailed explanation of a method for generating the setting information for the "density enhancement".

Figure 27:
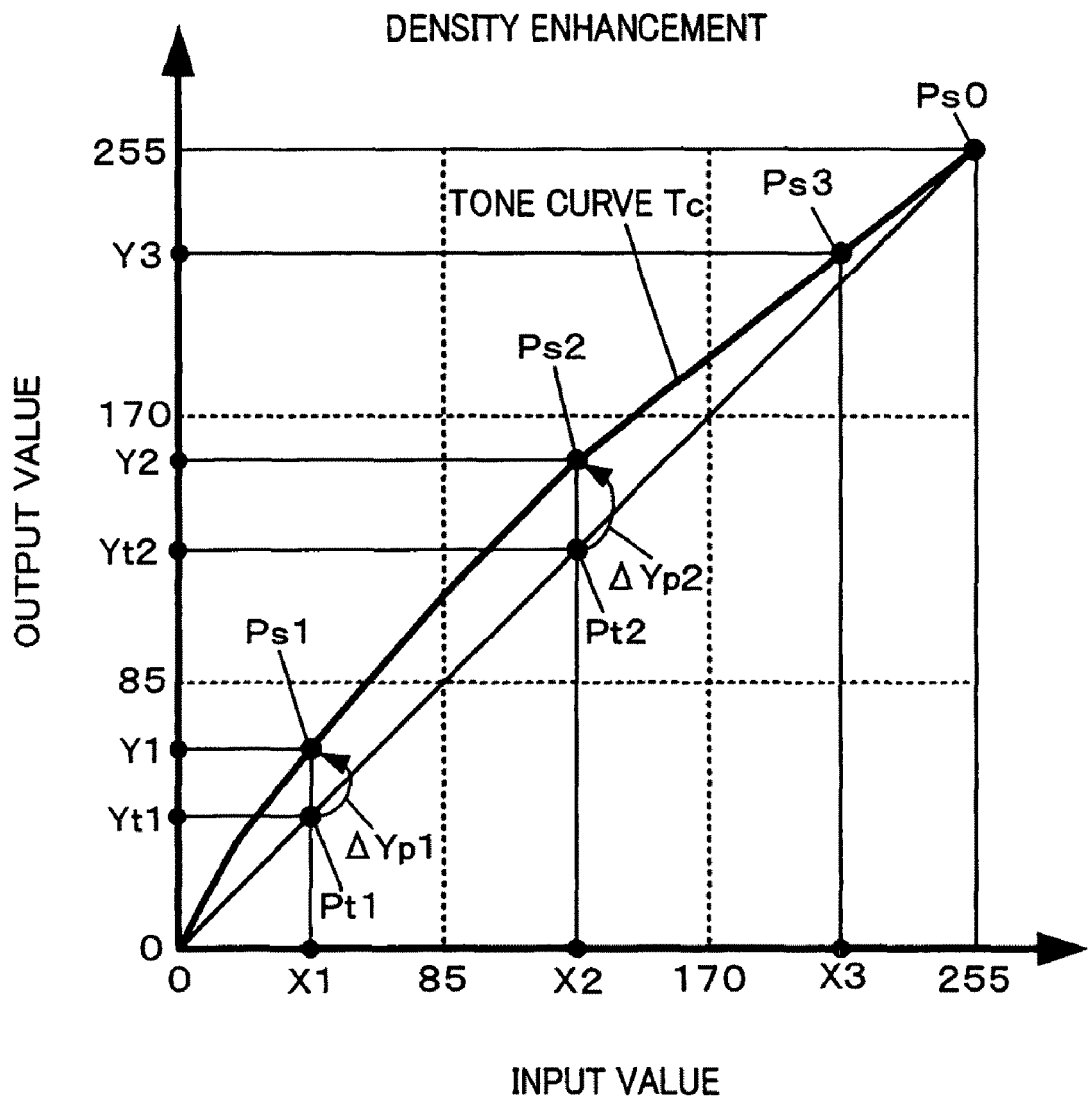
FIG. 27 is an explanatory diagram of an example of an enhancement information generation method.

FIG. 27 illustrates a method for generating the setting information for the "density enhancement" as the enhancement information. Here, the scanner driver performs the backlight enhancement process on the image read in with the image reading apparatus 10 by adjusting the tone curve Tc of the "density enhancement".

It should be noted that in this embodiment, the tone curve Tc corresponding to all colors RGB (red, green and blue), as illustrated in FIG. 8, is adjusted as the tone curve Tc of the "density enhancement".

Therefore, as the enhancement information, the scanner driver sets three arbitrary points Ps1, Ps2 and Ps3 through which the tone curve Tc passes, based on the two target values Ym1 and Ym2, as shown in this figure. Then, the scanner driver adjusts the tone curve Tc such that it passes through these three points Ps1, Ps2 and Ps3. It should be noted that in this embodiment, the point Ps1 is set in correspondence with the small region Ry1. Moreover, the point Ps2 is set in correspondence with the small region Ry2. And the point Ps3 is set in correspondence with the region Ry3. In this embodiment, the input value of the point Ps1 is "X1" and its output value is "Y1". Moreover, the input value of the point Ps2 is "X2" and its output value is "Y2". And the input value of the point Ps3 is "X3" and its output value is "Y3".

Here, the input values "X1, "X2" and "X3" of the three points Ps1, Ps2 and Ps3 may be set to any value that the input values can take on, that is, in this embodiment, to suitable values within the range 0 to 255. However, in order to form a tone curve Tc with superior balance, it is preferable to set them as follows. In order to arrange the three points Ps1, Ps2 and Ps3 evenly and with superior balance, the input values "X1", "X2 and "X3" are each arranged within a range of values that the input values can take on, that is, within partitions obtained by dividing the range 0 to 255 into three partitions. That is to say, the input value "X1" is set within the range 0 to 84. The input value "X2" is set within the range 85 to 169. And the input value "X3" is set within the range 170 to 255.

Furthermore, it is preferable that the input values "X1", "X2" and "X3" are positioned substantially at the center of these partitions, for example. More specifically, in this embodiment, the input value "X1" of the point Ps1 is set to "42". The input value "X2" of the point Ps2 is set to "127". The input value "X3" of the point Ps3 is set to "212".

On the other hand, in this embodiment, the output values "Y1", "Y2" and "Y3" of the three points Ps1, Ps2 and Ps3 are set as follows. The output value "Y1" of the point Ps1 and the output value "Y2" of the point Ps2 are set based on the two target values Ym1 and Ym2. On the other hand, the output value "Y3" of the point Ps3 is set based on the point Ps2 and the point Ps0. Here, the point Ps0 is the point whose input value is set to "255" and whose output value is set to "255". The point Ps3 is set such that it is positioned substantially directly on the straight line connecting the point Ps2 and the point Ps0. That is to say, when "X3" is obtained as the input value of the point Ps3, the point corresponding to this input value "X3" on the straight line connecting the point Ps2 and the point Ps0 is located and can be set as the point Ps3. The output value "Y3" of the point Ps3 can be determined from the straight line connecting the point Ps2 and the point Ps0, as the output value corresponding to the input value "X3".

The following is an explanation of a way to determine the output values "Y1" and "Y2" of the points Ps1 and Ps2. First, a way to determine the output value "Y1" of the point Ps1 is explained. The point Ps1 is set in accordance with the small region Ry1. The output value "Y1" of the point Ps1 is set such that the average value Yav1 of the luminance of the pixels in the small region Ry1 of the enhanced histograms becomes the target value "Ym1". More specifically, this is achieved as follows. "Yt1" is the output value that is obtained if the input value "X1" is not subjected to a "density enhancement". That is to say, this output value "Yt1" is the same value as the input value "X1". In FIG. 27, the point for the case that the input value "X1" is not subjected to a "density enhancement" is marked as "Pt1". The difference ΔYp1 between this output value "Yt1" and the output value "Y1" of the point Ps1 is determined. This difference ΔYp1 can be determined as follows.

Figure 28A:
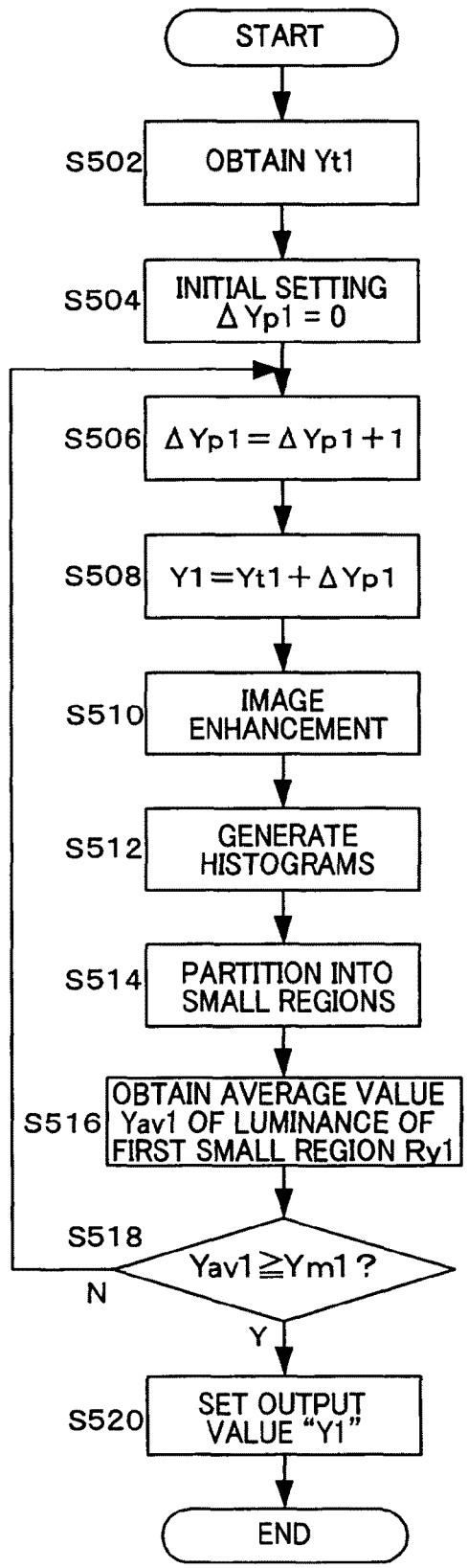
FIG. 28A is an explanatory diagram of an example of a method for setting a point Ps1.

FIG. 28A illustrates a method for determining the difference ΔYp1 according to this embodiment. In this embodiment, this difference ΔYp1 is determined by the scanner driver. As shown in this figure, the scanner driver first obtains the output value "Yt1" corresponding to the input value "X1" (S502). It should be noted that here, this output value "Yt1" is the same value as the input value "X1". Next, the scanner driver sets the difference ΔYp1 to an initial value, here to "0" (S504). Then, the scanner driver sets the value obtained by adding "1" to the difference ΔYp1 as the new ΔYp1 (S506). That is to say, if ΔYp1 is "0", then the new ΔYp1 is obtained by adding "1" and will be "1".

Next, the scanner driver sets the value obtained by adding ΔYp1 to the previously obtained output value "Yt1" as the output value "Y1" of the point Ps1 (S508). Then, the data of the enhanced image for the case that the "density enhancement" is performed based on the tone curve Tc set with this point Ps1 is obtained (S510). It should be noted that at this time, the performance of other various adjustments (enhancements), such as a "histogram adjustment" or an "image adjustment" may also be reflected in addition to the "density enhancement", as illustrated in FIG. 11.

After this enhancement has been carried out, the scanner driver generates histograms based on the data of the image obtained through this enhancement (S512). Here, the scanner driver produces histograms for the three colors red (R), green (G) and blue (B). Then, the scanner driver partitions the produced histograms into small regions (S514). That is to say, as explained above, the scanner driver partitions the regions expressed by the histograms into four small regions Ry1, Ry2, Ry3 and Ry4.

Then, the scanner driver obtains attribute information relating to the small region Ry1 from the four regions Ry1, Ry2, Ry3 and Ry4 obtained by this partitioning. It should be noted that the scanner driver obtains the average values AVr1, AVg1 and AVb1 of the density values of each of the colors red (R), green (G) and blue (B) as the attribute information relating to the small region Ry1. Then, the scanner driver determines the average value Yav1 of the luminance of the pixels in the small region Ry1, based on the obtained average values AVr1, AVg1 and AVb1 of the density values of each of the colors (S516). Here, the scanner driver determines the average value Yav1 from Equation (7), for example.

After this, the scanner driver compares the determined average value Yav1 and the previously obtained target value Ym1 (S518). Here, the scanner driver checks whether the determined average value Yav1 is equal to or greater than the target value Ym1. Then, if the determined average value Yav1 is not equal to or greater than the target value Ym1, the scanner driver returns to Step S506, and again obtains a new ΔYp1 by adding "1" to the difference ΔYp1 (S506). Then, after the output value "Y1" of the point Ps1 is obtained again (S508) and the enhancement of the image is performed based on this (S510), the histograms are generated (S512), partitioned into small regions (S514), and the average value Yav1 of the luminance of the pixels in the small region Ry1 is determined (S516). After this, the determined average value Yav1 and the target value Ym1 are compared, and it is again checked whether the determined average value Yav1 has reached the target value Ym1 (S518). The scanner driver repeats this process (S506-S518) until the determined average value Yav1 reaches the target value Ym1. That is to say, the difference ΔYp1 is increased by successively adding "1", until the determined average value Yav1 reaches the target value Ym1.

Then, when the determined average value Yav1 has reached the target value Ym1, the scanner driver sets the output value "Y1" of the points Ps1 based on the thus obtained difference ΔYp1 (S520). That is to say here, the scanner driver sets the value obtained by adding the difference ΔYp1 to the output value "Yt1" as the output value "Y1" of the point Ps1.

Thus, the scanner driver sets the output value "Y1" of the point Ps1 such that the average value Yav1 of the luminance of the pixels in the small region Ry1 of the enhanced histograms becomes the target value Ym1. It should be noted that if the output value "Y1" of the point Ps1 is set to a value that is smaller than the output value "Yt1", then the scanner driver may check in Step S518 whether the average value Yav1 is lower than the target value Ym1.

On the other hand, the output value "Y2" of the point Ps2 is set in a similar manner as in the case of the output value "Y1" of the point Ps1. Moreover, the point Ps2 is set in correspondence with the small region Ry2. As in the case of the point Ps1, the output value "Y2" of the point Ps2 is set such that the average value Yav2 of the luminance of the pixels taking up the small region Ry2 of the enhanced histograms becomes the target value Ym2. That is to say, when "Yt2" is the output value obtained in the case that the "darkness enhancement" is not performed on the input value "X2", the difference ΔYp2 of the output value "Y2" of the point Ps2 to this output value "Yt2" is determined. In FIG. 27, the point for the case that the input value "X2" is not subjected to a "density enhancement" is marked as "Pt2".

Figure 28B:
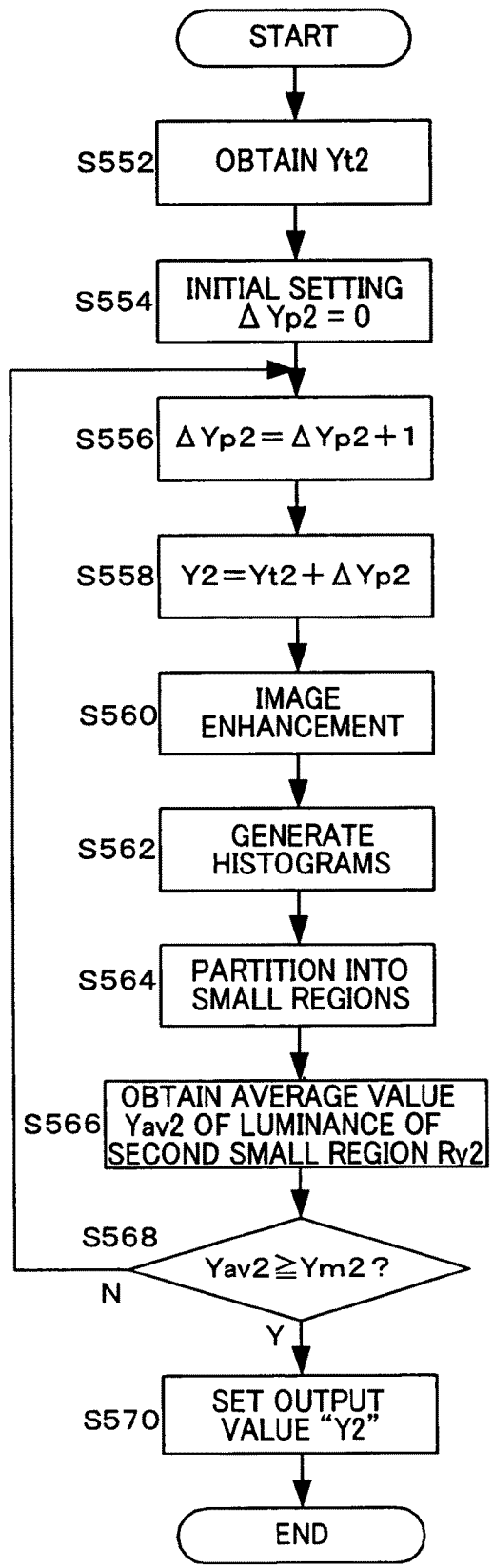
FIG. 28B is an explanatory diagram of an example of a method for setting a point Ps2.

FIG. 28B illustrates a method for determining the difference ΔYp2 according to this embodiment. It should be noted that as in the case of the point Ps1, also the difference ΔYp2 is determined by the scanner driver. As shown in the figure, the scanner driver first obtains the output value "Yt2" corresponding to the input value "X2" (S552). It should be noted that here, this output value "Yt2" is the same value as the input value "X2". Next, the scanner driver sets the difference ΔYp2 to an initial value, here to "0" (S554). Then, the scanner driver sets the value obtained by adding "1" to the difference ΔYp2 as the new ΔYp2 (S556).

Next, the scanner driver sets the value obtained by adding ΔYp2 to the previously obtained output value "Yt2" as the output value "Y2" of the point Ps2 (S558). Then, the data of the enhanced image for the case that the "density enhancement" is performed based on the tone curve Tc set with this point Ps2 is obtained (S560). It should be noted that at this time, the performance of other various adjustments (enhancements), such as a "histogram adjustment" or an "image adjustment" may also be reflected in addition to the "density enhancement", as illustrated in FIG. 11. Here, the scanner driver may or may not reflect the settings for the point Ps1.

After this enhancement has been carried out, the scanner driver generates histograms based on the data of the image obtained through this enhancement (S562). Here, the scanner driver produces histograms for the three colors red (R), green (G) and blue (B). Next, the scanner driver partitions the produced histograms into four small regions Ry1, Ry2, Ry3 and Ry4 (S564).

Then, the scanner driver obtains attribute information relating to the small region Ry2 from the four regions Ry1, Ry2, Ry3 and Ry4 obtained by this partitioning. It should be noted that the scanner driver obtains the average values AVr2, AVg2 and AVb2 of the density values of the colors red (R), green (G) and blue (B) as the attribute information relating to the small region Ry2. Then, the scanner driver determines the average value Yav2 of the luminance of the pixels in the small region Ry2, based on the obtained average values AVr2, AVg2 and AVb2 of the density values of each of the colors (S566). Here, the scanner driver determines the average value Yav2 from Equation (8), for example.

After this, the scanner driver compares the determined average value Yav2 and the previously obtained target value Ym2 (S568). Here, if the determined average value Yav2 has not reached the target value Ym2, the scanner driver returns to Step S556, and again obtains the new ΔYp2 by adding "1" (S556), obtains the output value "Y2" of the point Ps2 (S558), and performs an enhancement of the image based on this (S560). Then, the scanner driver generates histograms of the enhanced image (S562), partitions them into four small regions (S564), and again obtains the average value Yav2 (S566). After this, the obtained average value Yav2 and the target value Ym2 are compared, and it is again checked whether the determined average value Yav2 has reached the target value Ym2 (S568). The scanner driver repeats this process (S556-S568) until the determined average value Yav2 reaches the target value Ym2. That is to say, the difference ΔYp2 is increased by successively adding "1", until the determined average value Yav2 reaches the target value Ym2.

Then, when the determined average value Yav2 has reached the target value Ym2, the scanner driver sets the output value "Y2" of the point Ps2 based on the thus obtained difference ΔYp2 (S570). That is to say here, the scanner driver sets the value obtained by adding the difference ΔYp2 to the output value "Yt2" as the output value "Y2" of the point Ps2.

Thus, the scanner driver sets the output value "Y2" of the point Ps2 such that the average value Yav2 of the luminance of the pixels in the small region Ry2 of the enhanced histograms becomes the target value Ym2. It should be noted that if the output value "Y2" of the point Ps2 is set to a value that is smaller than the output value "Yt2", then the scanner driver may check in Step S568 whether the average value Yav2 has become equal to or lower than the target value Ym2.

As explained above, the output value "Y3" of the point Ps3 can be determined from the straight line connecting the point Ps2 and the point Ps0, as the output value corresponding to the input value "X3".

(4) Alternative Method for Setting the Input Values X1, X2 and X3

As an alternative method for setting the input values "X1", "X2" and "X3" of the above-noted three points Ps1, Ps2 and Ps3, there is also the following method. For example, it is also possible to set them while giving consideration to the average values Yav1, Yav2 and Yav3 of the luminance of the pixels in the small regions Ry1, Ry2 and Ry3. That is to say, the input values "X1", "X2" and "X3" of the three points Ps1, Ps2 and Ps3 may reflect the average values Yav1, Yav2 and Yav3 of the luminance of the pixels in the small regions Ry1, Ry2 and Ry3. More specifically, the following setting method is possible.

Figure 29A:
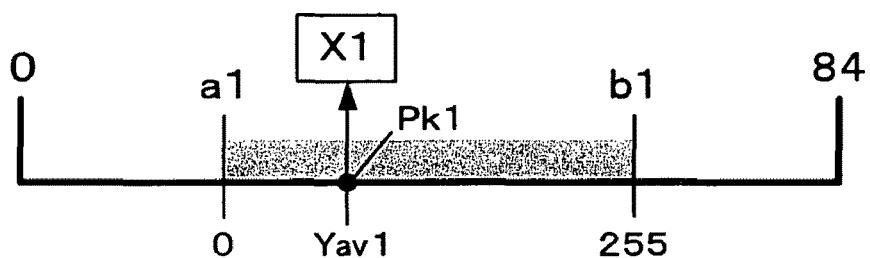
FIG. 29A is an explanatory diagram of an example of another method for setting the input value "X1" of the point Ps1.
Figure 29B:
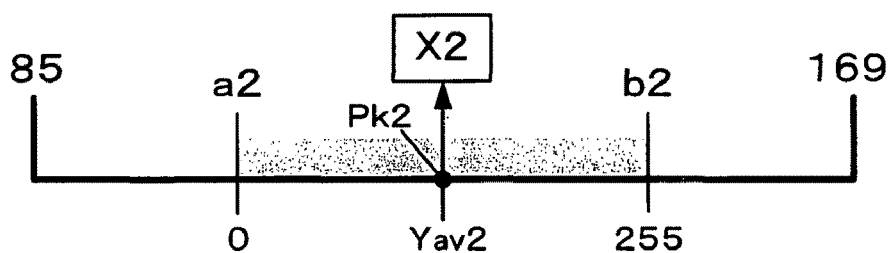
FIG. 29B is an explanatory diagram of an example of another method for setting the input value "X2" of the point Ps2.
Figure 29C:
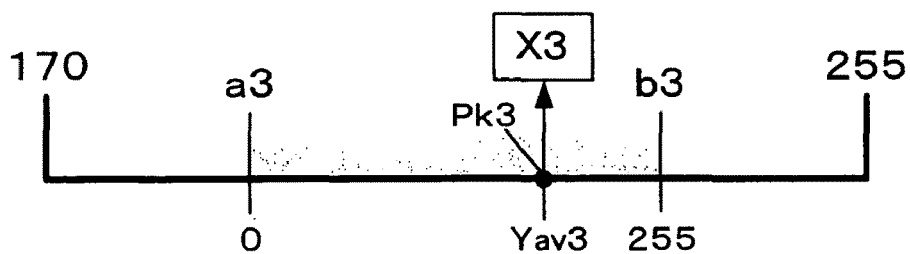
FIG. 29C is an explanatory diagram of an example of another method for setting the input value "X3" of the point Ps3.

FIGS. 29A to 29C illustrate an example of the case that the three input values "X1", "X2" and "X3" are set reflecting the average values Yav1, Yav2 and Yav3 of the luminance of the pixels in the three small regions Ry1, Ry2 and Ry3. FIG. 29A illustrates a method for setting the input value "X1" of the point Ps1. FIG. 29B illustrates a method for setting the input value "X2" of the point Ps2. FIG. 29C illustrates a method for setting the input value "X3" of the point Ps3.

To set the input value "X1" of the point Ps1, a predetermined range "a1" to "b1" is set within the range "0" to "84" within which the input value "X1" is set, as shown in FIG. 29A. This predetermined range "a1" to "b1" is set substantially in the middle of the range "0" to "84". "a1" and "b1" are respectively set to suitable values within the range "0" to "84". The predetermined range "a1" to "b1" set in this manner is divided into 256 equal portions, to which the values "0" to "255" are assigned, and the point Pk1 corresponding to the average value Yav1 of the luminance of the pixels in the small region Ry1 is specified. Then, the value of the range "0" to "84" corresponding to this point Pk1 is determined. The determined value is set as the input value "X1" of the point Ps1.

To set the input value "X2" of the point Ps2, a predetermined range "a2" to "b2" is set within the range "85" to "169" within which the input value "X2" is set, as shown in FIG. 29B. This predetermined range "a2" to "b2" is set substantially in the middle of the range "85" to "169". "a2" and "b2" are respectively set to suitable values within the range "85" to "169". The predetermined range "a2" to "b2" set in this manner is divided into 256 equal portions, to which the values "0" to "255" are assigned, and the point Pk2 corresponding to the average value Yav2 of the luminance of the pixels in the small region Ry2 is specified. Then, the value of the range "85" to "169" corresponding to this point Pk2 is determined. The determined value is set as the input value "X2" of the point Ps2.

To set the input value "X3" of the point Ps3, a predetermined range "a3" to "b3" is set within the range "170" to "255" within which the input value "X3" is set, as shown in FIG. 29C. This predetermined range "a3" to "b3" is set substantially in the middle of the range "170" to "255". "a3" and "b3" are respectively set to suitable values within the range "170" to "255". The predetermined range "a3" to "b3" set in this manner is divided into 256 equal portions, to which the values "0" to "255" are assigned, and the point Pk3 corresponding to the average value Yav3 of the luminance of the pixels in the small region Ry3 is specified. Then, the value of the range "170" to "255" corresponding to this point Pk3 is determined. The determined value is set as the input value "X3" of the point Ps3.

The following is the reason why the predetermined ranges "a1" to "b1", "a2" to "b2" and "a3" to "b3" are set when setting the input values "X1", "X2" and "X3" of the three points Ps1, Ps2 and Ps3, while reflecting the average values Yav1, Yav2 and Yav3 of the luminance of the pixels in the small regions Ry1, Ry2 and Ry3. If the average values Yav1, Yav2 and Yav3 of the luminance of the pixels in the small regions Ry1, Ry2 and Ry3 are set unchanged as the input values "X1", "X2" and "X3", then the range of values that the input values "X1", "X2" and "X3" can take on is broadened, and therefore there is the risk that the adjusted tone curve Tc is affected considerably.

For example, let us assume that the average value Yav1 of the luminance of the pixels in the small region Ry1 is very small. If the average value Yav1 is set unchanged as the input value "X1" of the point Ps1, and the point Ps1 is set within the tone curve Tc in FIG. 27, then the position of the point Ps1 moves to the left in the figure and approaches the vertical axis, so that the rise of the tone curve Tc becomes very steep. Moreover, if the average value Yav1 of the luminance of the pixels in the small region Ry1 is very large, then the position of the point Ps1 moves to the right in the figure and approaches the point Ps2, so that the shape of the tone curve Tc becomes warped. This is also the same for the points Ps2 and Ps3.

Accordingly, in order to ensure that the positions of the points Ps1, Ps2 and Ps3 do not become too close to each other, the values establishing the predetermined ranges, that is, "a1", "b1", "a2", "b2", "a3" and "b3" are each set to suitable values, so that the shape of the tone curve Tc will not become warped.

Thus, the scanner driver generates information for setting the three points Ps1, Ps2 and Ps3 for adjusting the tone curve Tc for the "density enhancement" as the enhancement information, based on the obtained two target values Ym1 and Ym2.

It should be noted that in this embodiment, three points Ps1, Ps2 and Ps3 are set as the enhancement information, but it is not necessarily required to set three points Ps1, Ps2 and Ps3 as the enhancement information. That is to say, the number of points that are set as enhancement information may also be one or two, and it may also be four or greater. The number of points that are set may be set as suitable in accordance with the number of small regions that are obtained by partitioning the regions represented by the histograms for the three colors red (R), green (G) and blue (B), but it may also be set as suitable in accordance with the number of the small regions selected in order to obtain the attribute information.

Moreover, the three points Ps1, Ps2 and Ps3 that are set as enhancement information do not have to be arranged within the partitions obtained by partitioning the scope of values that the input values can take on, that is in this embodiment, the values "0" to "255", into three ranges.

Moreover, in this embodiment, the setting information of the three points Ps1, Ps2 and Ps3 for adjusting the tone curve Tc in the "density enhancement" is generated as the enhancement information by performing the "density enhancement" as the backlight enhancement process, but it is not necessarily required to generate such setting information as the enhancement information. That is to say, it is sufficient if information suitable for the processing carried out as the backlight enhancement process is generated as the enhancement information.

Backlight Enhancement Process

Then, the scanner driver performs a backlight enhancement process on the image read in with the image reading apparatus 10, based on the information relating to the three points Ps1, Ps2 and Ps3 for adjusting the tone curve Tc for the "density enhancement", which have been generated as the enhancement information in this manner. It should be noted that in this embodiment, the scanner driver corresponds to an "enhancement processing section". More specifically, in the "density enhancement" in the adjustment procedure explained in FIG. 11, the density values for each color of the data of the pixels constituting the image read in with the image reading apparatus 10 are converted based on the tone curve Tc adjusted with the information relating to the three points Ps1, Ps2 and Ps3 generated as the enhancement information. Thus, the scanner driver subjects the image read in with the image reading apparatus 10 to a backlight enhancement process.

It should be noted that the image subjected to this backlight enhancement process may be an image that already has been subjected to a histogram adjustment or an image adjustment ((3) but not a vividness adjustment) in accordance with the adjustment procedure shown in FIG. 11. The scanner driver performs the backlight enhancement process through a "density enhancement" on the image that already has been subjected to such a histogram adjustment or an image adjustment ((3) but not a vividness adjustment).

Enhancement of a Backlight Image in which the Color Balance of Intermediate Tones is Destroyed The following is an explanation of the "process for enhancing a backlight image in which the color balance of intermediate tones is destroyed." This enhancement process is carried out in the case that it is determined in the "process for determining whether the image is an image in which the color balance of intermediate tones is destroyed" that the image is an image in which the color balance of intermediate tones is destroyed.

This enhancement process is carried out through the procedure illustrated in FIG. 13B. Here, this enhancement process is carried out using the histograms for each of the colors RGB that the scanner driver has generated previously for the "backlight image determination". That is to say, as in the case of the "process for enhancing an ordinary backlight image," attribute information is obtained from the three small regions Ry1, Ry2 and Ry3 from among the four small regions Ry1, Ry2, Ry3 and Ry4 obtained by partitioning the histograms for each of the colors RGB generated previously for the "backlight image determination," enhancement information for carrying out the "process for enhancing a backlight image in which the color balance of intermediate tones is destroyed" is generated based on this obtained attribute information, and the enhancement process is performed on the image based on this enhancement information. This enhancement method is described in greater detail below.

Obtaining the Attribute Information

The scanner driver first obtains the respective attribute information from the three small regions Ry1, Ry2 and Ry3 out of the four small regions Ry1, Ry2, Ry3 and Ry4 obtained by partitioning the histograms for each of the colors RGB generated previously for the "backlight image determination". Here, as in the case of the "enhancement of an ordinary backlight image", the average values AVr1, AVr2, AVr3, AVg1, AVg2, AVg3, AVb1, AVb2 and AVb3 of the density values of the pixels in the three small regions Ry1, Ry2 and Ry3 are obtained from the histograms for each of the colors RGB as the attribute information.

Generation of Enhancement Information

After this, the scanner driver generates the enhancement information for performing an enhancement process on a backlight image in which the color balance of intermediate tones is destroyed, based on the obtained average values AVr1, AVr2, AVr3, AVg1, AVg2, AVg3, AVb1, AVb2 and AVb3. The following is an explanation of a method for generating the enhancement information in accordance with this embodiment.

(1) Obtaining the Information Relating to Luminance

Here, as in the case of the "enhancement of an ordinary backlight image," the scanner driver obtains the average values Yav1, Yav2, Yav3 of the luminance of the pixels in each of the three small regions Ry1, Ry2 and Ry3 from the obtained average values AVr1, AVr2, AVr3, AVg1, AVg2, AVg3, AVb1, AVb2 and AVb3. In this case, the scanner driver uses the above-noted Equations (10)-(12), for example. Moreover, the scanner driver determines the average value Yav0 of the luminance of the overall image read in with the image reading apparatus 10 from the obtained average values Yav1, Yav2 and Yav3 of the luminance. In this case, the scanner driver uses the above-noted Equation (13), for example.

(2) Obtaining the Target Values

Next, the scanner driver obtains the target values based on the obtained average values Yav1, Yav2 and Yav3 of the luminance of the pixels in the three small regions Ry1, Ry2 and Ry3, and the average value Yav0 of the luminance of the overall image. These target values are values obtained for performing the enhancement process on a backlight image in which the color balance of the intermediate tones is destroyed, and are values serving as a target for determining the extent of the enhancement process. In this embodiment, two target values Ym1 and Ym2 are obtained as the target values for enhancing a backlight image in which the color balance of the intermediate tones is destroyed. Of these, the target value Ym1 is obtained for the small region Ry1. And the target value Ym2 is obtained for the small region Ry2. It should be noted that here, the small region Ry2 corresponds to a "selected small region."

As in the case of the "enhancement of an ordinary backlight image," these two target values Ym1 and Ym2 are obtained by the Relations (A) and (B) shown in FIG. 26, based on the sum Sadd obtained by adding the average value Yav1 of the luminance of the pixels in the small region Ry1 and the average value Yav0 of the luminance of the overall image. That is to say, the target value Ym1 is obtained as the value corresponding to the sum Sadd from the Relation (A). And the target value Ym2 is obtained as the value corresponding to the sum Sadd from the Relation (B).

(3) Generation of Enhancement Information

The scanner driver generates the enhancement information based on the two target values Ym1 and Ym2 obtained in this manner. This enhancement information is information for carrying out a suitable enhancement process on a backlight image in which the color balance of intermediate tones is destroyed. In this embodiment, as in the case of the "enhancement of an ordinary backlight image," the scanner driver performs the above-noted "density enhancement," as the process for enhancing a backlight image in which the color balance of intermediate tones is destroyed. Accordingly, in this embodiment, the scanner driver generates the setting information for the "density enhancement" as the enhancement information. The following is a detailed explanation of a method for generating this setting information.

In order to perform the "density enhancement" on a backlight image in which the color balance of intermediate tones is destroyed, the scanner driver individually adjusts the tone curves Tcr, Tcg and Tcb of each of the colors red (R), green (G) and blue (B), as shown in FIG. 8. Here, the scanner driver adjusts the tone curves Tcr, Tcg and Tcb of the colors red (R), green (G) and blue (B) based on the obtained two target values Ym1 and Ym2. The two target values Ym1 and Ym2 are used as the target values for all colors, when adjusting the tone curves Tcr, Tcg and Tcb of the colors RGB. A similar method as for the "enhancement of an ordinary backlight image" shown in FIG. 27 is used as a method for adjusting the tone curves Tcr, Tcg and Tcb of the colors RGB based on the two target values Ym1 and Ym2.

Figure 30:
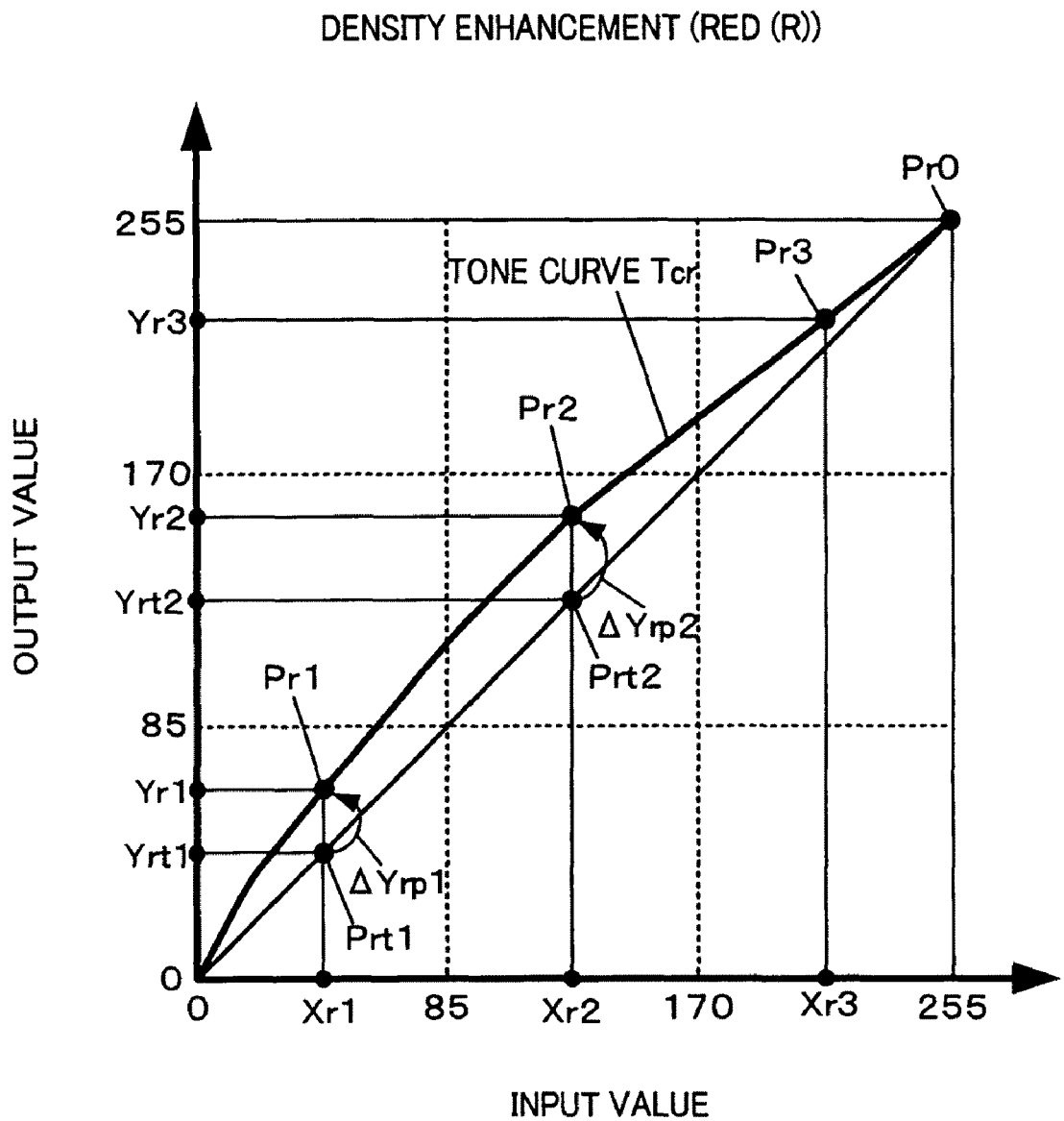
FIG. 30 is an explanatory diagram of an example of a method for adjusting the tone curve for red (R).

FIG. 30 illustrates a method for adjusting the tone curve Tcr for red (R) based on the two target values Ym1 and Ym2. Here, the adjustment method of the tone curve Tcr for red (R) is explained as an example.

As the enhancement information, the scanner driver sets three points Pr1, Pr2 and Pr3 through which the tone curve Tcr passes, based on the two target values Ym1 and Ym2, as shown in this figure. The point Pr1 is set in correspondence with the small region Ry1, the point Pr2 is set in correspondence with the small region Ry2, and the point Pr3 is set in correspondence with the small region Ry3. The input values of the points Pr1, Pr2 and Pr3 are set to "Xr1", "Xr2" and "Xr3", respectively. The output values of the points Pr1, Pr2 and Pr3 are set to "Yr1", "Yr2" and "Yr3", respectively. Here, the input values "Xr1", "Xr2" and "Xr3" of the points Pr1, Pr2 and Pr3 are set by the same method as the input values "X1", "X2" and "X3" of the points P1, P2 and P3 illustrated in FIG. 27.

On the other hand, the output values "Yr1" and "Yr2" of the points Pr1 and Pr2 are set based on the two target values Ym1 and Ym2. The output value "Yr3" of the point Pr3 is set on the straight line connecting the point Pr2 with the point Pr0. The point Pr0 is the point whose input value is set to "255" and whose output value is set to "255". If the input value "Xr3" of the point Pr0 is established, then the output value "Yr3" can be determined.

The output values "Yr1" and "Yr2" of the points Pr1 and Pr2 are determined by a similar method as in the case of the "enhancement of an ordinary backlight image." That is to say, for example the output value "Yr1" of the point Pr1 is set such that the average value AVr1 of the density values of the pixels in the small region Ry1 of the histogram for red (R) after the enhancement becomes the target value Ym1. More specifically, when "Yrt1" is the output value obtained in the case that no "density enhancement" is performed on the input value "Xr1" (that is, the same value as the input value "Xr1"), then the difference ΔYrp1 between this output value "Yrt1" and the output value "Yr1" of the point Pr1 is determined.

Figure 31A:
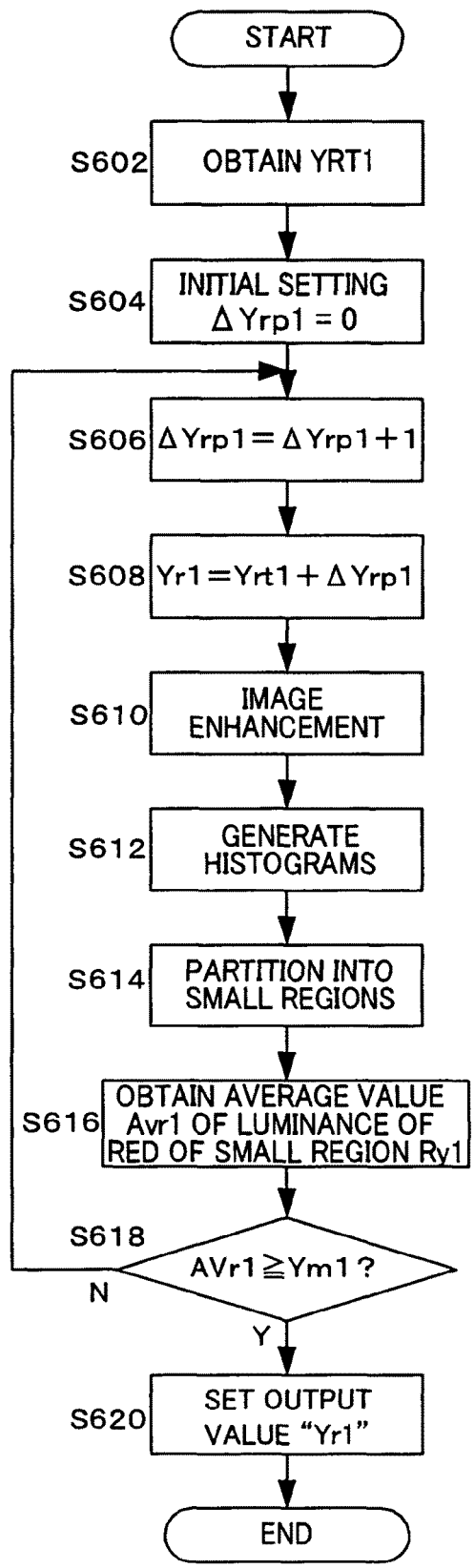
FIG. 31A is a flowchart illustrating an example of a procedure for setting the point Pr1.

FIG. 31A illustrates a method for determining this difference ΔYrp1. As shown in this figure, the scanner driver first obtains the output value "Yrt1" from the input value "Xr1" (S602). Next, the difference ΔYrp1 is set to an initial value "0" (S604). Then, the value obtained by adding "1" to the difference ΔYrp1 is set as the new ΔYrp1 (S606). Next, the value obtained by adding ΔYrp1 to the previously obtained output value "Yrt1" is set as the output value "Yr1" of the point Pr1 (S608), and the data of the image after the enhancement is obtained for the case that the "density enhancement" is performed based on the tone curve Tcr set with this point Pr1 (S610). It should be noted that at this time, the performance of other various adjustments (enhancements), such as a "histogram adjustment" or an "image adjustment" may also be reflected in addition to the "density enhancement", as illustrated in FIG. 11.

After this enhancement has been carried out, the histogram for red (R) is generated based on the data of the image obtained through this enhancement (S612). Then, the produced histogram for red (R) is partitioned into small regions (S614). Here, the histogram is partitioned into the four small regions Ry1, Ry2, Ry3 and Ry4. Then, the average value AVr1 of the density values is obtained as the attribute information relating to the small region Ry1 (S616). After this, the determined average value AVr1 and the previously obtained target value Ym1 are compared (S618), and it is checked whether the determined average value AVr1 is equal to or greater than the target value Ym1. Then, if the determined average value AVr1 is not equal to or greater than the target value Ym1, the procedure returns to Step S606, and a new ΔYrp1 is obtained again by adding "1" to the difference ΔYrp1 (S606). The scanner driver repeats this process (S606-S618) until the determined average value AVr1 reaches the target value Ym1. That is to say, the difference ΔYrp1 is increased by successively adding "1", until the determined average value AVr1 reaches the target value Ym1.

Then, when the determined average value AVr1 has reached the target value Ym1, the scanner driver sets the output value "Yr1" of the point Pr1 based on the thus obtained difference ΔYrp1 (S620). In this way, the output value "Yr1" of the point Pr1 is set such that the average value AVr1 of the density values of the pixels in the small region Ry1 of the histogram for red (R) after this enhancement becomes the target value "Ym1". It should be noted that if the output value "Yr1" of the point Pr1 is set to a value that is smaller than the output value "Yrt1", then it may be checked in Step S618 whether the average value AVr1 is lower than the target value Ym1.

Figure 31B:
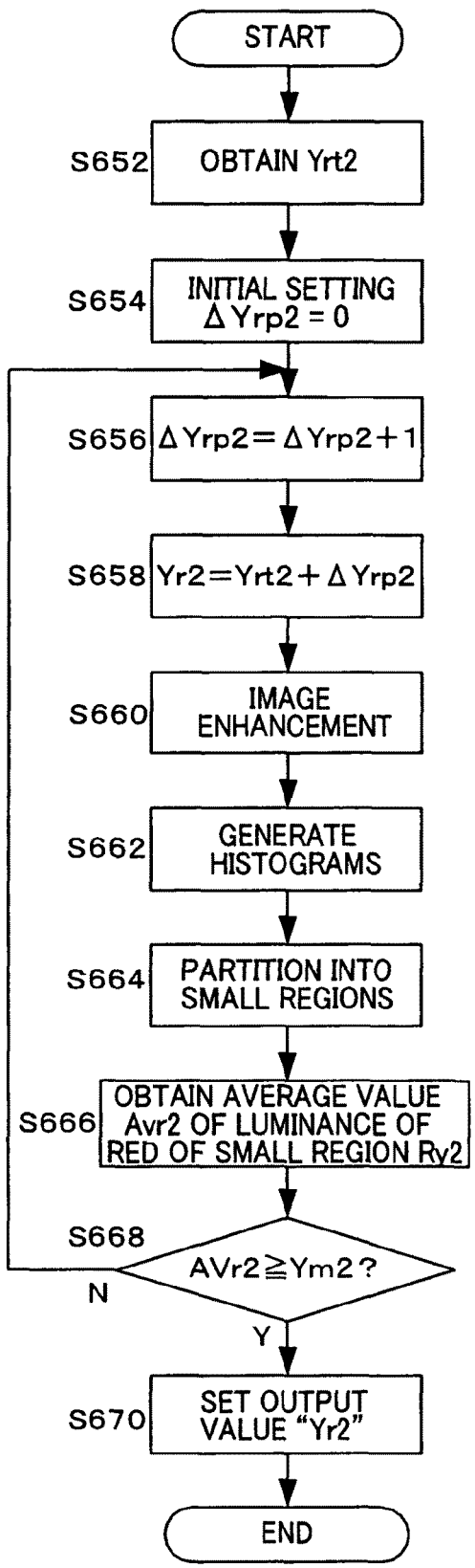
FIG. 31B is a flowchart illustrating an example of a procedure for setting the point Pr2.

On the other hand, also the output value "Yr2" of the point Pr2 is set by a similar method as for the output value "Yr2" of the point Pr2, such that the average value AVr2 of the density values of the pixels in the small region Ry2 of the histogram for red (R) after the enhancement becomes the target value Ym2. It should be noted that the procedure for setting the output value "Yr2" of the point Pr2 is shown in FIG. 31B.

Through this method, the scanner driver adjusts also the other tone curves besides the one for red (R), that is, the tone curves Tcg and Tcb for green (G) and blue (B), based on the two target values Ym1 and Ym2.

Enhancement Process

Then, the scanner driver performs a process for enhancing a backlight image in which the color balance for intermediate tones is destroyed on the image obtained with the image reading apparatus 10, based on the tone curves Tcr, Tcg and Tcb for each of the colors in the "density enhancement", that were adjusted in this manner based on the enhancement information. More specifically, in the "density enhancement" of the adjustment procedure illustrated in FIG. 11, the density values of each of the colors of the data of each of the pixels constituting the image read in with the image reading apparatus 10 are converted based on the tone curves Tcr, Tcg and Tcb for each of the colors in the "density enhancement" adjusted based on the enhancement information. Thus, the scanner driver subjects the image read in with the image reading apparatus 10 to a process for enhancing a backlight image in which the color balance of intermediate tones is destroyed.

It should be noted that the image subjected to this process for enhancing a backlight image in which the color balance of intermediate tones is destroyed is an image that already has been subjected to a histogram adjustment or an image adjustment ((3) but not a vividness adjustment) in accordance with the adjustment procedure shown in FIG. 11. The scanner driver thus performs the process for enhancing a backlight image in which the color balance of intermediate tones is destroyed through a "density enhancement" on the image that already has been subjected to such a histogram adjustment or an image adjustment ((3) but not a vividness adjustment) in this manner.

Figure 32A:
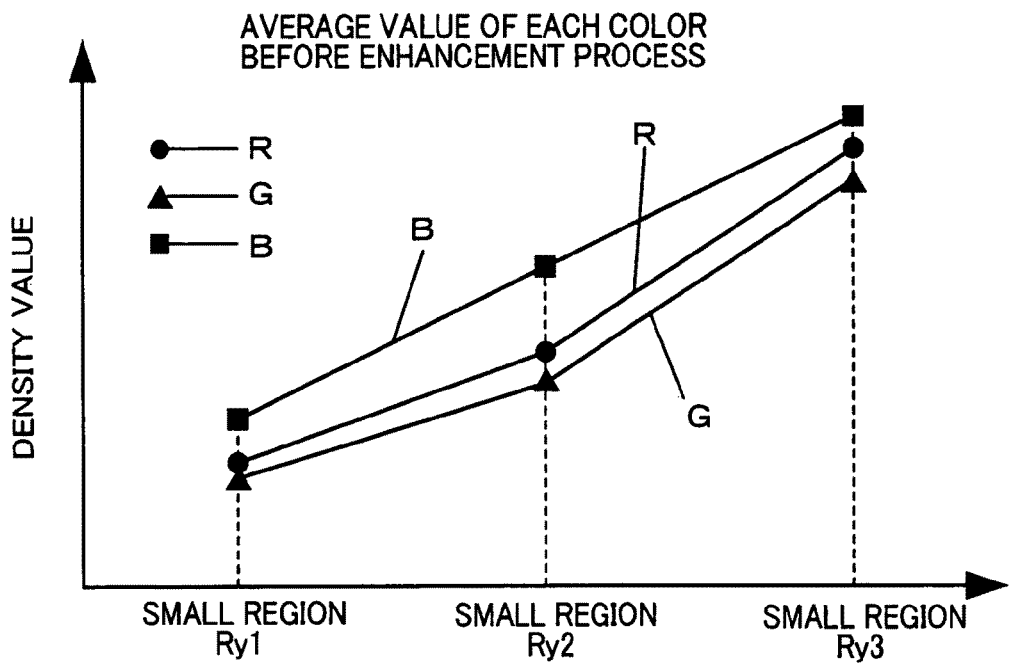
FIG. 32A is an explanatory diagram of the average values of the RGB colors prior to the enhancement process performed on a backlight image in which the color balance of intermediate tones is destroyed.
Figure 32B:
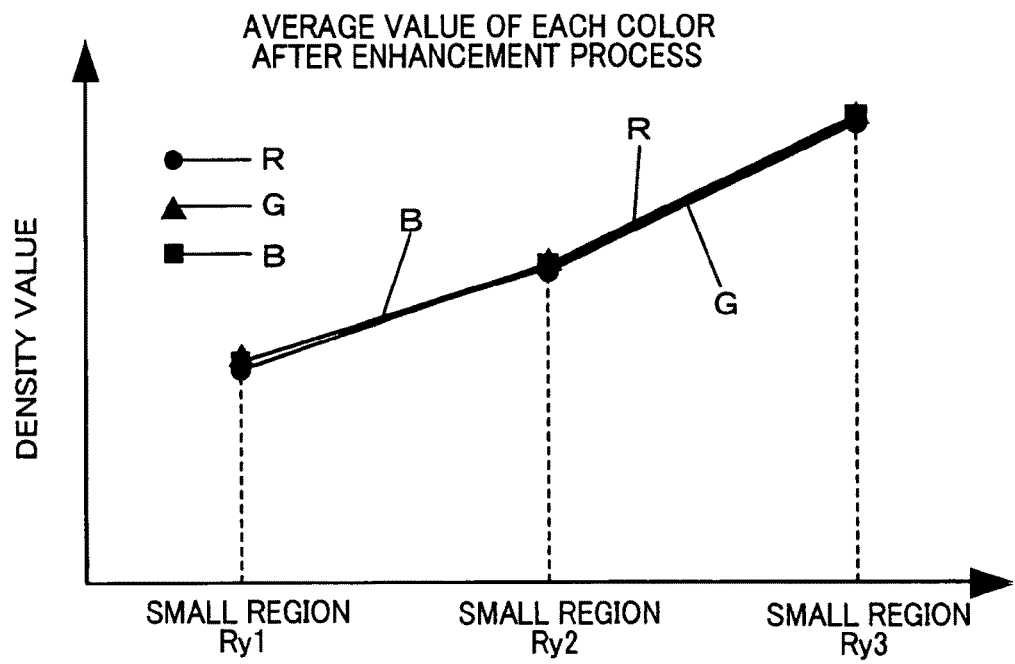
FIG. 32B is an explanatory diagram of the average values of the RGB colors after the enhancement process performed on a backlight image in which the color balance of intermediate tones is destroyed.

FIGS. 32A and 32B show the average values of each of the colors RGB before and after the process for enhancing a backlight image in which the color balance of intermediate tones is destroyed. FIG. 32A shows the average values of each of the colors RGB before the enhancement process. FIG. 32B shows the average values of each of the colors RGB after the enhancement process.

Before the enhancement process, as shown in FIG. 32A, there is a larger variation among the average values of the density values of each of the colors RGB of the pixels in the three small regions Ry1, Ry2 and Ry3 in the small region Ry2, that is, in the region of the intermediate tones, than in the other small regions Ry1 and Ry3.

On the other hand, after the enhancement process, as shown in FIG. 32B, the average values AVr1, AVg1 and AVb1 of the small region Ry1 of each of the colors RGB are set such that they assume the target value Ym1, which is the same for all colors. Thus, the average values AVr1, AVg1 and AVb1 of the small regions Ry1 of each of the colors RGB are all set to substantially the same value. Moreover, also the average values AVr2, AVg2 and AVb2 of the small regions Ry2 of each of the colors RGB are each set to the target value Ym2, which is the same for all colors. Thus, the average values AVr2, AVg2 and AVb2 of the small regions Ry2 of each of the colors RGB are all set to substantially the same value.

Figure 33:
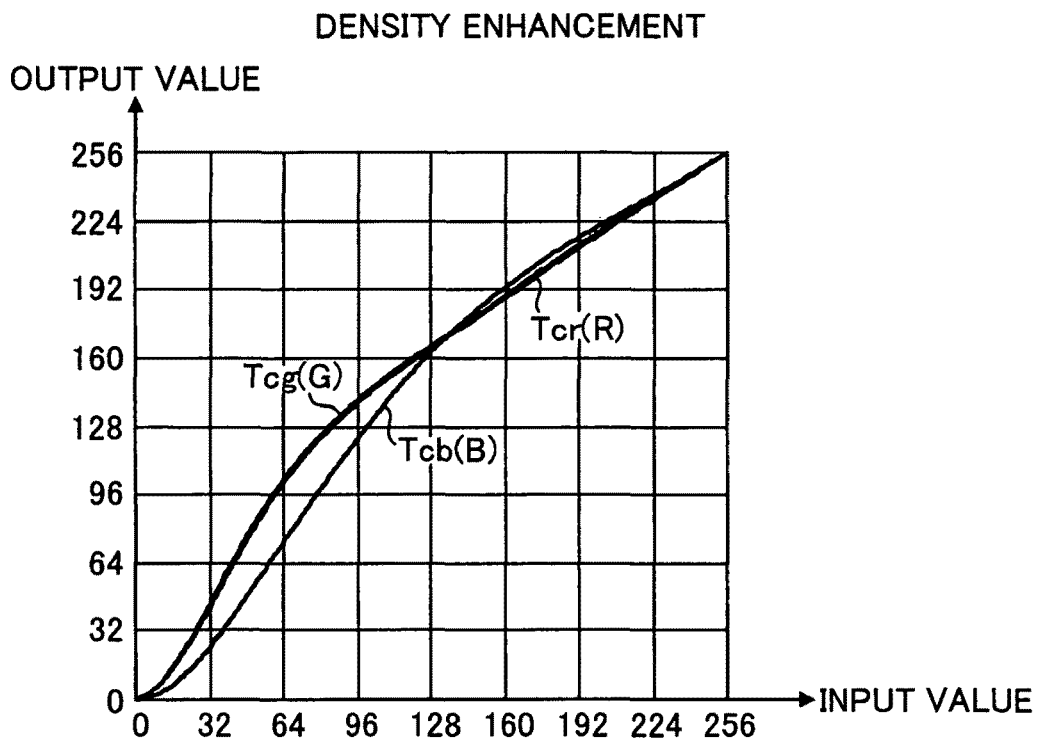
FIG. 33 is an explanatory diagram of an example of tone curves of the colors RGB.

FIG. 33 shows an example of the tone curves Tcr, Tcg and Tcb for each of the colors RGB generated through this enhancement process. As shown in this figure, each of the tone curves Tcr, Tcg and Tcb of each of the colors RGB has a different shape. The reason for this is that the suitable points that are set in order to form the tone curves Tcr, Tcg and Tcb of each of the colors RGB (for example the points Pr1, Pr2 and Pr3 in the case of the tone curve Tcr for red (R)) are set individually for each of the colors RGB. Thus, by forming each of the tone curves Tcr, Tcg and Tcb of each of the colors RGB individually, it is possible to carry out an enhancement process that is suitable for backlight images in which the color balance of intermediate tones is destroyed.

Figure 34A:
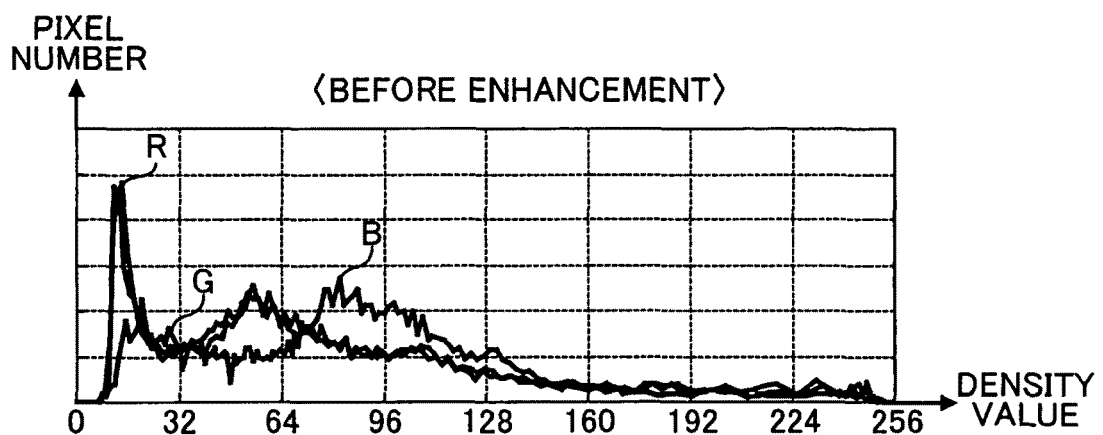
FIG. 34A is an explanatory diagram of the histograms for the colors RGB before the enhancement process.
Figure 34B:
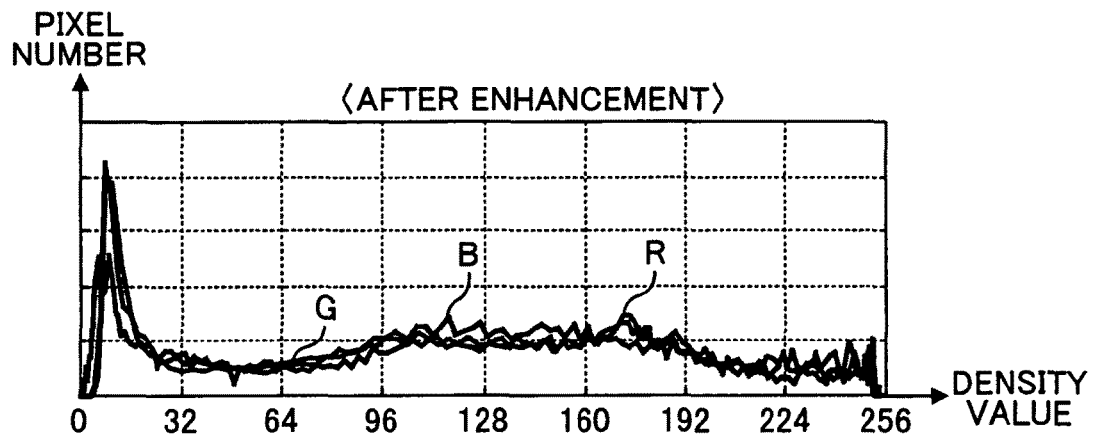
FIG. 34B is an explanatory diagram of the histograms for the colors RGB after the enhancement process.

FIGS. 34A and 34B show an example of histograms for each of the colors RGB before the enhancement process and after the enhancement process. FIG. 34A shows the histograms for each of the colors RGB before the enhancement process. FIG. 34B shows the histograms for each of the colors RGB after the enhancement process.

Before the enhancement process, as shown in FIG. 34A, there is no considerable difference between the histograms for red (R) and green (G), and they have substantially the same characteristics, whereas the shape of the histogram for blue (B) differs considerably from the shape of the histograms for red (R) and green (G) and it has different characteristics. On the other hand, after the enhancement process, the histogram for blue (B), which has been improved, has substantially the same characteristics as the histograms for red (R) and green (G), as shown in FIG. 34B.

Enhancement of Backlight Images of Sunset/Sunrise

The following is an explanation of a "process for enhancing a backlight image of a sunset or sunrise." This enhancement process is carried out if it has been determined in the "process for determining whether an image is an image of a sunset or sunrise" that the image is an image of a sunset or sunrise.

This enhancement process is performed using the histograms for each of the colors RGB that have been generated previously for the "backlight image determination". That is to say, as in the case of the "process for enhancing an ordinary backlight image" and the "process for enhancing a backlight image in which the color balance of intermediate tones is destroyed", attribute information is obtained from the three small regions Ry1, Ry2 and Ry3 out of the four small regions Ry1, Ry2, Ry3 and Ry4 obtained by partitioning the histograms for each of the colors RGB generated previously for the "backlight image determination," and the enhancement process is performed on the image based on this obtained enhancement information. This enhancement method is described in greater detail below.

Obtaining the Attribute Information

The scanner driver first obtains the respective attribute information from the three small regions Ry1, Ry2 and Ry3 out of the four small regions Ry1, Ry2, Ry3 and Ry4 obtained by partitioning the histograms for each of the colors RGB generated previously for the "backlight image determination". Here, as in the case of the "enhancement of an ordinary backlight image", as the attribute information, the average values AVr1, AVr2, AVr3, AVg1, AVg2, AVg3, AVb1, AVb2 and AVb3 of the density values of the pixels in the three small regions Ry1, Ry2 and Ry3 are respectively obtained from the histograms for each of the colors RGB.

Generation of Enhancement Information

After this, the scanner driver generates the enhancement information for performing an enhancement process on a backlight image of a sunset or sunrise, based on the obtained average values AVr1, AVr2, AVr3, AVg1, AVg2, AVg3, AVb1, AVb2 and AVb3. The following is an explanation of a method for generating the enhancement information in accordance with this embodiment.

(1) Obtaining the Information Relating to Luminance

Here, as in the case of the "enhancement of an ordinary backlight image" and the "process for enhancing a backlight image in which the color balance of intermediate tones is destroyed", the scanner driver obtains the average values Yav1, Yav2, Yav3 of the luminance of the pixels in each of the three small regions Ry1, Ry2 and Ry3 from the obtained average values AVr1, AVr2, AVr3, AVg1, AVg2, AVg3, AVb1, AVb2 and AVb3. In this case, the scanner driver uses the above-noted Equations (10)-(12), for example. Moreover, the scanner driver determines the average value Yav0 of the luminance of the overall image read in with the image reading apparatus 10 from the obtained average values Yav1, Yav2 and Yav3 of the luminance. In this case, the scanner driver uses the above-noted Equation (13), for example.

(2) Obtaining the Target Values

Next, the scanner driver obtains the target values based on the obtained average values Yav1, Yav2 and Yav3 of the luminance of the pixels in the three small regions Ry1, Ry2 and Ry3, and the average value Yav0 of the luminance of the overall image. These target values are values obtained for performing the enhancement process on a backlight image of a sunset or sunrise, and are values serving as a target for determining the extent of the enhancement process. In this embodiment, two target values Ym1 and Ym2 are obtained as the target values for enhancing a backlight image of a sunset or sunrise. Of these, the target value Ym1 is obtained for the small region Ry1. And the target value Ym2 is obtained for the small region Ry2.

As in the case of the "enhancement of an ordinary backlight image" and the "process for enhancing a backlight image in which the color balance of intermediate tones is destroyed," these two target values Ym1 and Ym2 are obtained by the Relations (A) and (B) shown in FIG. 26, based on the sum Sadd obtained by adding the average value Yav1 of the luminance of the pixels in the small region Ry1 and the average value Yav0 of the luminance of the overall image. That is to say, the target value Ym1 is obtained as the value corresponding to the sum Sadd from the Relation (A). And the target value Ym2 is obtained as the value corresponding to the sum Sadd from the Relation (B).

(3) Generation of Enhancement Information

The scanner driver generates the enhancement information based on the two target values Ym1 and Ym2 obtained in this manner. This enhancement information is information for carrying out a suitable enhancement process on a backlight image of a sunset or sunrise. In this embodiment, as in the case of the "enhancement of an ordinary backlight image" and the "process for enhancing a backlight image in which the color balance of intermediate tones is destroyed," the scanner driver performs the above-noted "density enhancement," as the process for enhancing a backlight image of a sunset or sunrise. Accordingly, in this embodiment, the scanner driver generates the setting information for the "density enhancement" as the enhancement information. The following is a detailed explanation of a method for generating this setting information.

As in the case of the "process for enhancing a backlight image in which the color balance of intermediate tones is destroyed", the scanner driver individually adjusts the tone curves Tcr, Tcg and Tcb of each of the colors red (R), green (G) and blue (B), as shown in FIG. 8, in order to perform the "density enhancement" on a backlight image of a sunset or sunrise. Here, the scanner driver adjusts the tone curves Tcr, Tcg and Tcb of each of the colors red (R), green (G) and blue (B) based on the obtained two target values Ym1 and Ym2. A similar method as for the "process for enhancing a backlight image in which the color balance of intermediate tones is destroyed" shown in FIG. 30 is adopted as a method for adjusting the tone curves Tcr, Tcg and Tcb of each of the colors RGB based on the two target values Ym1 and Ym2.

However, the method for adjusting the tone curves Tcr, Tcg and Tcb of each of the colors RGB that is performed here differs partially from the adjustment method for the above-described "process for enhancing a backlight image in which the color balance of intermediate tones is destroyed." That is to say, in the above-described "process for enhancing a backlight image in which the color balance of intermediate tones is destroyed", the two target values Ym1 and Ym2 are used as the target values, which are the same for all colors, for adjusting the tone curves Tcr, Tcg and Tcb of each of the colors RGB. However, in the enhancement process that is performed here, even though only the target value Ym1 of the two target values Ym1 and Ym2 is used as the target value that is the same for all colors, the target value Ym2 is not used as a target value that is the same for each of the colors red (R), green (G) and blue (B), but is used as a target value for only one color. For the target values of the other colors, separate target values are used, that are determined individually based on this target value Ym2. That is to say, individual target values are used for each color. Here, the color for which the target value Ym2 is used unchanged is set as the color in which the average value of the density values of the pixels in the small region Ry2 is largest. For the other colors, the target values are set individually based on the target value Ym2, in correspondence with the average value of the density values of the pixels in the small region Ry2.

More specifically, the adjustment method of the tone curve Tcr for red (R) is explained as an example. As the enhancement information, the scanner driver sets three points Pr1, Pr2 and Pr3 through which the tone curve Tcr passes, based on the two target values Ym1 and Ym2, as shown in FIG. 30. The point Pr1 is set in correspondence with the small region Ry1, the point Pr2 is set in correspondence with the small region Ry2, and the point Pr3 is set in correspondence with the small region Ry3. The input values of the points Pr1, Pr2 and Pr3 are respectively set to "Xr1", "Xr2" and "Xr3", and the output values of the points Pr1, Pr2 and Pr3 are respectively set to "Yr1", "Yr2" and "Yr3". Here, the input values "Xr1", "Xr2" and "Xr3" of the points Pr1, Pr2 and Pr3 are set by the same method as the input values "X1", "X2" and "X3" of the points Ps1, Ps2 and Ps3 illustrated in FIG. 27.

On the other hand, the output values "Yr1" and "Yr2" of the points Pr1 and Pr2 are set based on the two target values Ym1 and Ym2. The output value "Yr3" of the point Pr3 is set on the straight line connecting the point Pr2 with the point Pr0. The point Pr0 is the point whose input value is set to "255" and whose output value is set to "255". If the input value "Xr3" of the point Pr0 is established, then the output value "Yr3" can be determined.

The output values "Yr1" and "Yr2" of the points Pr1 and Pr2 are determined by a similar method as in the case of the "enhancement of a backlight image in which the color balance of intermediate tones is destroyed." However, for the output value "Yr2" of the point Pr2, the setting method differs here for each of the colors red (R), green (G) and blue (B). That is to say, for one of the colors red (R), green (G) and blue (B), the target value Ym2 is used as it is, whereas for the other colors, different target values are used that are obtained individually based on this target value Ym2.

Here, the image to be enhanced is an image of a sunset having histogram characteristics as shown in FIGS. 22A to 22C. In this case, the color for which the average value of the density values of the pixels in the small region Ry2 is highest is red (R). Accordingly, the color for which the target value Ym2 is used as it is set to red (R). On the other hand, for the other colors, that is, for green (G) and blue (B), the target values are set individually in accordance with the average value of the density values of the pixels in the small region Ry2, based on the target value Ym2. The target value of green (G) that is set here is taken to be "Mg2" and the target value of blue (B) is taken to be "Mb2", and these target values "Mg2" and "Mb2" can be determined by the following Relations (14) and (15).

$$Mg2 = Ym2 \times AVg2/AVr2 \quad (14)$$

$$Mb2 = Ym2 \times AVb2/AVr2 \quad (15)$$

These Relations (14) and (15) are for setting Mg2 and Mb2 such that the ratio of the average value of the density values of the pixels in the small region Ry2 of each of the colors RGB after the enhancement becomes substantially the same as the ratio before the enhancement. If the target values "Mg2" and "Mb2" are obtained using these Relations (14) and (15), then it is possible to maintain the color balance before the enhancement in the region of the intermediate tones after the enhancement.

Thus, the output value "Yr2" of the point Pr2 for red (R) is set such that the average value AVr2 of the density values of the pixels in the small region Ry2 of the histogram for red (R) after the enhancement becomes the target value "Ym2".

Figure 35:
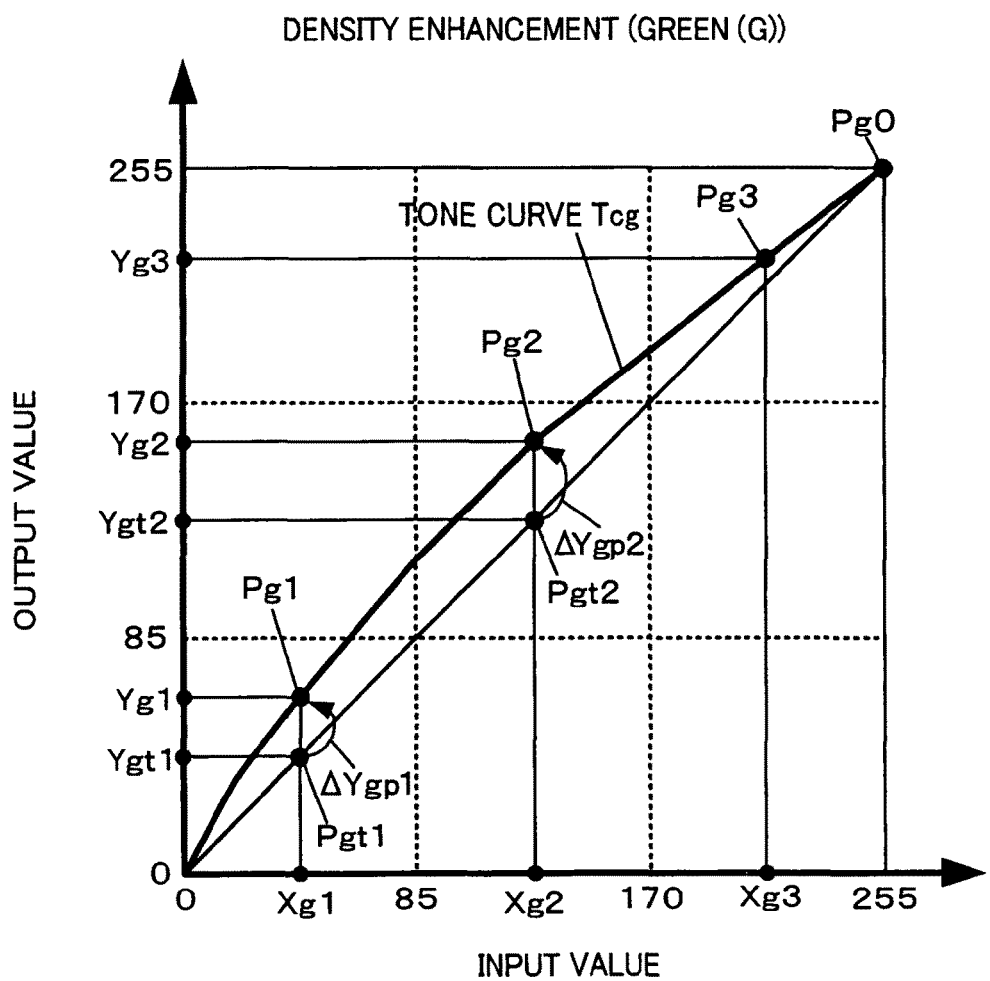
FIG. 35 is an explanatory diagram of an example of a method for adjusting the tone curve for green (G).
Figure 36:
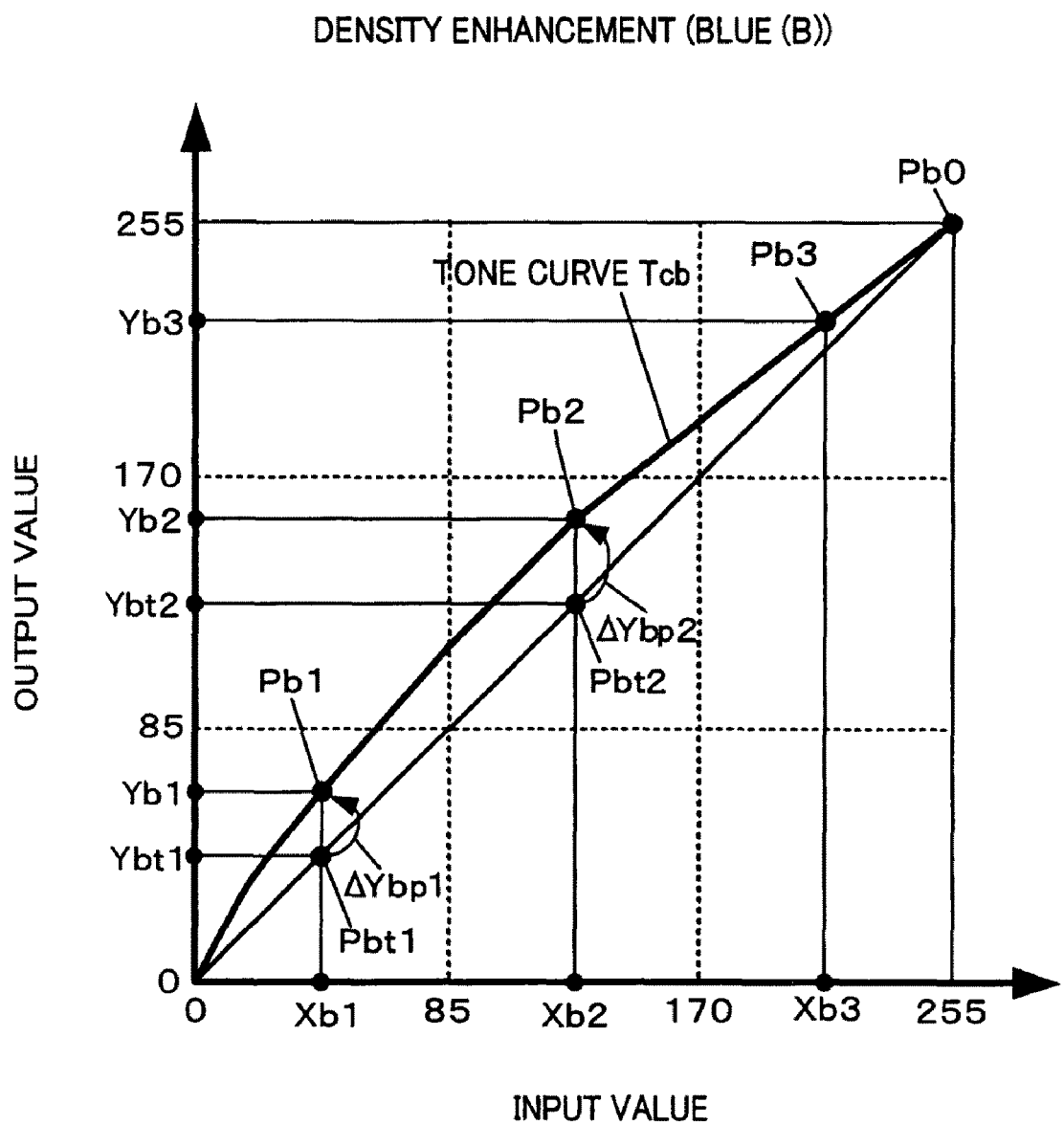
FIG. 36 is an explanatory diagram of an example of a method for adjusting the tone curve for blue (B).

On the other hand, the values for green (G) and blue (B) are set as follows. FIG. 35 illustrates a method for adjusting the tone curve Tcg for green (G). FIG. 36 illustrates a method for adjusting the tone curve Tcb for blue (B). The points for adjusting the tone curve Tcg for green (G) are the points Pg1, Pg2 and Pg3, as shown in FIG. 35, whereas the points for adjusting the tone curve Tcb for blue (B) are the points Pb1, Pb2 and Pb3, as shown in FIG. 36. The output value of the point Pg1 of green (G) is taken to be "Yg1," the output value of the point Pg2 is taken to be "Yg2" and the output value of the point Pg3 is taken to be "Yg3." Moreover, the output value of the point Pb1 of blue (B) is taken to be "Yb1," the output value of the point Pb2 is taken to be "Yb2" and the output value of the point Pb3 is taken to be "Yb3."

For the point Pg2 for green (G), the output value "Yg2" of that point Pg2 is set such that the average value AVg2 of the density values of the pixels in the small region Ry2 of the histogram for green (G) after the enhancement becomes the target value Mg2. For the point Pb2 for blue (B), the output value "Yb2" of that point Pb2 is set such that the average value AVb2 of the density values of the pixels in the small region Ry2 of the histogram for blue (B) after the enhancement becomes the target value Mb2.

For the output values "Yr1", "Yg1" and "Yb1" of the points Pr1, Pg1 and Pb1, the target value Ym1 is used as the target value for all colors RGB. That is to say, the output values "Yr1", "Yg1" and "Yb1" of the points Pr1, Pg1 and Pb1 of each of the colors RGB are set such that the average values AVr1, AVg1 and AVb1 of the density values of the pixels in the small region Ry1 of the histograms for each of the colors red (R), green (G) and blue (B) after the enhancement each become the target value Ym1.

As the method for determining the output values "Yr1", "Yg1" and "Yb1" of the points Pr1, Pg1 and Pb1 of the tone curves Tcr, Tcg and Tcb of each of the colors red (R), green (G) and blue (B), the method illustrated in FIG. 31A can be used. And as the method for determining the output value "Yr2" of the point Pr2 of the tone curve Tcr for red (R), the method illustrated in FIG. 31B can be used.

Figure 37A:
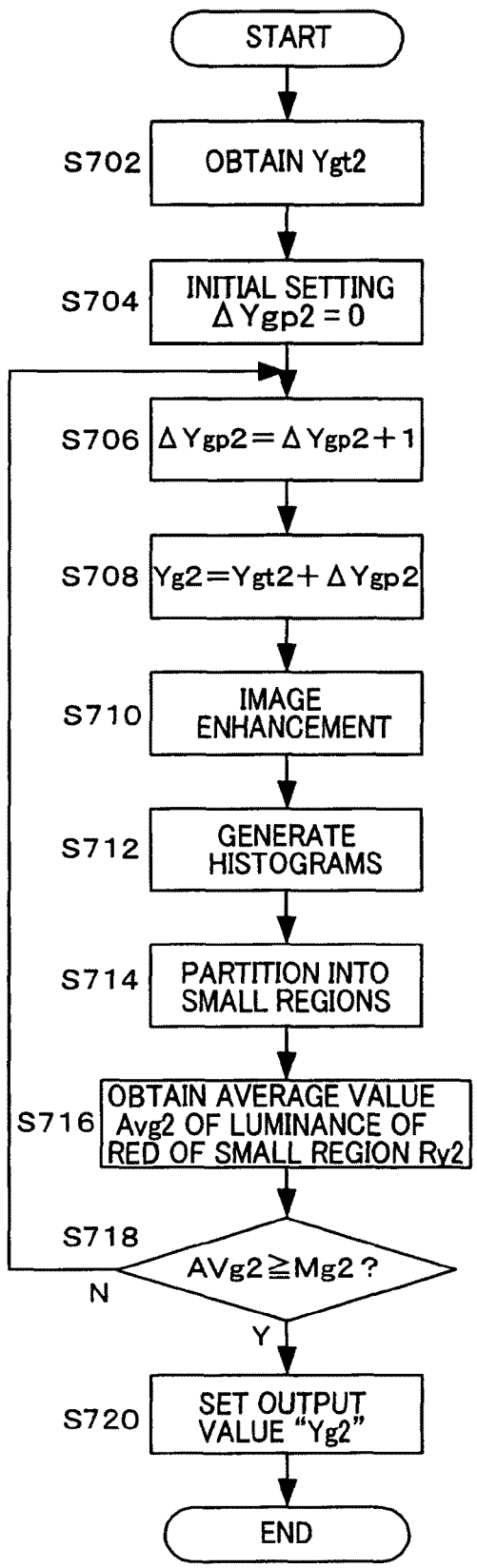
FIG. 37A is a flowchart illustrating an example of a procedure for setting the point Pg2.
Figure 37B:
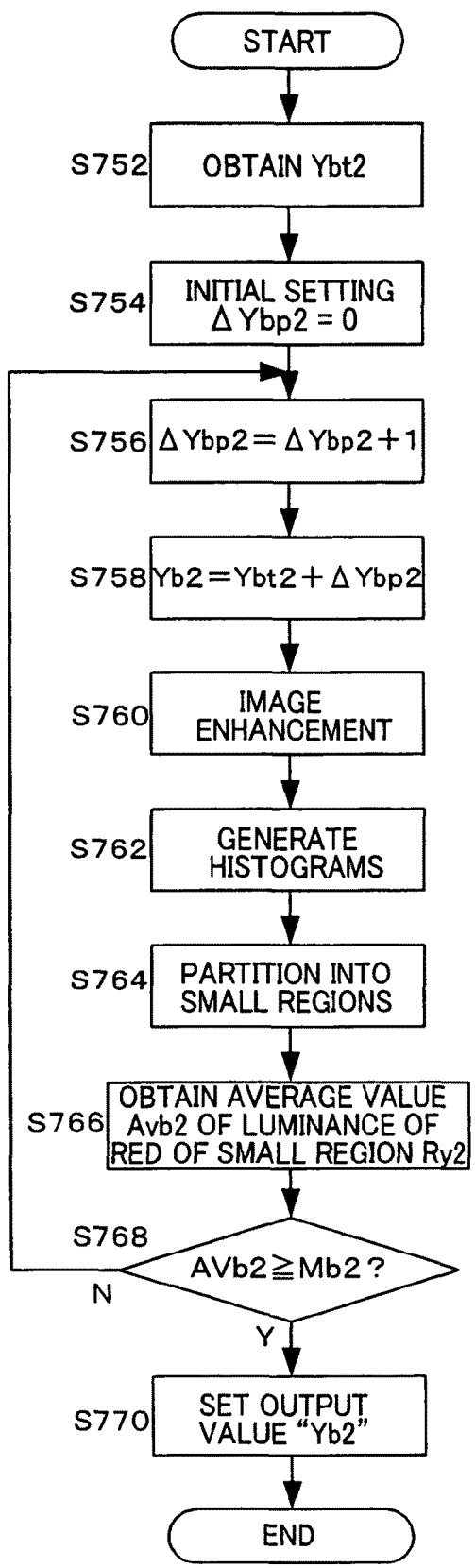
FIG. 37B is a flowchart illustrating an example of a procedure for setting the point Pb2.

On the other hand, the following is a method for determining the output values "Yg2" and "Yb2" of the points Pg2 and Pb2 of the tone curves Tcg and Tcb for green (G) and blue (B). FIG. 37A shows an example of a method for obtaining the output value "Yg2" of the point Pg2 of the tone curve Tcg for green (G). FIG. 37B shows an example of a method for obtaining the output value "Yb2" of the point Pb2 of the tone curve Tcb for blue (B). In these methods shown in FIGS. 37A and 37B, the output value "Yg2" of the point Pg2 and the output value "Yb2" of the point Pb2 are obtained by a similar method as in the method shown in FIGS. 31A and 31B explained above. However, here the output value "Yg2" of the point Pg2 for green (G) is set based on the target value Mg2, as shown in Step S718 in FIG. 37A. And the output value "Yb2" of the point Pb2 for blue (B) is set based on the target value Mb2, as shown in Step S768 in FIG. 37B.

Enhancement Process

Then, the scanner driver performs the process for enhancing a backlight image of a sunset or sunrise on the image read in with the image reading apparatus 10, based on the information relating to the three points Pr1, Pr2, Pr3, Pg1, Pg2, Pg3, Pb1, Pb2 and Pb3 of each color for adjusting the tone curves Tcr, Tcg and Tcb of each of the colors in the "density enhancement" generated as the enhancement information in this manner. More specifically, in the "density enhancement" of the adjustment procedure explained in FIG. 11, the density values for each color of the data of the pixels constituting the image read in with the image reading apparatus 10 are converted based on the tone curves Tcr, Tcg and Tcb adjusted with the information relating to the three points Pr1, Pr2, Pr3, Pg1, Pg2, Pg3, Pb1, Pb2 and Pb3 of each color generated as the enhancement information. Thus, the scanner driver subjects the image read in with the image reading apparatus 10 to the process for enhancing a backlight image of a sunset or sunrise.

It should be noted that the image subjected to this process for enhancing a backlight image of a sunset or sunrise is an image that already has been subjected to a histogram adjustment or an image adjustment ((3) but not a vividness adjustment) in accordance with the adjustment procedure shown in FIG. 11. The scanner driver performs this process for enhancing a backlight image of a sunset or sunrise through a "density enhancement" on the image that already has been subjected to such a histogram adjustment or an image adjustment ((3) but not a vividness adjustment).

Figure 38A:
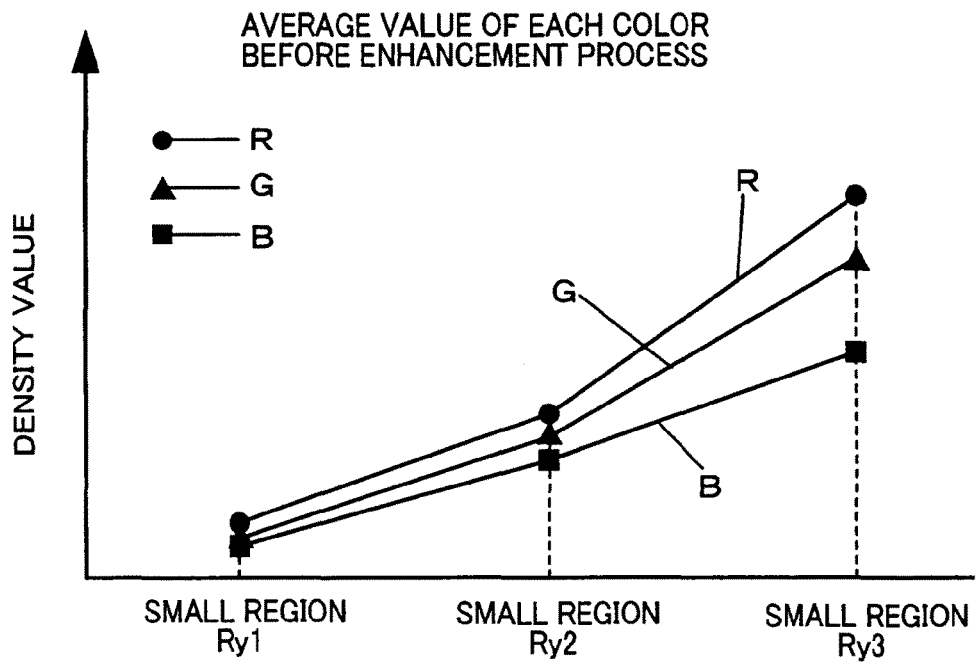
FIG. 38A is an explanatory diagram of the average values of the colors RGB before the process of enhancing a backlight image of a sunset or sunrise.
Figure 38B:
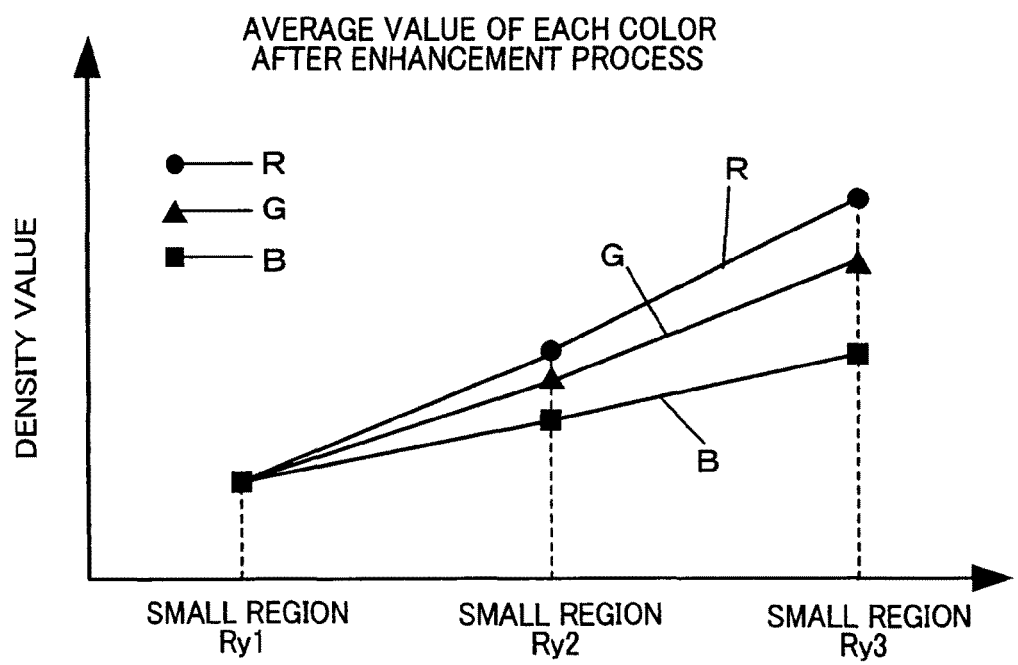
FIG. 38B is an explanatory diagram of the average values of the colors RGB after the process of enhancing a backlight image of a sunset or sunrise.

FIGS. 38A and 38B show the average values of each of the colors RGB before and after the process for enhancing a backlight image of a sunset or sunrise. FIG. 38A shows the average values of each of the colors RGB prior to the enhancement process. FIG. 38B shows the average values of each of the colors RGB after the enhancement process.

Before the enhancement process, as shown in FIG. 38A, the average value of the density values of each of the colors RGB of the pixels in the three small regions Ry1, Ry2 and Ry3 is large for a particular color (red (R)) in the small region Ry3, that is, in the highlight region. On the other hand, in the small regions Ry1 and Ry2, that is, in the shadow region and the region of intermediate tones, the average values of the density values of the colors RGB are very small.

On the other hand, after the enhancement process, as shown in FIG. 38B, the average values AVr1, AVg1 and AVb1 of the small region Ry1 of each of the colors RGB are set such that they assume the target value Ym1, which is the same for all colors. Thus, the average values AVr1, AVg1 and AVb1 of the small regions Ry1 of each of the colors RGB are all set to substantially the same value, so that the image quality of the shadow regions is improved.

Moreover, in the small region Ry2 of each of the colors RGB, the average values AVr2, AVg2 and AVb2 of the small region Ry2 of each of the colors RGB are respectively set to the target values Ym2, Mg2 and Mb2 of the individual colors, in order to ensure that the ratio of the average values of each of the colors RGB before the enhancement is maintained. Thus, the image quality of the regions of intermediate tones is improved, while maintaining the ratio of the average values AVr2, AVg2 and AVb2 of the small regions Ry2 of each of the colors RGB before the enhancement.

Figure 39:
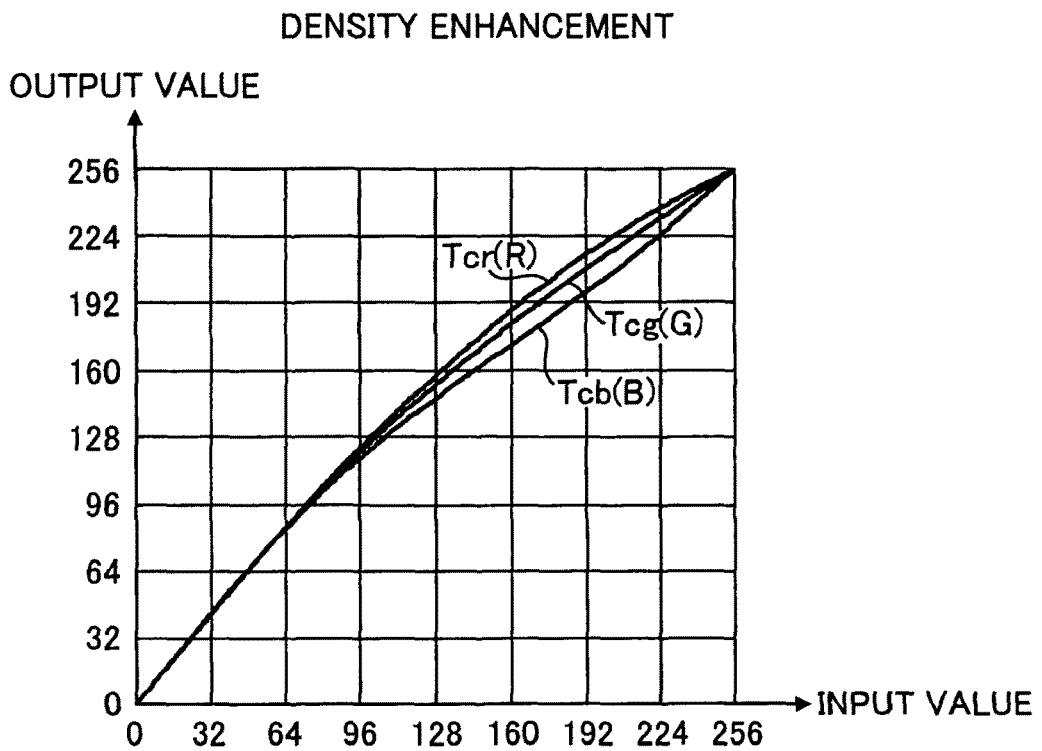
FIG. 39 is an explanatory diagram of an example of tone curves of the colors RGB.

FIG. 39 shows an example of the tone curves Tcr, Tcg and Tcb for each of the colors RGB generated through this enhancement process. As shown in this figure, each of the tone curves Tcr, Tcg and Tcb of each of the colors RGB has a different shape. The reason for this is that the suitable points that are set in order to form the tone curves Tcr, Tcg and Tcb of each of the colors RGB (for example the points Pr1, Pr2 and Pr3 in the case of the tone curve Tcr for red (R)) are set individually for each of the colors RGB. Here, as shown in that figure, the tone curves Tcr, Tcg and Tcb of each of the colors RGB are shaped such that a sufficient enhancement is achieved not only in the shadow region, but also in the region of intermediate tones and the highlight region. By shaping the tone curves Tcr, Tcg and Tcb of each of the colors RGB in this manner, it is possible to achieve a suitable process for enhancing a backlight image of a sunset or sunrise.

Figure 40A:
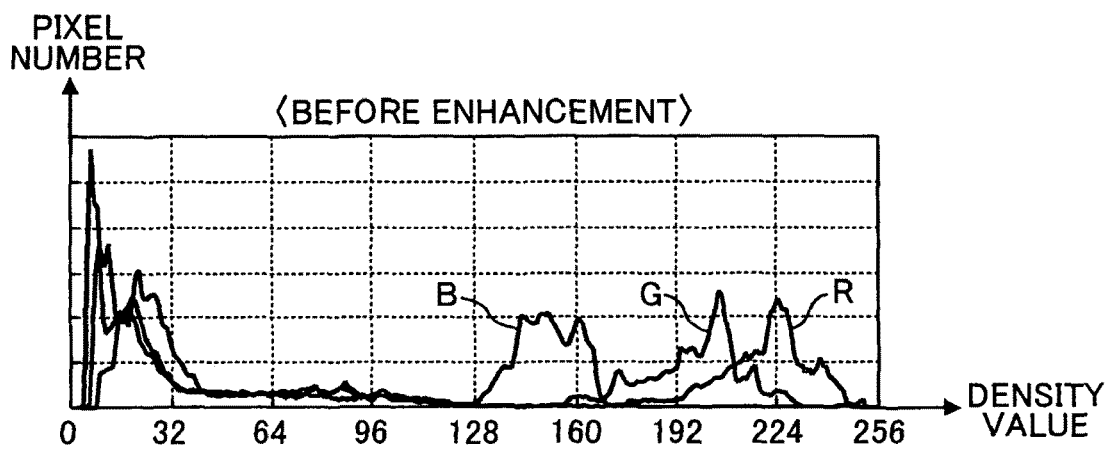
FIG. 40A is an explanatory diagram of an example of the histograms for the colors RGB before the enhancement process.
Figure 40B:
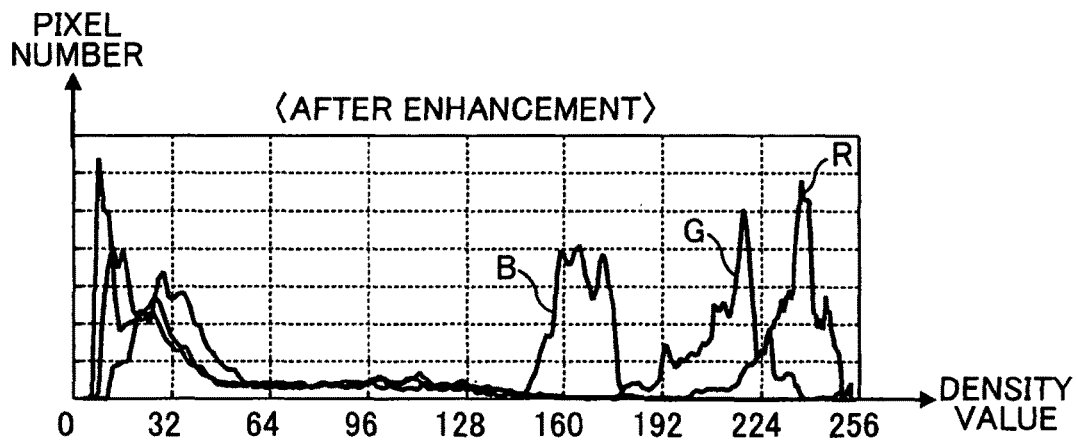
FIG. 40B is an explanatory diagram of an example of the histograms for the colors RGB after the enhancement process.

FIGS. 40A and 40B show an example of histograms for the colors RGB before the enhancement process and after the enhancement process. FIG. 40A shows the histograms for the colors RGB before the enhancement process. FIG. 40B shows the histograms for each of the colors RGB after the enhancement process.

As shown in FIG. 40A, before the adjustment process, there are the typical characteristics of a backlight image in which there is an uneven distribution of the pixels in the shadow region and the highlight region. On the other hand, after the enhancement process, as shown in FIG. 40B, the histograms for each of the colors red (R), green (G) and blue (B) are improved in that an overall greater brightness is achieved from the shadow region to the region of intermediate tones and the highlight region.

Other Application Example 1

Here, the regions given by the histograms for the three colors red (R), green (G) and blue (B) were each partitioned into four small regions Ry1, Ry2, Ry3 and Ry4, but it is not necessarily required to partition them into four small regions Ry1, Ry2, Ry3 and Ry4. That is to say, it is sufficient if the regions given by the histograms for the three colors red (R), green (G) and blue (B) are partitioned into at least three small regions, and they may also be partitioned into three small regions or five or more small regions.

Moreover, here, the four small regions Ry1, Ry2, Ry3 and Ry4 obtained by dividing the regions given by the histograms for the three colors red (R), green (G) and blue (B) included three small regions Ry1, Ry2 and Ry3 of substantially equal area and substantially equal pixel number, but it is not necessarily required to provide such small regions that have substantially the same area and pixel number. Moreover, there is no limitation to the case that three small regions are provided that have substantially the same area or pixel number, and there may also be two or four or more of such small regions.

Moreover, here, in "determining an image in which the color balance of, for example, intermediate tones is destroyed", among the small regions Ry1, Ry2, Ry3 and Ry4 obtained by partitioning the regions given by the histograms for the three colors red (R), green (G) and blue (B), the small region Ry2 was selected as the first small region and the small region Ry3 was selected as the second small region, but there is no limitation to carrying out the selection in this manner. That is to say, if the regions are partitioned by another method, it is also possible to select the first small region and the second small region by another approach. Moreover, the number of small regions selected as the first small region and the second small region may also be two or greater.

Moreover, here, in "determining an image in which the color balance of, for example, intermediate tones is destroyed", the maximum value St2 (Str2, Stg2, Stb2) of the small region Ry2 and the maximum value St3 (Str3, Stg3, Stb3) of the small region Ry3 was obtained for each color as the attribute information obtained from the first small region and the second small region, but there is no limitation to such attribute information as the attribute information obtained from the first small region and the second small region. That is to say, it is sufficient if the attribute information obtained from the first and second small regions is information relating to the quality or characteristic of the first and second small regions, for example it may be any of a variety of information, such as an average value of the density values of the pixels in the first and the second small regions, a minimum value of the density values of the pixels in the first and second small regions, a density value corresponding to a border line between neighboring small regions, or the size of the area of the first and second small regions. It is preferable that the attribute information obtained from the first and second small regions is information that is valuable for determining accurately whether an image is an image in which the color balance of, for example, intermediate tones is destroyed.

Moreover, here, in "determining an image in which the color balance of, for example, intermediate tones is destroyed", a difference between a maximum difference $\Delta Hs1$ among the maximum values Str2, Stg2, Stb2 for each color of the first small regions, and a maximum difference $\Delta Hs2$ among the maximum values Str3, Stg3, Stb3 for each color of the second small regions is determined, from the maximum values Str2, Stg2, Stb2, Str3, Stg3, Stb3 for each color that are obtained as attribute information from the first and second small regions, and this difference was compared with a predetermined threshold value "Ks" to determine whether an image is an image in which the color balance of, for example, intermediate tones is destroyed based on this comparison result, but the determination does not necessarily have to be carried out in this manner. That is to say, as long as the determination of whether an image is an image in which the color balance of, for example, intermediate tones is destroyed is carried out based on the attribute information belonging to the first small region of each of each color and the attribute information of the second small region of each of each color, this determination may be carried out by any method.

Other Application Examples 2

Here, regions expressed by histograms for the three colors red (R), green (G) and blue (B) were divided respectively into four small regions Ry1, Ry2, Ry3 and Ry4, but it is not always necessary to make a division into four small regions Ry1, Ry2, Ry3 and Ry4 in this manner. That is to say, it is sufficient if the regions represented by the histograms for the three colors red (R), green (G) and blue (B) are partitioned into at least three small regions, and they may also be partitioned into three small regions or five or more small regions.

Moreover, here, the four small regions Ry1, Ry2, Ry3 and Ry4 obtained by dividing the regions represented by the histograms for the three colors red (R), green (G) and blue (B) included three small regions Ry1, Ry2 and Ry3 of substantially equal area and substantially equal pixel number, but it is not necessarily required to provide such small regions that have substantially the same area and pixel number in this manner. Moreover, there is no limitation to the case that three small areas are provided that have substantially the same area or pixel number in this manner, and there may also be two or four or more of such small areas.

Also, here, in the "process for enhancing a backlight image in which the color balance of intermediate tones is destroyed", the three small regions Ry1, Ry2 and Ry3 were selected from the four small regions Ry1, Ry2, Ry3 and Ry4 obtained by partitioning the regions expressed by the histograms for the three colors red (R), green (G) and blue (B), in order to obtain the attribute information, but there is no limitation to carrying out the selection in this manner. That is to say, it is sufficient if at least one small region is selected from among the at least two small regions obtained by partitioning the regions represented by the histograms for the three colors red (R), green (G) and blue (B), and it is also sufficient if one of the three small regions Ry1, Ry2 and Ry3 is selected. Moreover, if the small regions are partitioned by a method other than the above-described method, then also the small regions may be selected by another approach.

Moreover, herein, in the "process for enhancing a backlight image in which the color balance of intermediate tones is destroyed", the average values AVr1, AVr2, AVr3, AVg1, AVg2, AVg3, AVb1, AVb2 and AVb3 of the density values of the pixels in the three small regions Ry1, Ry2 and Ry3 for each of the colors were obtained as the attribute information from the three small regions Ry1, Ry2 and Ry3, but it is not necessarily required to obtain such attribute information. That is to say, the attribute information obtained from the selected small regions may be any attribute information, and may also be, for example, the maximum value or the minimum value of the density values of the pixels in the selected small regions Ry1, Ry2 and Ry3, or the size of the area of the selected small regions Ry1, Ry2 and Ry3. It should be noted that it is preferable that the attribute information obtained from the selected small regions is information that is useful for performing the "process for enhancing a backlight image in which the color balance of intermediate tones is destroyed."

Moreover, in the "process for enhancing a backlight image in which the color balance of intermediate tones is destroyed", the information relating to luminance is obtained based on the average values AVr1, AVr2, AVr3, AVg1, AVg2, AVg3, AVb1, AVb2 and AVb3 of the density values of the pixels in the small regions Ry1, Ry2 and Ry3 for each of the colors, respectively obtained as attribute information from the small regions Ry1, Ry2 and Ry3, and the two target values Ym1 and Ym2 are obtained based on information relating to this luminance, to carry out the enhancement process based on these target values Ym1 and Ym2, but the enhancement process does not necessarily have to be carried out by this method. That is to say, it is also possible to obtain the target values from attribute information obtained from the three small regions Ry1, Ry2 and ry3, and carry out the enhancement process by another method.

Also, here, the "process for enhancing a backlight image in which the color balance of intermediate tones is destroyed" was carried out by adjusting the tone curves Tcr, Tcg and Tcb in the "density enhancement", but it is not necessarily required to carry out the enhancement process by this method. That is to say, it is possible to carry out any enhancement process, as long as it is a process for enhancing a backlight image in which the color balance of intermediate tones is destroyed.

Overview 1

In this embodiment as described above, in "determining an image in which the color balance of, for example, intermediate tones is destroyed", histograms for the three colors red (R), green (G) and blue (B) are generated based on the data of the pixels constituting an image read in with the image reading device 10, and the regions given by these histograms are each partitioned into four small regions, that is a first to fourth small regions Ry1, Ry2, Ry3 and Ry4. A small region Ry2 is selected from the first to the fourth small regions Ry1, Ry2, Ry3 and Ry4 as a first small region, and a small region Ry3 is selected as a second small region. Attribute information is obtained for the small regions Ry2 and Ry3, respectively, and based on this attribute information, it is determined whether an image to be determined (here, an image read in with the image reading device 10) is an image in which the color balance of, for example, intermediate tones is destroyed, so that this determination can be made accurately.

Moreover, in "determining an image in which the color balance of, for example, intermediate tones is destroyed", among the four small regions Ry1, Ry2, Ry3 and Ry4 obtained by partitioning the regions given by the histograms of the colors red (R), green (G) and blue (B), three small regions Ry1, Ry2 and Ry3 are provided that have substantially the same area and pixel number, and by selecting the first small region and the second small region from these three small regions Ry1, Ry2 and Ry3, it is possible to accurately determine whether an image to be determined (here, the image read in with the image reading device 10) is an image in which the color balance of, for example, intermediate tones is destroyed.

Furthermore, by obtaining, for each color, the maximum values Str2, Stg2, Stb2 of the small region Ry2 and the maximum values Str3, Stg3, Stb3 of the small region Ry3 as the attribute information of the small region Ry2 selected as the first small region and the small region Ry3 selected as the second small region, it is possible to accurately determine whether an image to be determined (here, the image read in with the image reading device 10) is an image in which the color balance of, for example, intermediate tones is destroyed.

Furthermore, a difference between a maximum difference ΔHs1 among maximum values Str2, Stg2, Stb2 of each color of the small regions Ry2 for each color and a maximum difference ΔHs2 among maximum values Str3, Stg3, Stb3 of each color of the second small region are obtained. By comparing this difference with a predetermined threshold value "Ks", and based on this comparison result, it is determined whether the image is an image with an unbalanced color balance of intermediate tone. Thus, it is possible to make a more simple and accurate determination.

Moreover, it is possible to examine whether an image to be examined (here, the image read in with the image reading apparatus 10) is a backlight image in which the color balance of the intermediate tones is destroyed, by determining whether the image is a backlight image before determining whether the image is an image in which the color balance of the intermediate tones is destroyed, and then determining whether the image is an image in which the color balance of the intermediate tones is destroyed only if it is determined that the image is a backlight image.

Overview 2

As described above, in accordance with this embodiment, histograms for the three colors red (R), green (G) and blue (B) are generated based on the data of the pixels constituting the image read in with the image reading apparatus 10. The regions represented by these histograms are each partitioned into four small regions Ry1, Ry2, Ry3 and Ry4. Three small regions Ry1, Ry2 and Ry3 are selected for each color from the four small regions Ry1, Ry2, Ry3 and Ry4. Attribute information is respectively obtained from the three small regions Ry1, Ry2 and Ry3. Based on this attribute information, target values Ym1 and Ym2 are obtained, and a "process for enhancing a backlight image in which the color balance of intermediate tones is destroyed" is carried out on the image read in with the image reading apparatus 10, based on these target values Ym1 and Ym2. Thus, the image read in with the image reading apparatus 10 can be subjected to a suitable backlight enhancement process if it is an image in which the color balance of intermediate tones is destroyed.

Moreover, in the "process for enhancing a backlight image in which the color balance of intermediate tones is destroyed", among the four small regions Ry1, Ry2, Ry3 and Ry4 obtained by partitioning the regions represented by the histograms for each of the colors red (R), green (G) and blue (B), three small regions Ry1, Ry2 and Ry3 are provided that have substantially the same area and pixel number, and by obtaining the attribute information respectively from these three small regions Ry1, Ry2 and Ry3, it is possible to perform a suitable enhancement process, if the image read in with the image reading apparatus 10 is an image in which the color balance of intermediate tones is destroyed.

Moreover, in the "process for enhancing a backlight image in which the color balance of intermediate tones is destroyed", by obtaining the average values AVr1, AVr2, AVr3, AVg1, AVg2, AVg3, AVb1, AVb2 and AVb3 of the density values of each of the colors of the pixels in the three selected small regions Ry1, Ry2 and Ry3 as the attribute information, it is possible to carry out a more suitable enhancement process, if the image read in with the image reading apparatus 10 is an image in which the color balance of intermediate tones is destroyed.

Moreover, in the "process for enhancing a backlight image in which the color balance of intermediate tones is destroyed", by obtaining the average values Yav1, Yav2 and Yav3 of the luminance of the pixels in the three small regions Ry1, Ry2 and Ry3 based on the average values AVr1, AVr2, AVr3, AVg1, AVg2, AVg3, AVb1, AVb2 and AVb3 of the density values of each of the colors of the pixels in the three selected small regions Ry1, Ry2 and Ry3, it is possible to carry out a more suitable enhancement process, if the image read in with the image reading apparatus 10 is an image in which the color balance of intermediate tones is destroyed.

Moreover, in the "process for enhancing a backlight image in which the color balance of intermediate tones is destroyed", by obtaining the sum Sadd by adding the average value Yav1 of the luminance of the pixels in the obtained small region Ry1 and the average value Yav0 of the luminance of the overall image, it is possible to obtain a more suitable target value. Thus, it is possible to carry out a more suitable enhancement process, if the image read in with the image reading apparatus 10 is an image in which the color balance of intermediate tones is destroyed.

Moreover, by performing the "density enhancement" as the "process for enhancing a backlight image in which the color balance of intermediate tones is destroyed", it is possible to perform the "process for enhancing a backlight image in which the color balance of intermediate tones is destroyed" in a simple manner on the image read in with the image reading apparatus 10.

Application to Printing Apparatus

Figure 41:
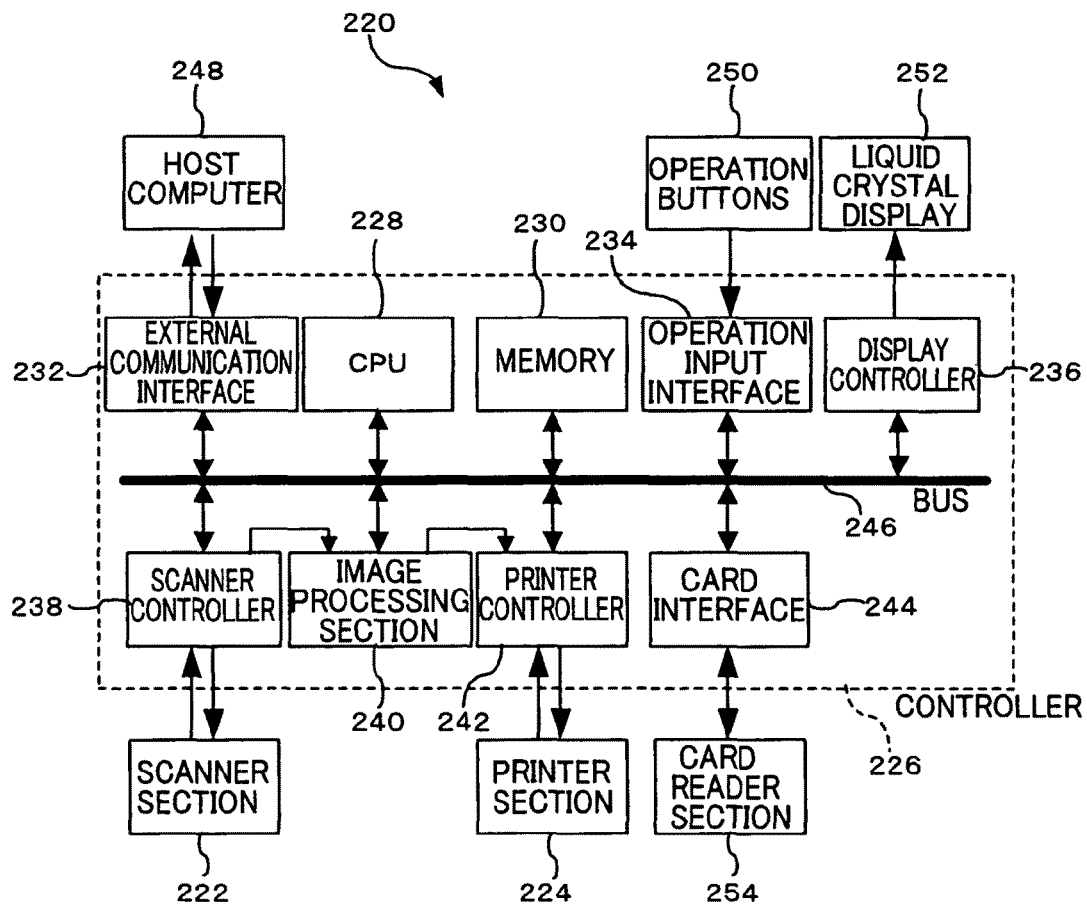
FIG. 41 is an explanatory diagram showing an embodiment of a printing apparatus.

Such an image reading device 10 can also be mounted to a printing apparatus. FIG. 41 illustrates a configuration example of a printing apparatus 220 provided with such an image reading device 10. This printing apparatus 220 is a multifunctional apparatus provided with a scanner function for generating image data by reading in an image from an original document, a printer function for printing print data sent from a host computer 248 on various types of media, such as print paper or the like, and a local copying function for copying by printing on a medium an image read in from an original document. This printing apparatus 220 is provided with a scanner section 222 (including a scanner controller 238, here referred to as "image reading device 10") that reads in an image from an original document, and a printer section 224 for printing on a medium S, such as print paper or the like.

Furthermore, as shown in FIG. 16, the controller 226 of the printing apparatus 220 includes a CPU 228, a memory 230, an external communication interface 232, an operation input interface 234, a display controller 236, a scanner controller 238, an image processing section 240, a printer controller 242, a card interface 244, and a bus 246 connecting these to each other.

The CPU 228 performs the overall control of the printing apparatus 220. The memory 230 stores a program carried out by the CPU 228 and data used by the program. The external communication interface 232 communicates by wire or wirelessly with the host computer 248. The operation input interface 234 receives the operation input from the user via operation buttons 250 or the like. The display controller 236 controls the display section, which may be a liquid crystal display 252 or the like.

On the other hand, the scanner controller 238 controls the scanner section 222 and carries out the read-in operation of reading in an image from the original document. The image processing section 240 has the function of converting the data of an image that is output from the scanner section 222 into data for carrying out the printing process with the printer section 224, in order to print with the printer section 224 the image read in from the original document with the scanner section 222. The printer controller 242 controls the printer section 224. Moreover, the card interface 244 performs a process such as reading in image data stored in various types of memory cards set in a card reader section 254 from those memory cards.

Also, during the scanner function, the printing apparatus 220 outputs the data of the image read in from the original document with the scanner section 222 to the host computer 248. Moreover, during the printer function, the printing apparatus 220 performs printing on various types of media with the printer section 224, based on the print data sent from the host computer 248. And during the local copying function, the printing apparatus 220 makes copies by printing with the printer section 224 the image read in from the original document with the scanner section 222 on various types of media.

Other Embodiments

In the foregoing, an embodiment of an image reading system according to the invention was described as an example. However, the foregoing embodiment is for the purpose of elucidating the invention and is not to be interpreted as limiting the invention. The invention can of course be altered and improved without departing from the gist thereof and includes functional equivalents. In particular, the embodiments mentioned below are also included in the scope of invention.

Regarding the Image

In the above-described embodiment, the image was explained by taking as an example an image read in with the image reading device 10, but here the "image" may be any image. For example, more specifically, it may also be an image taken with a digital camera or the like. Furthermore, the format of the image may be any type, and it may be for example an image expressed by any type of format, such as JPEG format, bitmap format or YUV format.

Regarding the Density Values

In the above-described embodiment, the "density values" were explained to be density values expressed by 256 tones, that is, density values that can assume the values "0" to "255" for example, but the "density values" are not limited to such density values. That is to say, the "density values" may be any density values, as long as they are data expressing the darkness/brightness of the individual pixels constituting an image. It should be noted that these "density values" also include density values of the luminance expressed by the YUV format, for example.

Regarding the Histograms

In the above-described embodiment, histogram data of the three colors red (R), green (G) and blue (B) was generated as the "histogram data", but this "histogram data" is not necessarily limited to the case that histogram data of these three colors red (R), green (G) and blue (B) is generated. That is to say, it is also possible that histogram data of at least two or more different colors is generated as the "histogram data".

Regarding the Histogram Data Generation Section

In the above-described embodiment, the scanner driver generated, as the "histogram data generation section", the histogram data based on the data of the pixels constituting the image, that is, the image read in with the image reading device 10, but the "histogram data generation section" is not necessarily limited to such a scanner driver. That is to say, the "histogram data generation section" may be a "histogram data generation section" of any type, as long as it generates histogram data based on the data of the pixels constituting the image to be determined.

Regarding the Attribute Information Obtaining Section 1

In the above-described embodiment, the scanner driver was explained to partition, as an "attribute information obtaining section", the regions given by the histograms of the colors red (R), green (G) and blue (B) into at least three small regions according to the magnitudes of their density values, to select from these at least three small regions a first small region and a second small region, and to obtain the respective attribute information from the small region Ry2 selected as the first small region and the small region Ry3 selected as the second small region, but the "attribute information obtaining section" does not necessarily have to be such a scanner driver. That is to say, the "attribute information obtaining section" may be an "attribute information obtaining section" of any type, as long as it obtains the attribute information respectively from the first small region and the second small region by partitioning the regions given by the histograms into at least three small regions according to the magnitude of their density values, selecting from these at least three small regions for each color a small region having the density value larger than at least one small region and having the density value smaller than at least one of another small region of the three or more small regions as a first small region, selecting for each color at least one small region from the remaining small regions excluding the first small region as a second small region.

Regarding the Attribute Information Obtaining Section 2

In the above-described embodiment, the scanner driver partitioned, as an "attribute information obtaining section", the regions represented by the histograms for each of the colors red (R), green (G) and blue (B) into at least three small regions according to the magnitudes of their density values, to select from these three or more small regions at least one small region, and to obtain the attribute information from this selected small region, but the "attribute information obtaining section" here does not necessarily have to be such a scanner driver. That is to say, what is referred to here as "attribute information obtaining section" may be an "attribute information obtaining section" of any type, as long as it obtains the attribute information by an approach as described above.

Regarding the Determination Section

In the above-described embodiment, the scanner driver determined, as the "determination section", whether the image to be determined (here, the image read in with the image reading device 10) is, for example, an image in which the color balance of, for example, intermediate tones is destroyed, based on the attribute information obtained respectively from the small region Ry2 selected as the first small region and the small region Ry3 selected as the second small region, but this "determination section" is not necessarily limited to such a scanner driver. That is to say, the "determination section" may be a "determination section" of any type, as long as it determines, for example, whether an image is an image in which the color balance of, for example, intermediate tones is destroyed based on the attribute information obtained respectively from the first small region and the second small region.

Regarding the Image Determining Apparatus

In the above-described embodiment, the "image determining apparatus" was explained by taking as an example an apparatus determining whether an image read in with the image reading apparatus 10 is an image in which the color balance of intermediate tones is destroyed, but this "image determining apparatus" is not limited to such an apparatus assessing the image read in with the image reading apparatus 10. That is to say, the "image determining apparatus" described here may be any type of apparatus, as long as it is an apparatus that assesses any type of image, regardless of the type of image.

Regarding the Image Determining Program

In the above-described embodiment, the scanner driver carried out a "image determining program" on a computer system 20 that is connected communicably by wire or wirelessly with the image reading apparatus 10, but the "image determining program" is not limited to such a scanner driver. That is to say, this "image determining program" may be any program, as long as it is a program that determines whether an image in question is an image in which the color balance of, for example, intermediate tones is destroyed.

Regarding the Target Value Obtaining Section

In the above-described embodiment, the scanner driver selected, as the "target value obtaining section", from at least three small regions obtained by partitioning regions given by the histograms for the colors red (R), green (G) and blue (B) by the size of their density values at least one small region whose density values are larger than those of another small region and smaller than those of yet another small region as a selected small region for each color, and obtained target values that are the same for all colors, based on the obtained attribute information for the selected small regions, but the "target value obtaining section" does not necessarily have to be such a scanner driver. That is to say, the "target value obtaining section" is not limited to the above-described scanner driver, and may be a target value obtaining section of any type.

Regarding the Image Enhancement Apparatus 1

In the above-described embodiment, the "image enhancement apparatus" was explained by taking as an example an image enhancement apparatus determining whether the image read in with the image reading apparatus 10 is an image in which the color balance of intermediate tones is destroyed and carrying out an enhancement process based on the result of this determination. However, this "image enhancement apparatus" is not limited to an apparatus carrying out such an enhancement on the image read in with the image reading apparatus 10. That is to say, the "image enhancement apparatus" may be any type of apparatus, as long as it is an apparatus that performs an enhancement on any type of image in accordance with the result of assessing that image, regardless of the type of image.

Regarding the Image Enhancement Apparatus 2

In the above-described embodiment, the "image enhancement apparatus" was explained by taking as an example an apparatus performing an enhancement process to a backlight image in which the color balance of, for example, intermediate tones is destroyed for an image read in with the image reading device 10, but this "image enhancement apparatus" is not limited to an apparatus performing an enhancement process to an image read in with the image reading device 10. That is to say, the "image enhancement apparatus" may be any type of apparatus, as long as it is an apparatus that performs an enhancement process to each type of image, regardless of the type of image.

Regarding the Image Enhancement Program

In the above-described embodiment, the scanner driver carried out an "image enhancement program" on a computer system 20 that is connected communicably by wire or wirelessly with the image reading device 10, but the "image enhancement program" is not limited to such a scanner driver. That is to say, this "image enhancement program" may be any program, as long as it is a program that performs an enhancement process to a backlight image in which the color balance of, for example, intermediate tones is destroyed.

Regarding the Image Reading Device

In the above-described embodiment, the "image reading device" was explained by taking as an example an image reading device with an image sensor 50 for reading in images, which is provided on a carriage 40 that moves relatively to the original document 15 set on a platen 12, but the "image reading device" is not necessarily limited to this type of "image reading device". That is to say, the "image reading device" may be any type of apparatus, as long as it is an apparatus reading in images from an original document. In other words, the "image reading device" may also be an image reading device that reads in an image from an original document 15 as the original document 15 moves relatively to an image sensor 50 reading in the image.

Regarding the Printing Apparatus

In the above-described embodiment, the "printing apparatus" was explained by taking as an example the case of a "multifunctional apparatus" provided with an image reading section (scanner section 222) generating image data by reading in an image from an original document 15, and a printing section (printer section 224) printing the image on a medium, but this "printing apparatus" does not necessarily have to be provided with an image reading section (scanner section 222 (includes also the scanner controller 238 and the image processing section 240)). That is to say, it is sufficient if the "printing apparatus" is provided at least with a printing section for printing an image on a medium.

What is claimed is:

1. An image determining apparatus comprising:
   (A) a histogram data generation section that, based on data of pixels constituting an image to be determined, generates data of histograms for each color, the histograms representing a distribution of the number of pixels with respect to density values of each color of those pixels;
   (B) an attribute information obtaining section that obtains, for each color, attribute information relating to a first small region and a second small region by partitioning regions represented by the histograms for each color into at least three small regions each, according to the magnitude of the density values, based on the data of the histograms for each color generated by the histogram data generation section, selecting, for each color, as the first small region, a small region whose density values are larger than those of at least one of the at least three small regions and whose density values are smaller than those of at least one other of the at least three small regions, and selecting, for each color, at least one small region other than the first small region as the second small region; and
   (C) a determining section that determines whether the image to be determined is an image in which the color balance of the first small region is destroyed, based on the attribute information relating to the first small region for each color and the attribute information relating to the second small region for each color, that have been obtained by the attribute information obtaining section.

2. An image determining apparatus according to claim 1, wherein the at least three small regions contain at least two small regions in which at least one of the number of pixels and the area is the same; and the attribute information obtaining section obtains the respective attribute information from the at least two small regions in which at least one of the number of pixels and the area is the same.

3. An image determining apparatus according to claim 1, wherein the attribute information obtaining section obtains a maximum value of the density values of the first small region or the second small region as the attribute information of the first small region or the second small region.

4. An image determining apparatus according to claim 1, wherein the determining section determines whether the image to be determined is an image in which the color balance of the first small region is destroyed, based on the result of a comparison between the attribute information relating to the first small region for each color and the attribute information relating to the second small region for each color, that has been obtained by the attribute information obtaining section.

5. An image determining apparatus according to claim 4, wherein the determining section determines whether the image to be determined is an image in which the color balance of the first small region is destroyed by comparing a maximum of a first difference between values obtained for each color as the attribute information relating to the first small region for each color and a maximum of a second difference between values obtained for each color as the attribute information relating to the second small region for each color.

6. An image determining apparatus according to claim 5, wherein the determining section determines whether the image to be determined is an image in which the color balance of the first small region is destroyed, by comparing a third difference between the first difference and the second difference to a predetermined threshold value.

7. An image determining apparatus according to claim 1, further comprising, in addition to the determining section, a backlight image determining section that determines whether the image to be determined is a backlight image, and wherein, when it has been determined by the backlight image determining section that the image to be determined is a backlight image, then the determining section determines whether the image to be determined is an image in which the color balance of the first small region is destroyed.

8. An image determining method comprising:
(A) generating, based on data of pixels constituting an image to be determined, data of histograms for each color, the histograms representing a distribution of the number of pixels with respect to density values of each color of those pixels;
(B) partitioning regions represented by the histograms for each color into at least three small regions according to the magnitude of the density values, based on the data of the generated histograms for each color;
(C) obtaining, for each color, attribute information relating to a first small region and a second small region by selecting, for each color, as the first small region, a small region whose density values are larger than those of at least one of the at least three small regions and whose density values are smaller than those of at least one other of the at least three small regions, and selecting, for each color, at least one small region other than the first small region as the second small region; and
(D) determining whether the image to be determined is an image in which the color balance of the first small region is destroyed, based on the attribute information relating to the first small region for each color and the attribute information relating to the second small region for each color, that have been obtained.

9. An image enhancement apparatus comprising:
(A) a histogram data generation section that, based on data of pixels constituting an image, generates data of histograms for each color, the histograms representing a distribution of the number of pixels with respect to density values of each color of those pixels;
(B) an attribute information obtaining section that obtains, for each color, attribute information relating to a small region by partitioning regions represented by the histograms for each color into at least three small regions according to the magnitude of the density values, based on the data of the histograms for each color generated by the histogram data generation section, and selecting at least one small region from the at least three small regions;
(C) a target value obtaining section that obtains a target value that is common for all colors for the attribute information relating to a selected small region, based on the attribute-information obtained by the attribute information obtaining section by selecting from the at least three small regions, as the selected small region, for each color at least one small region whose density values are larger than those of another small region and whose density values are smaller than those of yet another small region; and
(D) an enhancement processing section that subjects the image to an enhancement process, such that the attribute information of each color relating to the selected small region becomes the target value, which is common for all colors, that has been obtained by the target value obtaining section.

10. An image enhancement apparatus according to claim 9, wherein the at least three small regions contain at least two small regions in which at least one of the number of pixels and the area is the same;
the attribute information obtaining section selects at least one small region from the at least two small regions in which at least one of the number of pixels and the area is the same, and obtains the attribute information relating to that small region; and
the target value obtaining section selects the selected small region from the at least two small regions in which at least one of the number of pixels and the area is the same.

11. An image enhancement apparatus according to claim 9, wherein the attribute information obtaining section obtains, for each color, an average value of the density values of each of the at least one first small region as the attribute information,
wherein the target value obtaining section obtains information relating to the luminance for each of the at least one small region, based on an average value of the density values for each color obtained by the attribute information obtaining section, and obtains the target value from this information relating to the luminance.

12. An image enhancement apparatus according to claim 11,
- wherein the target value obtaining section obtains the average value of the luminance of the pixels for the at least one small region as the information relating to the luminance, and
- wherein the target value obtaining section obtains the target value based on a value obtained by adding at least one of the average values of the luminance obtained for the at least one small region and the average value of the luminance of the overall image.

13. An image enhancement apparatus according to claim 9,
- wherein the enhancement processing section converts the density values of the respective pixels constituting the image when subjecting the image to the enhancement process,
- wherein the enhancement processing section obtains information relating to a correspondence relationship between the density values before the conversion and the density values after the conversion, in order to subject the image to the enhancement process.

14. An image enhancement apparatus according to claim 9,
- further comprising a judgment section judging whether the image is an image in which the color balance in the selected small region is destroyed,
- wherein the enhancement processing section subjects the image to the enhancement process if the judgment section has judged that the image is an image in which the color balance in the selected small region is destroyed.

15. An image enhancement method comprising:
- (A) generating, based on data of pixels constituting an image, data of histograms for each color, the histograms representing a distribution of the number of pixels with respect to density values of each color of those pixels;
- (B) partitioning regions represented by the histograms for each color each into at least three small regions according to the magnitude of the density values, based on the generated data of the histograms for each color;
- (C) selecting at least one small region from the at least three small regions and obtaining, for each color, attribute information relating to that small region;
- (D) selecting from the at least three small regions, as a selected small region, for each color at least one small region whose density values are larger than those of another small region and whose density values are smaller than those of yet another small region;
- (E) obtaining a target value that is common for all colors for the attribute information relating to the selected small region, based on the obtained attribute information; and
- (F) subjecting the image to an enhancement process, such that the attribute information of each color relating to the selected small region becomes the obtained target value, which is common for all colors.

* * * * *